United States Patent [19]

Kovacs et al.

[11] Patent Number: 5,377,474
[45] Date of Patent: Jan. 3, 1995

[54] FORM-FILL-SEAL PACKAGING APPARATUS

[75] Inventors: Lloyd Kovacs, Sheboygan; Dale M. Cherney, Howards Grove; Keith W. Hopkins, Sheboygan, all of Wis.

[73] Assignee: Hayssen Manufacturing Company, Sheboygan, Wis.

[21] Appl. No.: 969,342

[22] Filed: Oct. 30, 1992

[51] Int. Cl.[6] .................. B65B 9/06; B65B 41/18; B65B 57/02
[52] U.S. Cl. .......................... 53/64; 53/51; 53/451; 53/551
[58] Field of Search ............... 53/551, 550, 552, 451, 53/450, 55, 51, 77, 64

[56] References Cited

U.S. PATENT DOCUMENTS

| | | | |
|---|---|---|---|
| 3,055,154 | 9/1962 | Markley et al. | 53/551 |
| 4,501,109 | 2/1985 | Monsees | 53/451 |
| 4,727,707 | 3/1988 | Hadden | 53/451 |
| 4,751,808 | 6/1988 | Hadden | 53/551 X |
| 4,768,327 | 9/1988 | Mosher | 53/551 X |
| 4,860,522 | 8/1989 | Cherney | 53/451 |
| 5,117,612 | 6/1992 | Keim et al. | 53/451 |
| 5,167,107 | 12/1992 | Terminalla et al. | 53/551 |

*Primary Examiner*—James F. Coan
*Attorney, Agent, or Firm*—Senniger, Powers, Leavitt & Roedel

[57] ABSTRACT

A vertical form-fill-seal packaging machine controlled by a controller for receiving input data defining the package length, cycle time and sealing time and for controlling the feed of the packaging material as a function of the input data, the machine having a measuring roll for feeding the material forward in package length increments which is also operable to maintain the material tracking properly, further having a control maintaining the material under substantially constant tension, rapid controllable sealing jaw operation, a readily retractable longitudinal seam sealer, and a stripper operable independently of the sealing jaws.

54 Claims, 34 Drawing Sheets

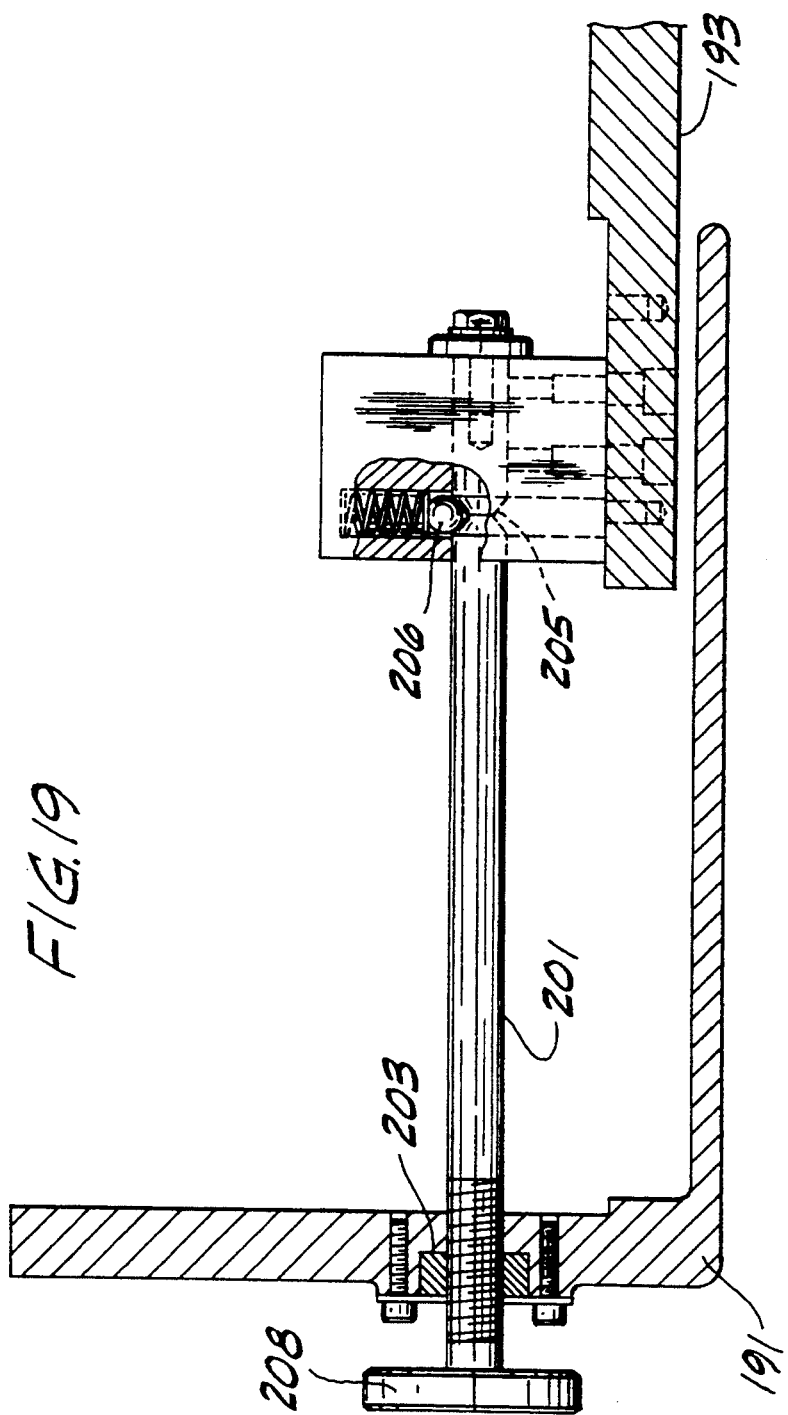

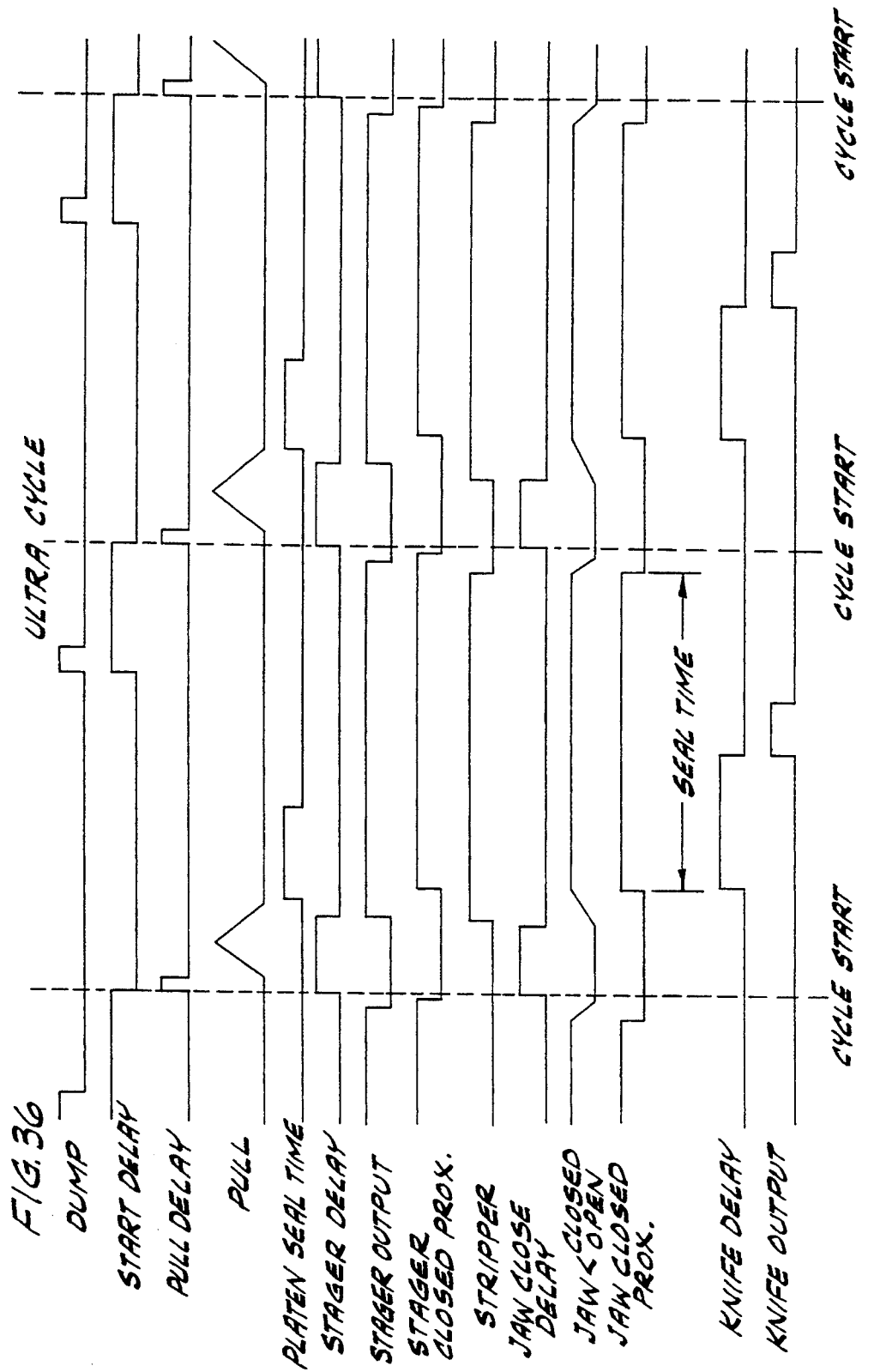

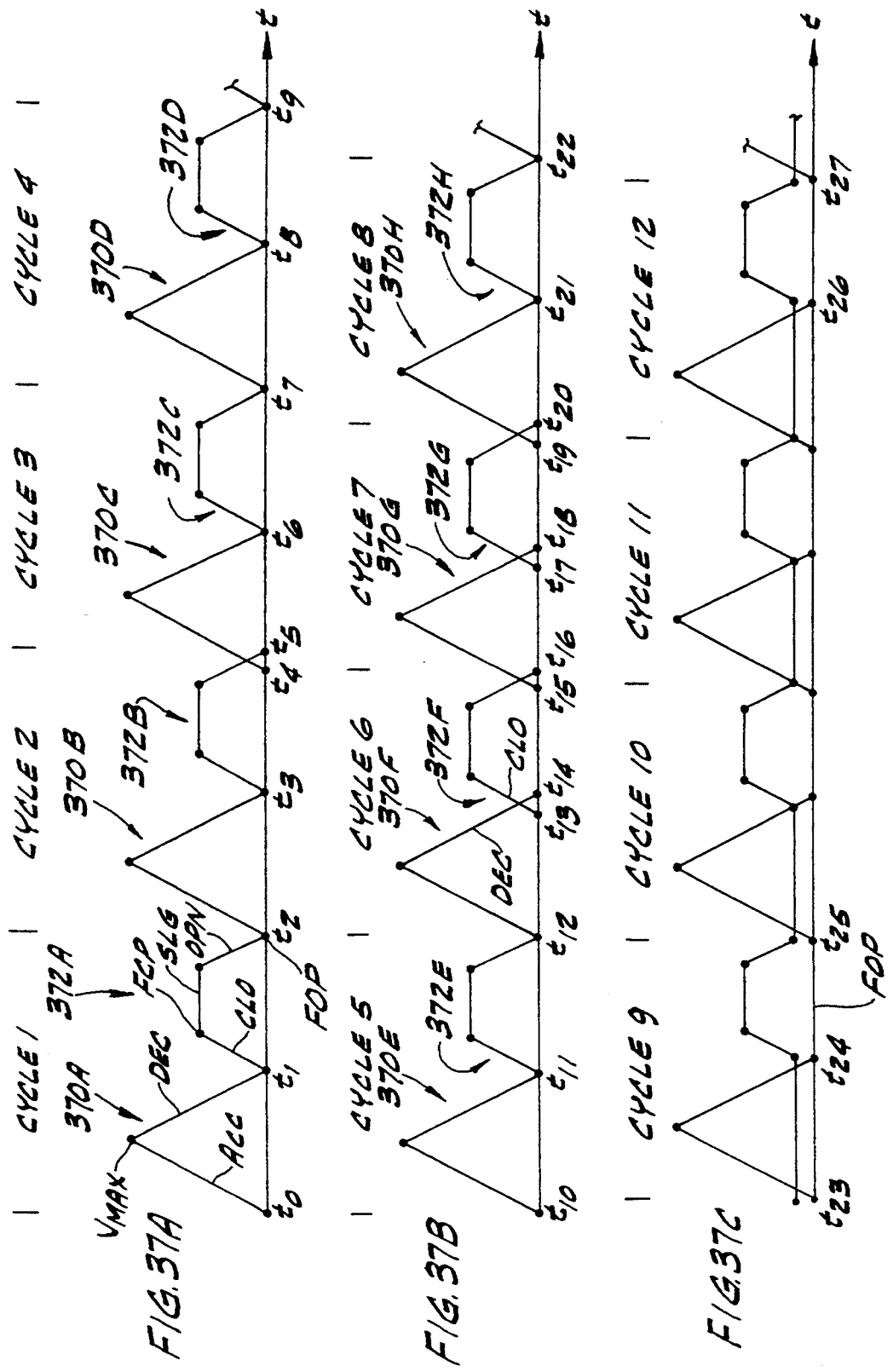

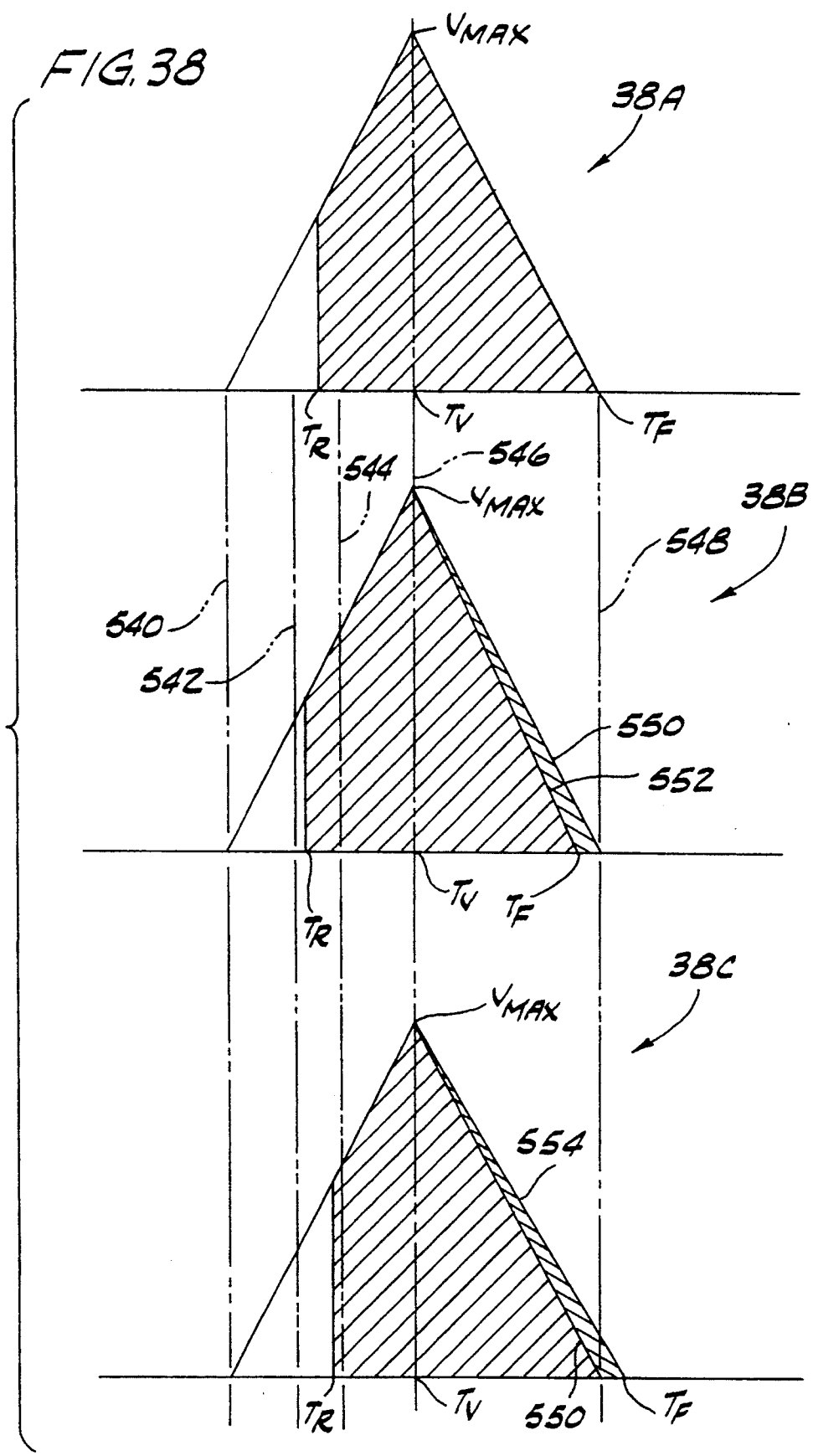

FORM-FILL-SEAL PACKAGING APPARATUS

BRIEF SUMMARY OF THE INVENTION

This invention relates to form-fill-seal packaging apparatus and more particularly to a vertical form-fill-seal packaging machine, i.e., a machine in which a web of flexible packaging material is guided from a supply roll of the material over a forming shoulder at which it is formed into tubing and the tubing is intermittently fed downward, the web being sealed to form a longitudinal tube seam, product to be packaged is provided in the tubing, and the tubing is sealed at package length intervals and cut into individual packages.

The invention is especially concerned width a vertical form-fill-seal machine of the type shown in U.S. Pat. No. 4,288,965 of Robert C. James issued Sept. 15, 1981 to Hayssen Manufacturing Company of Sheboygan, Wis., U.S.A. entitled Form-Fill-Seal Packaging Method and Apparatus. That patent is the subject of Reexamination Certificate B1 4,288,965. Many machines of the type shown therein have been sold by Hayssen Manufacturing Company under the name ULTIMA. This invention involves improvements thereover, said James U.S. patent being incorporated herein by reference.

The machine shown in said James patent comprises a downwardly extending tubular mandrel for delivery of product to be packaged downwardly therethrough and out of the lower end of the mandrel, and a forming shoulder for forming a web of packaging material into tubing around the mandrel. Measuring rolls are operable intermittently to pull a web of the material from a supply in package length increments and feed the web forward in such increments on successive feed cycles to the forming shoulder. The margins of the web are sealed together to form a longitudinal tubing seam. A pair of belts engaging the tubing on the mandrel are operable intermittently to pull the web over the forming shoulder and to draw the tubing down on the mandrel one package length and feed the tubing downwardly off the lower end of the mandrel in a package length increment on each feed cycle. Sealing means is operable intermittently to seal the tubing below the lower end of the mandrel, being opened for the downward feed of the tubing on each feed cycle and closed on the tubing on a dwell of the tubing between successive feed cycles. Product to be packaged is delivered downwardly through the mandrel and out of its lower end into the tubing. As shown in the James patent, the measuring rolls are driven via a drive including an electric clutch-brake unit, the clutch of this unit being intermittently engaged and the brake being disengaged for driving the measuring rolls forward to feed forward the requisite pre-selected package length increment of the web on each feed cycle by a programmable control which is under the control of an encoder. Each belt is driven via a drive including a clutch, which is engaged for driving the belts (with slip).

Among the several objects of the invention may be noted the provision of an improved vertical form-fill-seal packaging machine of the type shown in said James patent acting on the measure-form-pull principle and operable at even higher speeds than the predecessor (the ULTIMA) machine; the provision of such apparatus in which the measuring rolls and pull belts are driven other than by the clutch/brake drives to avoid a potential problem of clutch/brake wear; the provision of such a machine with a control system enabling enhanced utilization of time for operation at said higher speeds and ready change operating parameters; the provision of such a machine with a web tracking system utilizing the measuring roll of the machine for steering the web back into line should it deviate from its path of alignment with the forming shoulder; the provision of a control system for controlling the tension of the web as it travels over the forming shoulder between the measuring roll and the pull belts; the provision of such a machine with an improved sealing jaw system enabling faster opening and closing of the jaws and more effective pressurization of the tubing by the jaws to form the transverse seals across the tubing, enabling adjustment to limit the opening of the jaws to the minimum required for a specific package size and adjustment of sealing pressure, with the latter generally repeatable; the provision of such a machine in which the means for longitudinally sealing the margins of the web is readily retractable from in front of the mandrel for occasional maintenance purposes and slidably mounted so as to move the sealer for operational purposes without exposing the heated surface to the machine operator; the provision of such a machine with an improved stripper system for stripping product down and out of the region of the tubing which is to be transversely sealed; the provision of such a machine which operates in a self-regulating mode to run at a speed which is nearly equal to the speed of the product feed system without changing sealing time; and the provision of such a machine which permits an operator to select the amount of opening and closing of the sealing jaws so that the jaws may be partially opened and/or partially closed during each web feed cycle.

In general, form-fill-seal apparatus of this invention comprises an intermittently operating form, fill and seal machine for making packages from a web of material, the machine comprising means for forming the web into tubing, means for moving the web over the web forming means, jaws for sealing the tubing, and means for moving the jaws relative to one another to open and close the jaws. A controller is provided for controlling the operation of the machine, the controller receiving input data defining the package length, cycle time and sealing time and for controlling the operation of the web moving means as a function of the input data, whereby the web is moved one package length within the time remaining in each cycle time taking into account the sealing time.

One of the features of the machine is that it has a measuring roll which is intermittently driven to feed forward a package length increment of the web, means mounting the measuring roll for movement relative to the forming means to steer the web to maintain it in a path aligned with the forming means, means for sensing deviation of the web one way or the other from said path, and means responsive to said sensing means on its sensing a deviation to move the measuring roll to steer the web back into said path.

Another feature is that of intermittently driving the web measuring roll to feed a package length increment of the web forward toward the forming means, variable speed means for feeding the tubing downwardly on the mandrel around which the web is formed into tubing the web being pulled thereby over the forming means under tension, means for sensing the tension in the web upstream from said forming means, and means responsive to the sensing means for varying the speed of the variable speed means relative to the speed of the measuring roll for maintaining the tension in the web at a substantially constant predetermined value.

Another feature is that of sealing jaw apparatus for forming seals at package length intervals across the tubing comprising first and second sealing jaws, the first jaw being movable toward and-away from the second between an open position clear of the tubing and a closed position in sealing engagement with the tubing, and a drive for said first jaw comprising means for moving the first jaw toward the second jaw relatively rapidly to a nearly closed position, and means for completing the movement of said first jaw from said nearly closed position to said closed position and exerting pressure on the tubing for sealing it. The jaw open distance may be programmed to that required to pass the formed tubing to reduce the time to close and open the jaws to a minimum thus reducing the jaw open/close time.

A further feature is that of means for sealing together the lapping margins of the web comprising an arm pivoted for swinging movement on a vertical axis on the frame of the apparatus at one side of the mandrel, a housing horizontally slidable on the arm for adjustment lengthwise of the arm, said arm with the housing thereon being swingable on said axis between an operative position wherein said housing is in front of the mandrel and a retracted position wherein the housing is off to one side from in front of the mandrel, a sealing platen carried by the housing, and means in the housing for moving the platen from a retracted position relative to the mandrel into sealing position engaging the lapping margins of the web on the mandrel for sealing said margins together during a dwell of the tubing between feed cycles.

An additional feature is that of stripping means comprising a pair of stripper members operated independently of the jaws movable relative to one another from an open position with respect to the tubing to a closed position squeezing the tubing, and movable while in their open position from a lowered position below the sealing members up between the opened sealing members to a raised position above the sealing members, then movable; to their closed position and down in their closed position to their lowered position for stripping product from within the region of the tubing to be sealed.

Other objects and features will be in part apparent arid in part pointed out hereinafter.

BRIEF DESCRIPTION OF THE DRAWINGS

FIG. 18 is a view generally on line 18—18 of FIG. 16;

FIG. 19 is a view generally in section on line 19—19 of FIG. 16 showing detail of an adjustment mechanism of the longitudinal seam sealing means;

FIGS. 36, 37A–C and 38 are timing diagrams.

Corresponding reference characters indicate corresponding parts throughout the drawings.

DETAILED DESCRIPTION

Figure 1:
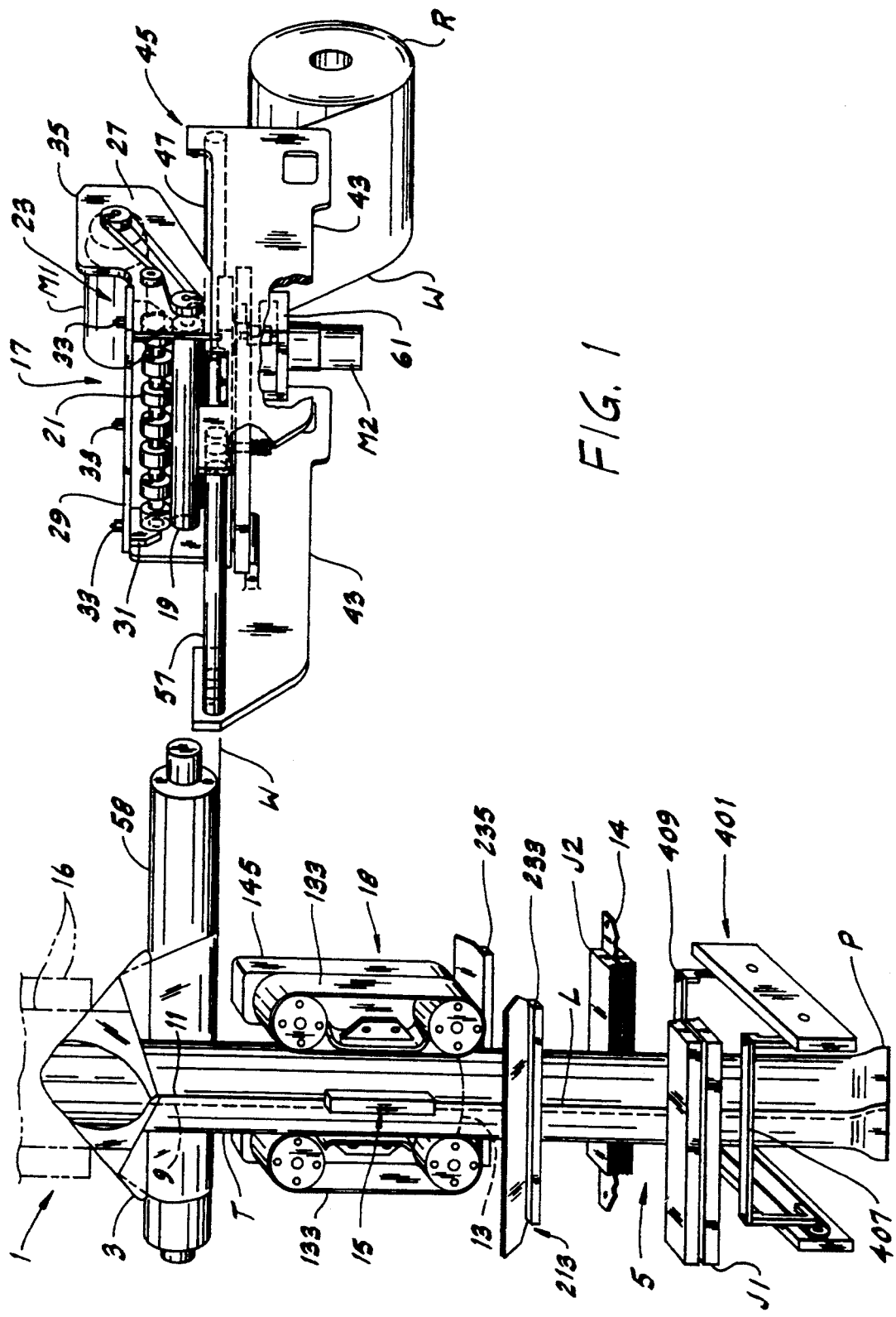
FIG. 1 is a general perspective of apparatus of this invention.
Figure 2:
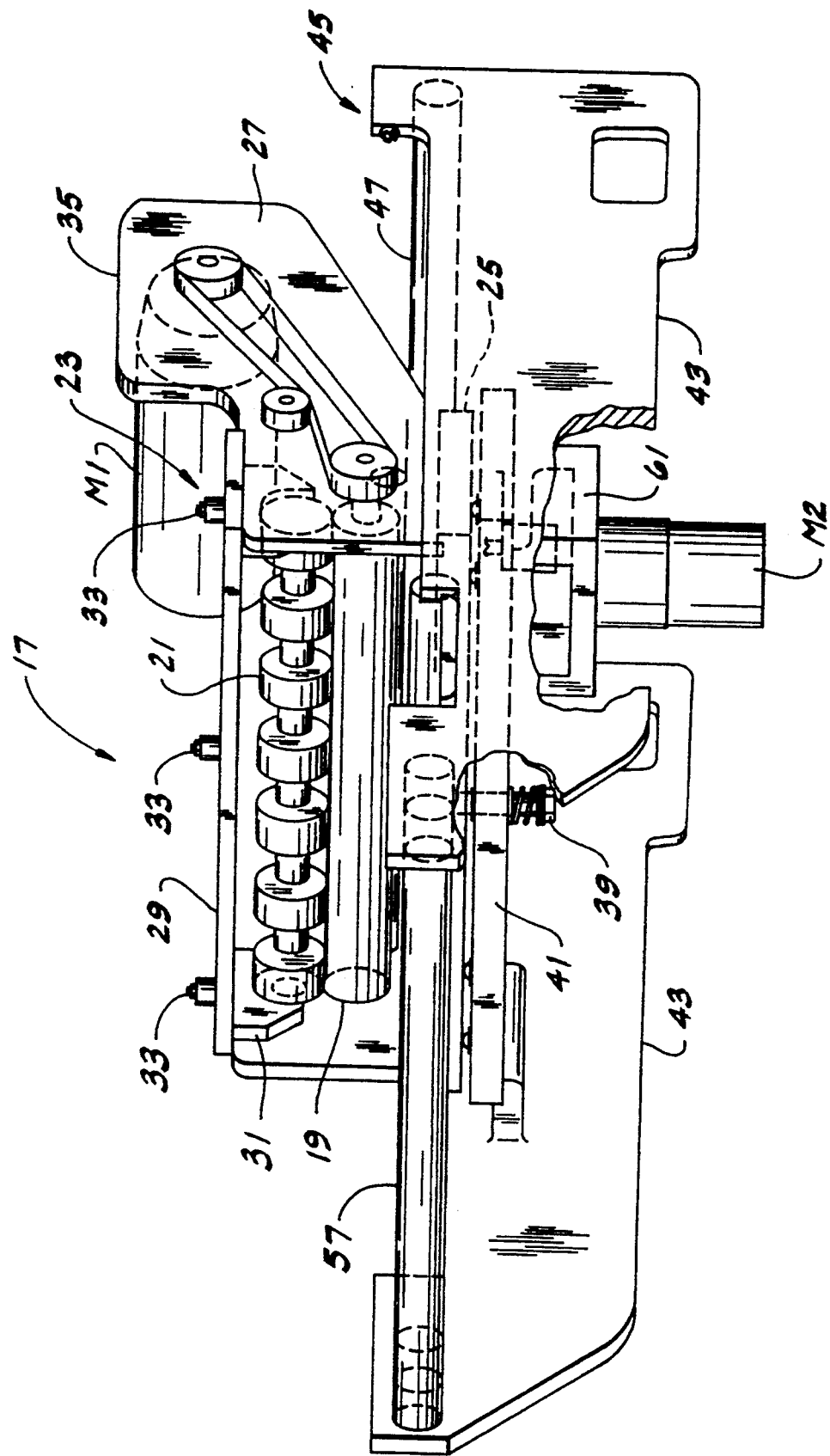
FIG. 2 is an enlarged fragment of FIG. 1, with parts broken away and shown in section; showing web feeding and measuring means, web tracking means, and web tension sensing means of the apparatus.
Figure 3:
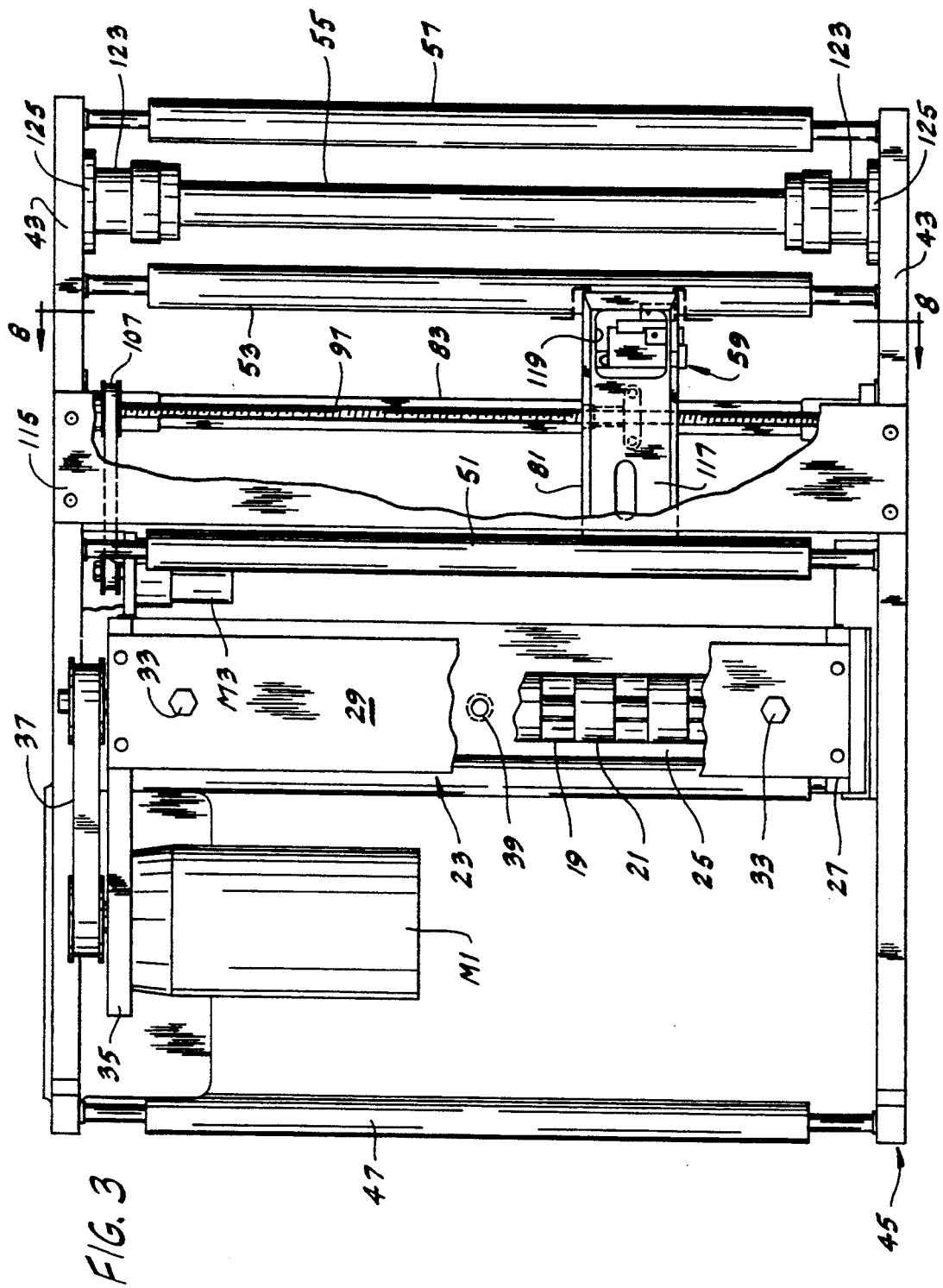
FIG. 3 is a plan of FIG. 2 with parts broken away.
Figure 4:
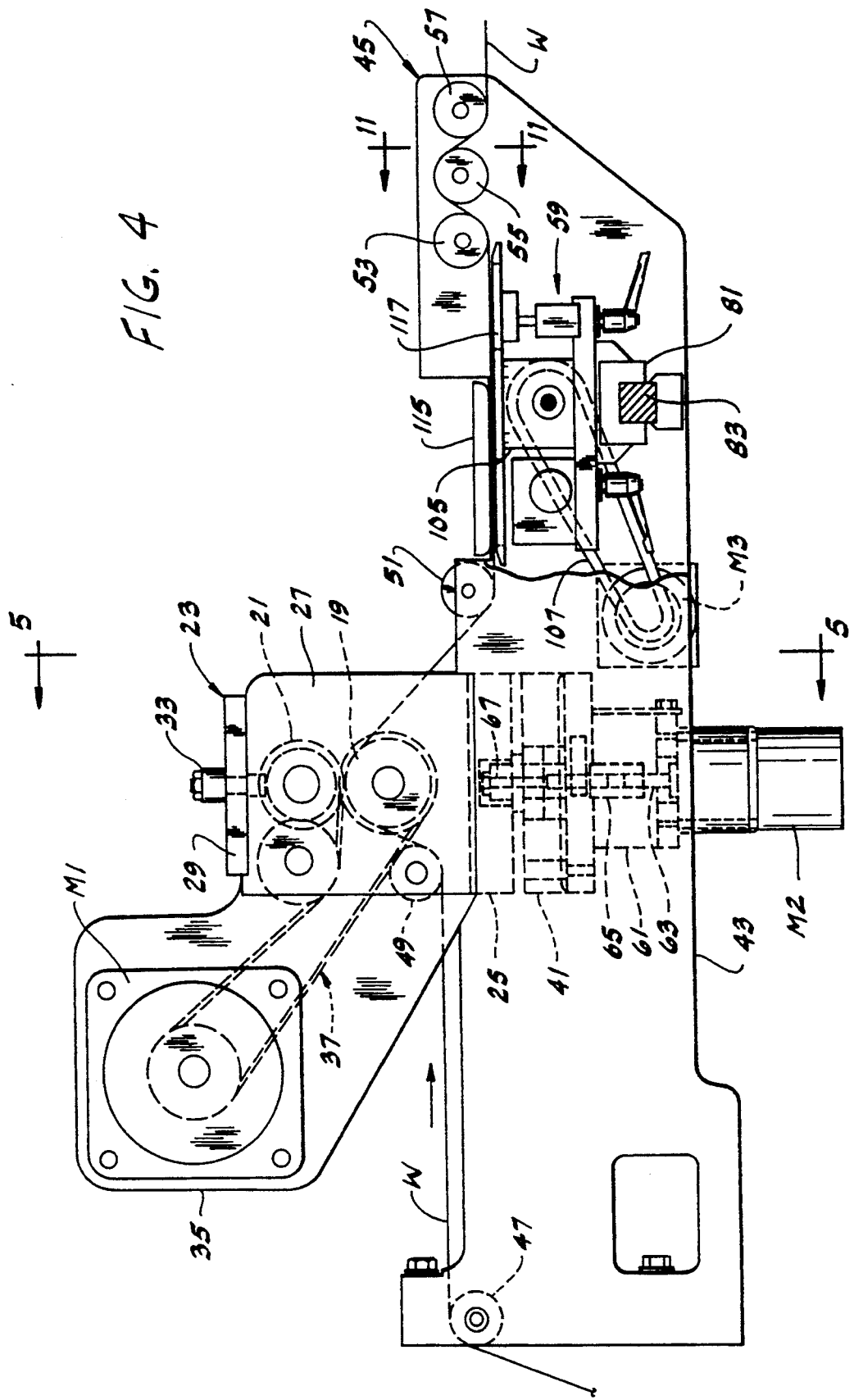
FIG. 4 is a side elevation of FIG. 3 with parts broken away.
Figure 5:
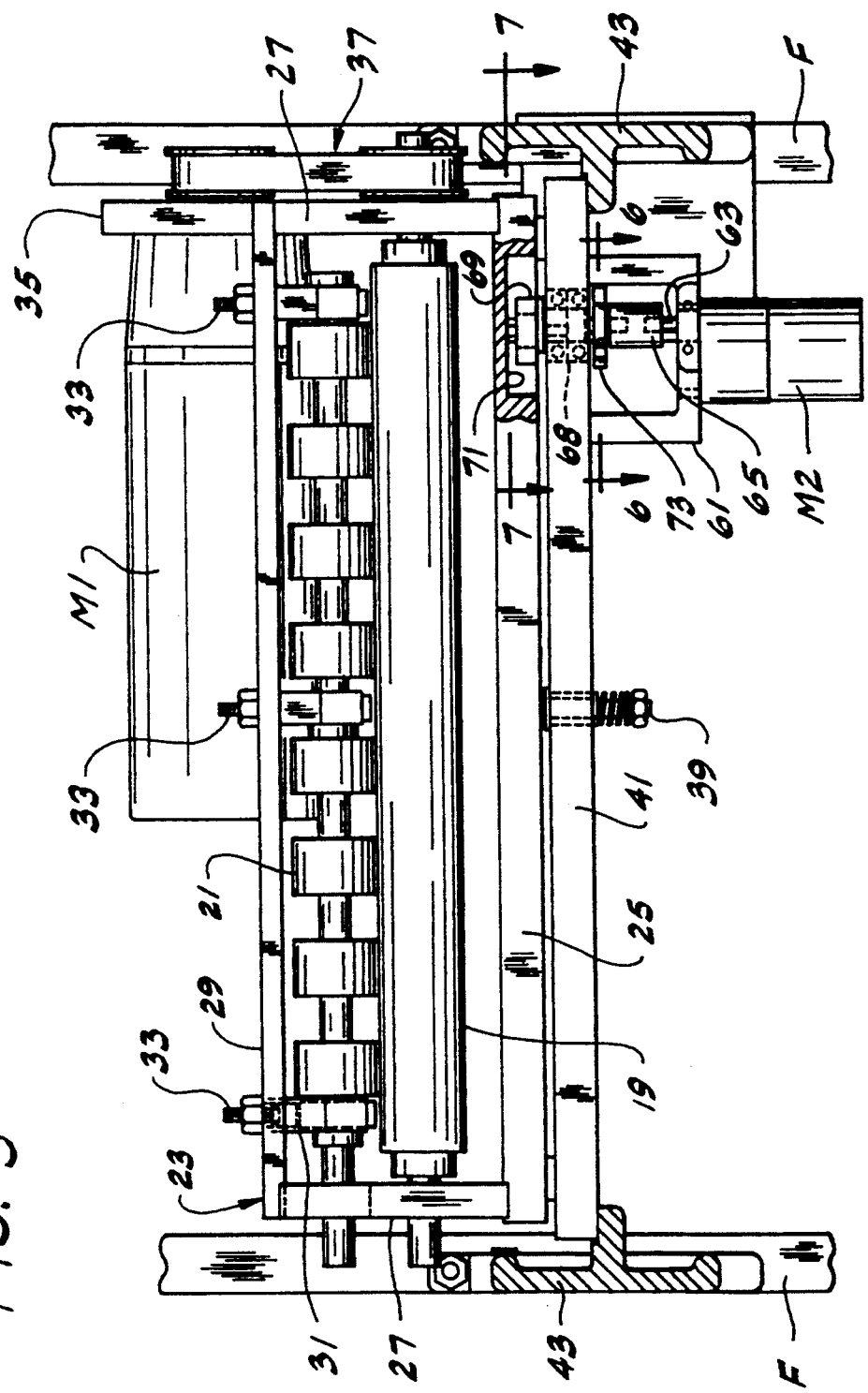
FIG. 5 is a vertical transverse section on line 5—5 of FIG. 4.
Figure 6:
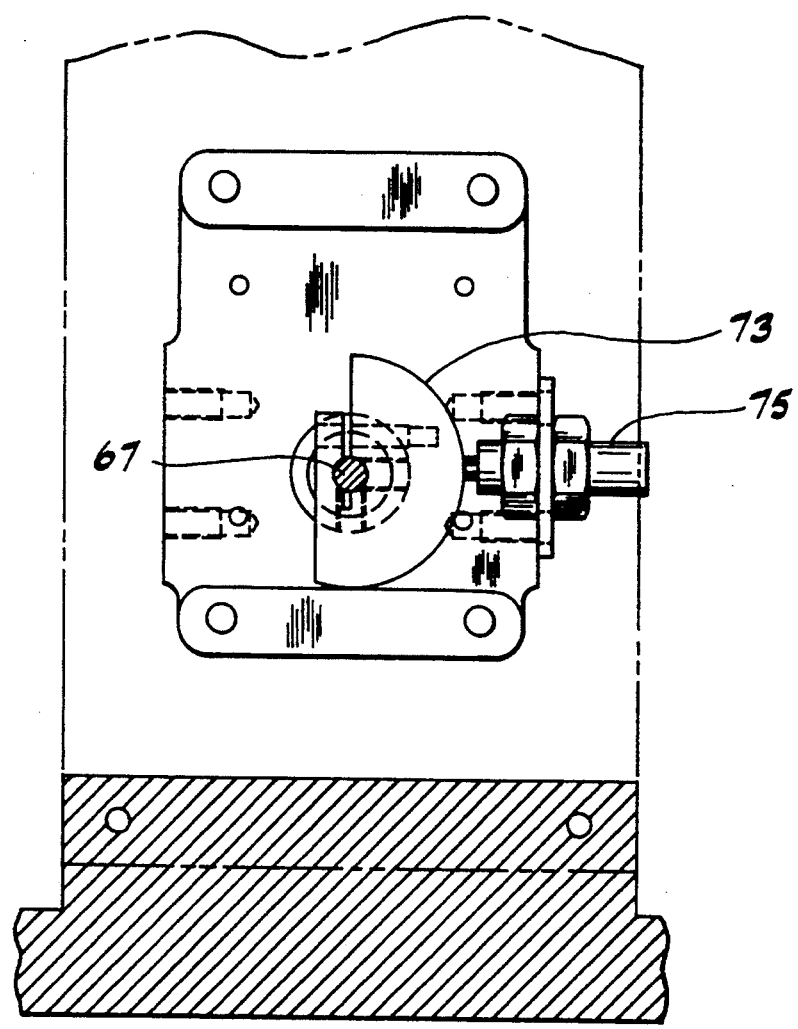
FIG. 6 is an enlarged horizontal section on line 6—6 of FIG. 5.
Figure 7:
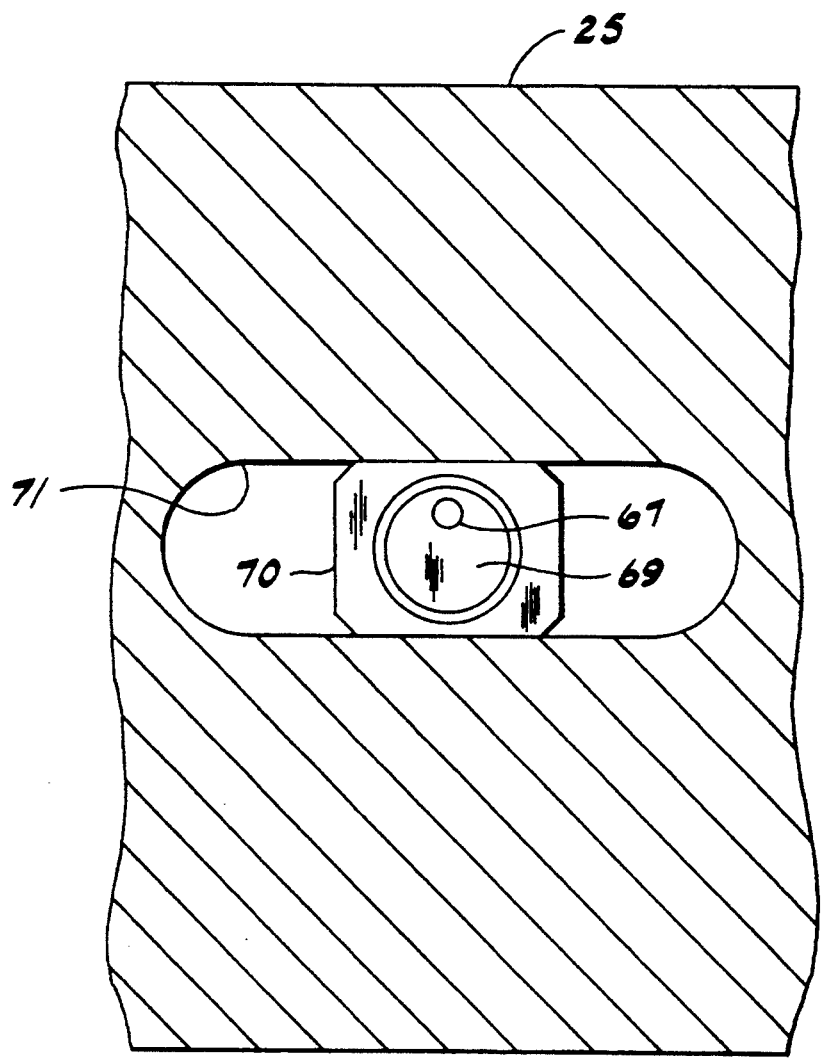
FIG. 7 is an enlarged horizontal section on line 7—7 of FIG. 5.
Figure 8:
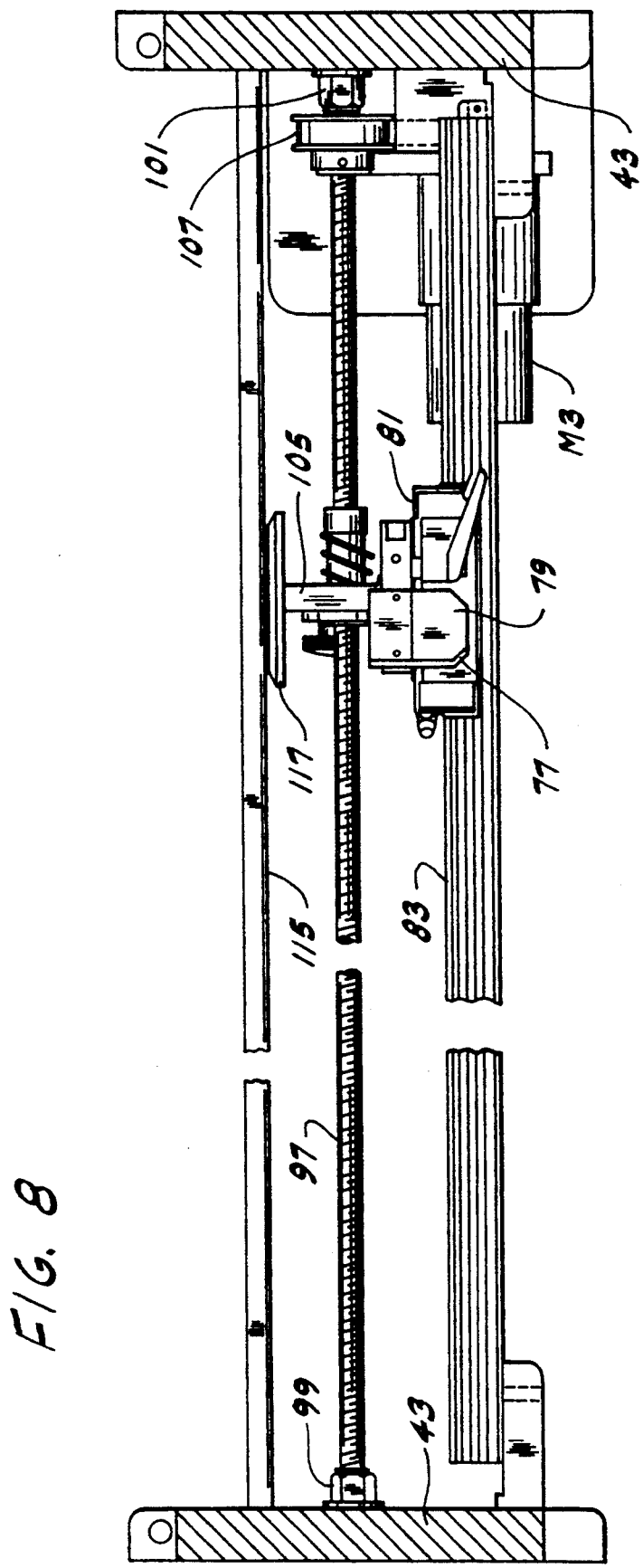
FIG. 8 is a vertical transverse section on line 8—8 of FIG. 3.
Figure 9:
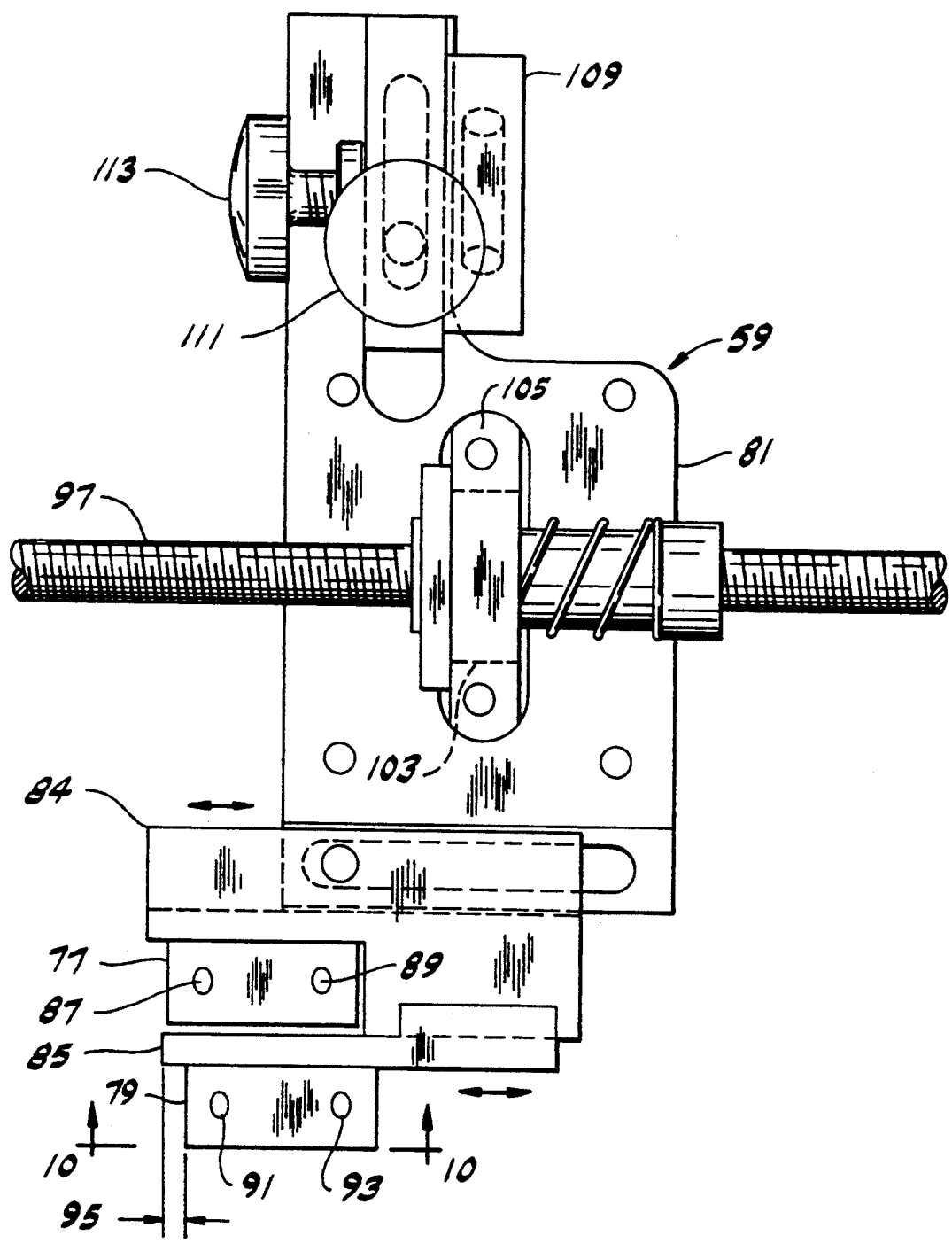
FIG. 9 is an enlarged fragment of FIG. 3, with parts broken away.

Referring to the drawings, first more particularly to FIG. 1, there is generally indicated at 1 vertical form-fill-seal apparatus of this invention, in which a web W of flexible packaging material (e.g. plastic film) is pulled from a supply and fed over means 3 for forming the web into tubing T. Product to be packaged is introduced (in any of various suitable well-known ways) into the tubing, and sealing operations are performed on the tubing as generally indicated at 5 to seal it to form packages. The packaging material may be low density polyethylene film, for example, and the supply may be constituted by a roll R of the film. The forming means 3 may be a forming shoulder generally of a conventional type such as shown for example, in the James patent and in coassigned U.S. Pat. Nos. 3,050,906 issued Aug. 28, 1962, 3,449,888 issued Jun. 17, 1969, and 3,664,086 issued May 23, 1972.

As illustrated, the forming shoulder 3 forms the web W of packaging material into the tubing T with the longitudinal margins 9 and 11 of the web W in lapping relationship, and directs the tubing downwardly around a vertically extending, hollow mandrel 13 (also as shown, for example, in the above-mentioned U.S. patents), with margin 9 on the inside and margin 11 on the outside overlapping margin 9. At 15 in FIG. 1 is diagrammatically indicated means for sealing the lapping margins 9 and 11 of the web to form a longitudinal seam for the tubing. Product is introduced into the tubing T via means indicated generally at 16 for intermittently delivering measured charges of product into the hollow mandrel 13 in suitable conventional manner, and the tubing is transversely sealed at package length intervals by the sealing means indicated at 5 below the lower end of the mandrel. The sealing means 5 may, for example, comprise a pair of sealing jaws J1 and J2 operable in a fixed horizontal plane below the lower end of the mandrel to form a top seal for the package being completed and the bottom seal for the next package to be formed. As illustrated, jaw J1 is at the front of the machine in front of the tubing T and is referred to as the front jaw, and jaw J2 is in the rear of the tubing and is referred to as the rear jaw. The rear jaw J2 has cutting means incorporated therein such as the knife indicated at 14 in FIGS. 1, 23 and 25 for cutting transversely between the seals made at 5 to separate the completed package P from the tubing. The tubing is intermittently fed forward, which is downward, one package length increment, the jaws J1 and J2 being open. The tubing dwells between successive feed cycles, the jaws being closed on the tubing for the transverse sealing operation during each dwell.

The web W is intermittently pulled from supply roll R, measured to provide a package length increment of the web on each operation, and fed forward toward the forming shoulder 3 by means indicated generally at 17 located between the supply roll R and the forming shoulder. This means is intermittently operable to apply a forward force to the web at a position between the supply roll R and the forming shoulder 3 for feeding the web forward one package length increment in a given interval. Thus, it acts as a web feeding and measuring or metering means. The increment of web fed forward by this means is taken up and pulled over the forming shoulder 3 under tension by tubing feeding means indicated generally at 18 below (downstream from) the forming shoulder comprising a pair of pull belts. As illustrated, the web feeding and measuring means comprises a lower measuring roll 19 over which the web W is trained and an upper pinch roll. 21 (preferably a segmented roll as illustrated) above the measuring roll for pressing the web down on the measuring roll. These rolls are mounted in a roll carrier 23 generally in the form of an open elongate rectangular frame having a flat bottom member 25 constituted by a plate, side members each designated 27, arid a top member 29 (also constituted by a plate), spanning the side members. The measuring roll 19 is journalled at its ends in the side members for rotation on a horizontal axis. The pinch roll is received in forked members such as indicated at 31 engaged by adjustment means such as indicated at 33 for adjusting the pressure exerted by the pinch roll on the web W travelling over the measuring roll. One of the side members 27 has a rearwardly extending arm 35 carrying a programmable drive means, more particularly a servo motor M1, for intermittently driving the measuring roll 19 via a belt and pulley drive 37. The roll carrier 23 is pivotally mounted as indicated at 39 for swinging movement about a vertical axis at the center of length of the bottom plate 25 of the carrier on a cross beam 41 extending between side plates 43 of a fixed roll carrier supporting subframe designated in its entirety by the reference number 45. This subframe is suitably supported in fixed position at the upper rear of the machine by the main frame F of the machine. The web W coming from the supply roll R is guided for travel in a predetermined path around a guide roller 47 extending between the side plates 43 at the rear of the subframe 45, thence around a guide roller 49 extending between the side members 27 of the pivoted roll carrier 23, thence up, over and around the measuring roll 19, thence around and under a guide roller 51 extending between the side plates 43, thence under and around a guide roller 53, up and around a tension sensing roller 55 and down and around a guide roller 57 extending between the side plates 43 and thence around and up a guide roller 58 to the tube former 3.

At M2 is indicated a motor and an associated speed reducer for swinging the pivoted roll carrier 23 on its vertical pivot axis at 39 for accurate tracking of the web in the course of its travel to the forming shoulder 3. This motor is under control of web edge sensor means indicated in its entirety at 59 through which one of the margins of the web travels downstream from the set of rolls 19 and 21 upstream of the tension sensing roller 57. The edge sensor means 59 senses deviation of the web from its proper alignment in its path toward the forming shoulder 3 and acts to energize the motor M2 for operation in one direction or the other to oscillate the roll carrier carrying the measuring roll 19 and the pinch roll 21, in one direction or the other on its pivot at 39 to steer the web back into proper alignment. The motor M2 is affixed at one end constituting its upper end to the bottom of a motor mount 61 which extends down from the cross beam 41 of the roll carrier supporting subframe 45. The output shaft 63 of the motor M2 extends up into the motor mount 61 and is coupled as indicated at 65 to a vertical shaft 67 journalled in bearings 68 in the cross beam. At the upper end of shaft 67 is an eccentric 69 rotatable in a slide block 70 slidable in a groove 71 in the bottom of the bottom plate 25 of the pivoted roll carrier 23 adjacent one of its side plates 27. The eccentric 69 has a home position wherein the roll carrier 23 and the measuring roll 19 extend transversely of the apparatus at right angles to the predetermined path of the web W. On rotation of the eccentric by the motor in one direction away from the home position, the roll carrier is swung one way and on rotation of the eccentric by the motor in the other direction the roll carrier is swung the other way. At 73 is indicated a cam rotatable with the motor shaft with which is associated a proximity switch 75, the operation of which will be subsequently described.

Referring more particularly to FIGS. 3, and 8–10, the web edge sensor means 59 comprises first and second electric eye units 77 and 79 carried by a carriage 81 slidable transversely of the apparatus between the side plates 43 of the subframe on a rail 83 extending between plates 43 at a level below the level of the path of the web as it travels from the guide roller 51 to the guide roller 53. Both electric eye units are mounted on an adjustment block 84 adjustable laterally with respect to the apparatus on the carriage. The second electric eye unit 79 is mounted on a member 85 adjustable laterally with respect the apparatus on the adjustment block 84. The arrangement is such that the two electric eye units are adjustable relative to one another on the adjustment block to various positions of lateral offset of one to the other and so adjusted, conjointly laterally adjustable by transvering the carriage. The electric eye unit 77 has a light emitter 87 for emitting a first beam of light B1 (FIG. 10) extending upwardly at an angle off vertical and an eye 89 for receiving the beam if reflected back downward off the bottom surface of the web travelling in said web path, the arrangement being such that the axis of the emitter and the axis of the eye intersect generally in the horizontal plane of the web path. Similarly, the electric eye unit 79 has light emitter 91 for emitting a second beam of light B2 extending upwardly at an angle off vertical and an eye 93 for receiving the beam if reflected back downwardly off the bottom surface of the web travelling in said web path. The two electric eye units are offset transversely from one another relative to the apparatus as indicated at 95 in FIGS. 9 and 10 so that the beams B1 and B2 emitted by their emitters 87 and 91 are laterally offset. The electric eye Units 77 and 79 are positioned by adjustment of the carriage 81 laterally of the apparatus and by adjustment of the block 84 on the carriage laterally of the apparatus to a position wherein, with the web W tracking properly in its path of travel toward the forming shoulder 3, beam B1 is intercepted by and impinges on the web closely adjacent one of the edges of the web (the right hand edge of the web as viewed in upstream direction in FIG. 10) and is reflected off the bottom surface of the web back downward to the eye 89 of the first electric eye unit, and beam B2 passes by the web outwardly of the web without being intercepted and reflected back to the eye 93. Via circuitry subsequently referred to, if the web should deviate to the left as viewed in FIG. 10 from its proper path and thereby cut off reflection of beam B1 back down to the eye 89, motor M2 is energized to be driven in the direction for oscillating the measuring roll carrier 23 to pivot the measuring roll 19 (and the pinch roll 21) in the direction to steer the web back toward its proper path by a short run pulse per pull cycle. The motor pulses are deenergized when the web returns to the FIG. 10 position wherein beam B1 is reflected back to the eye 89. If the web should deviate to the right as viewed in FIG. 10 from its proper path and thereby cause reflection of the beam B2 back down to the eye 93, motor M2 is energized to be driven in the direction for pivoting the roll carrier 23 to pivot rolls 19 and 21 in the direction to steer the web back toward its proper path by a short run pulse per pull cycle. The motor pulses are deenergized when the web returns to the FIG. 10 position wherein beam B2 passes by the web without being intercepted and reflected back.

Figure 10:
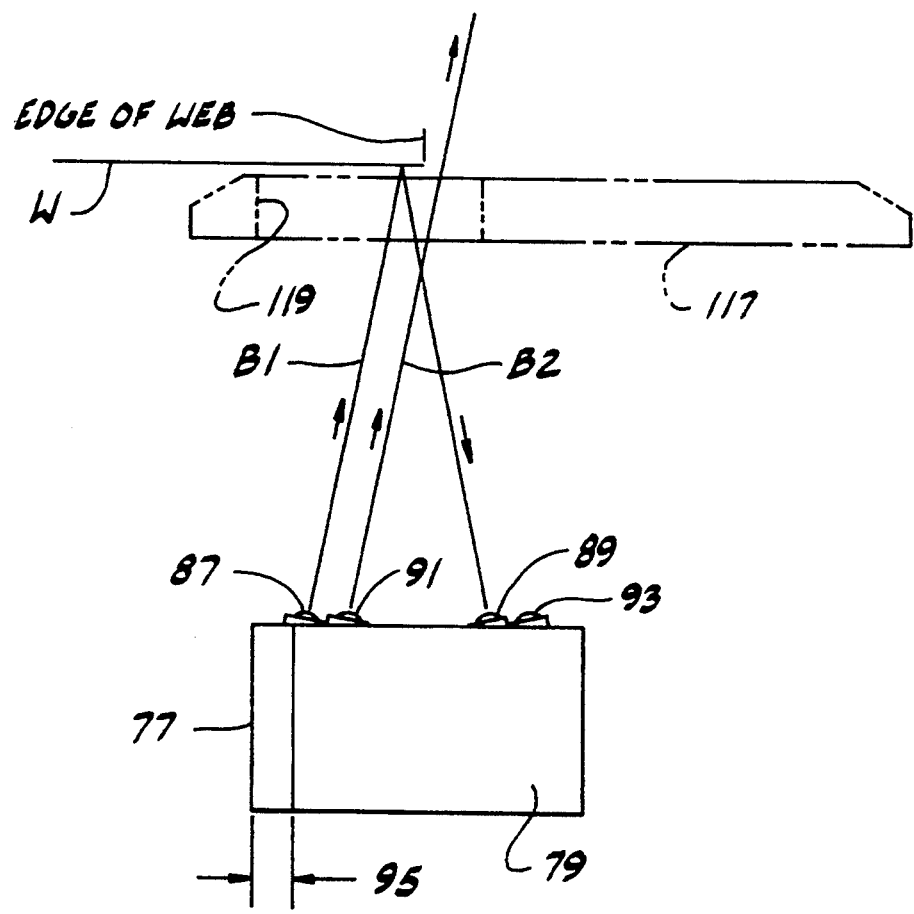
FIG. 10 is a view generally on line 10—10 of FIG. 9.

The carriage 81 carrying the two offset electric; eye units 77 and 79 is adapted to be traversed laterally of the apparatus between the side plates 43 of the subframe 45 by means of a screw-threaded shaft 97 journalled at its ends in bearings 99 and 101 affixed to the side plates 43 of the subframe 45 threaded in a nut 103 in a member 105 secured on the carriage, the arrangement being such that on rotation of the screw shaft in one direction,the carriage is shifted toward the left and on rotation of the shaft in the other direction, the carriage is shifted toward the right. At M3 is indicated a motor with an associated speed reducer suitably mounted at the right of the subframe 45 as viewed in FIG. 8 with a belt and pulley drive as indicated at 107 connecting the shaft of the motor and the threaded shaft 97 for rotating the latter for the lateral adjustment of the carriage 81. It will be understood that carriage 81 is adjusted to a position in accordance with the width of the web to position the sensing apparatus to sense the position of the one edge of the web (the right hand edge as illustrated in FIG. 10). The carriage 81 may also carry an electric eye unit such as indicated at 109 for detecting registration marks on a pre-printed web having registration marks spaced at package length intervals when such web is used for making packages, with the electric eye unit adjustable longitudinally with respect to the apparatus and adapted to be locked in adjusted longitudinal position by a knob 111 and adjustable angularly with respect to the carriage and adapted to be locked in adjusted angular position by a knob 113. In its travel from the guide roller 51 to the guide roller 53, the web travels under plate 115 spanning the side plates 43 of the subframe 45 and over a head plate 117 on the member 104 extending up from the carriage 81. The plate 117 has an opening such as indicated at 119 in FIG. 3 for passage of the light beams D1 and B2.

Figure 11:
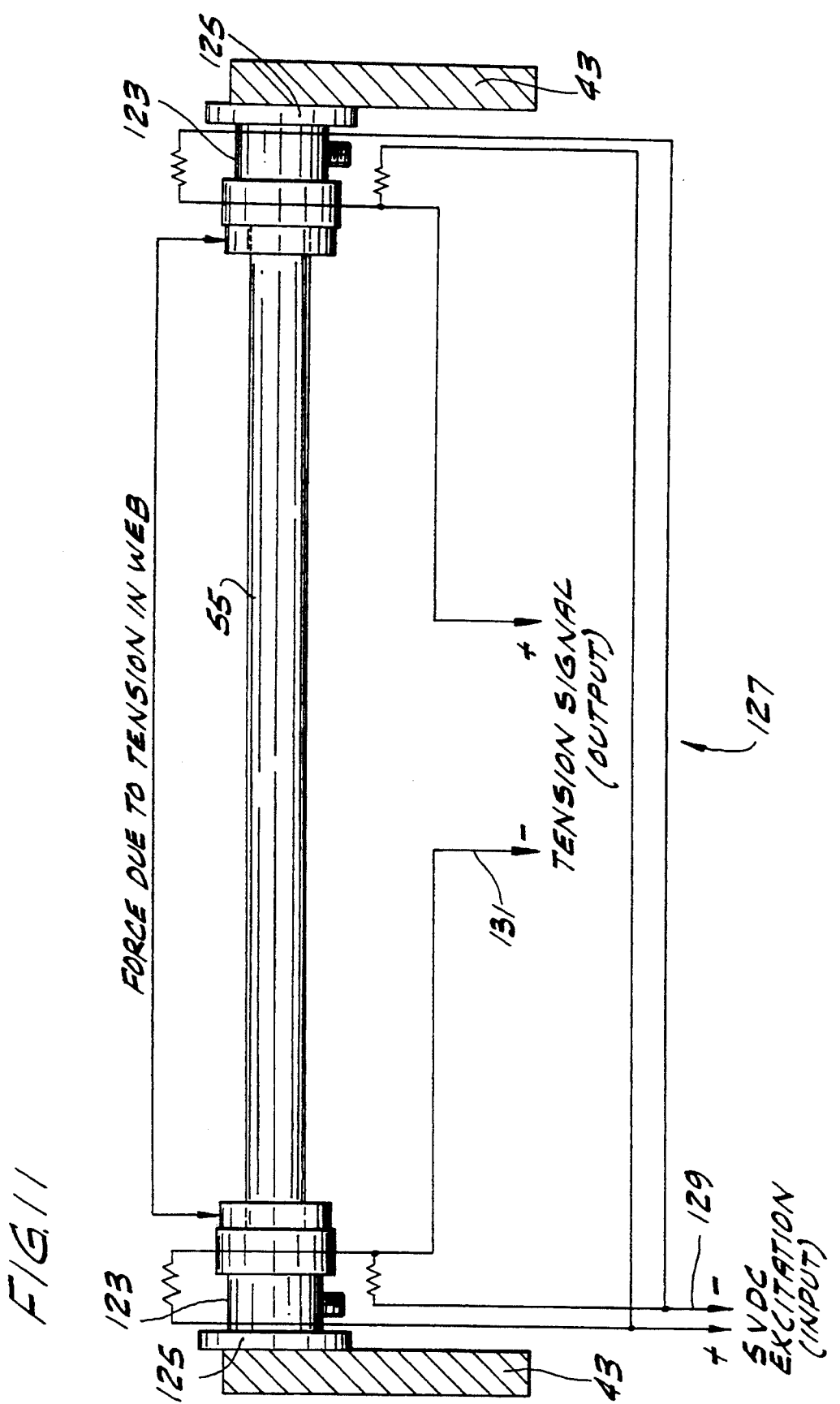
FIG. 11 is a vertical transverse section on line 11—11 of FIG. 4 including certain electrical circuitry.
Figure 12:
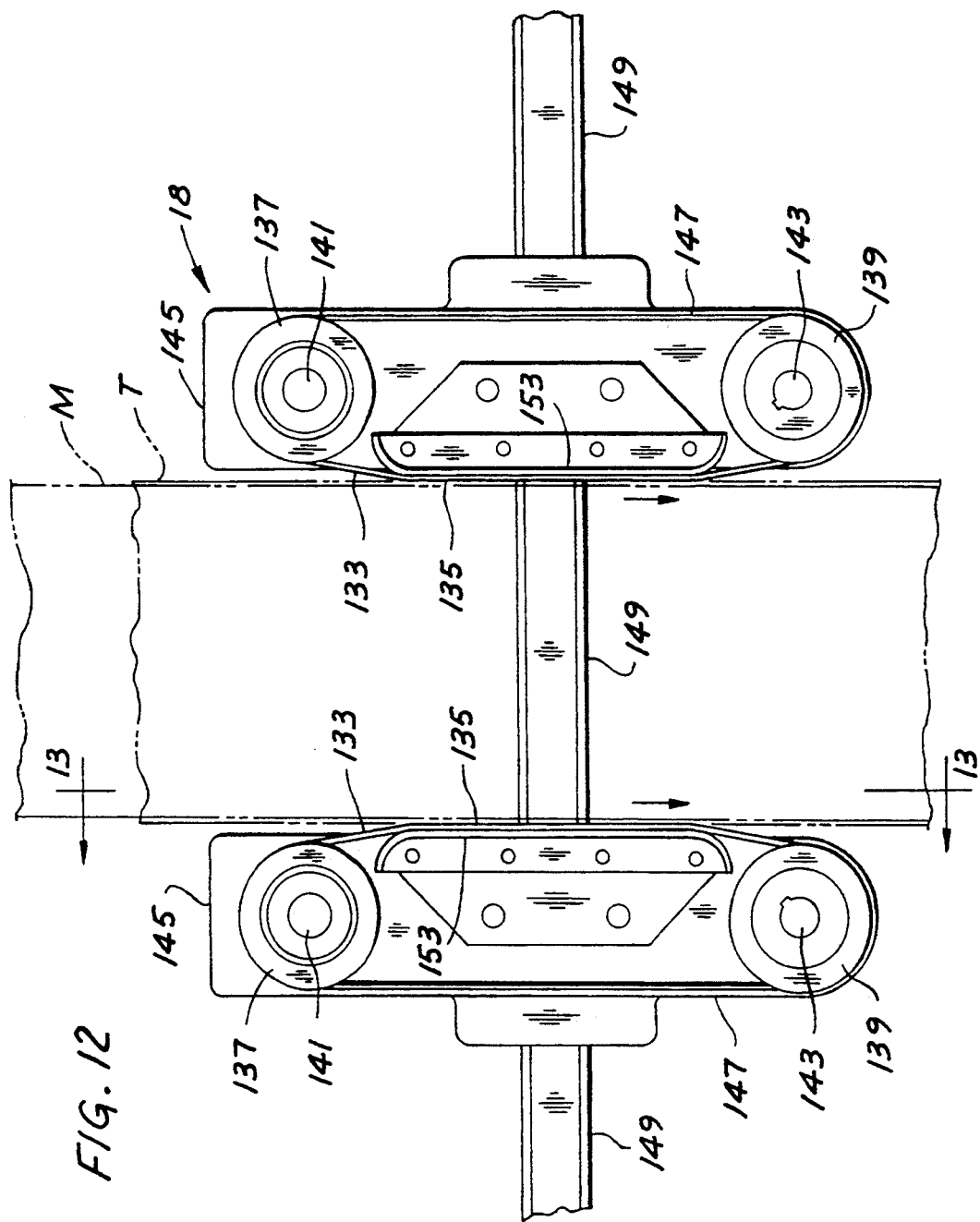
FIG. 12 is a view in front elevation of the pull belt component of the apparatus.
Figure 13:
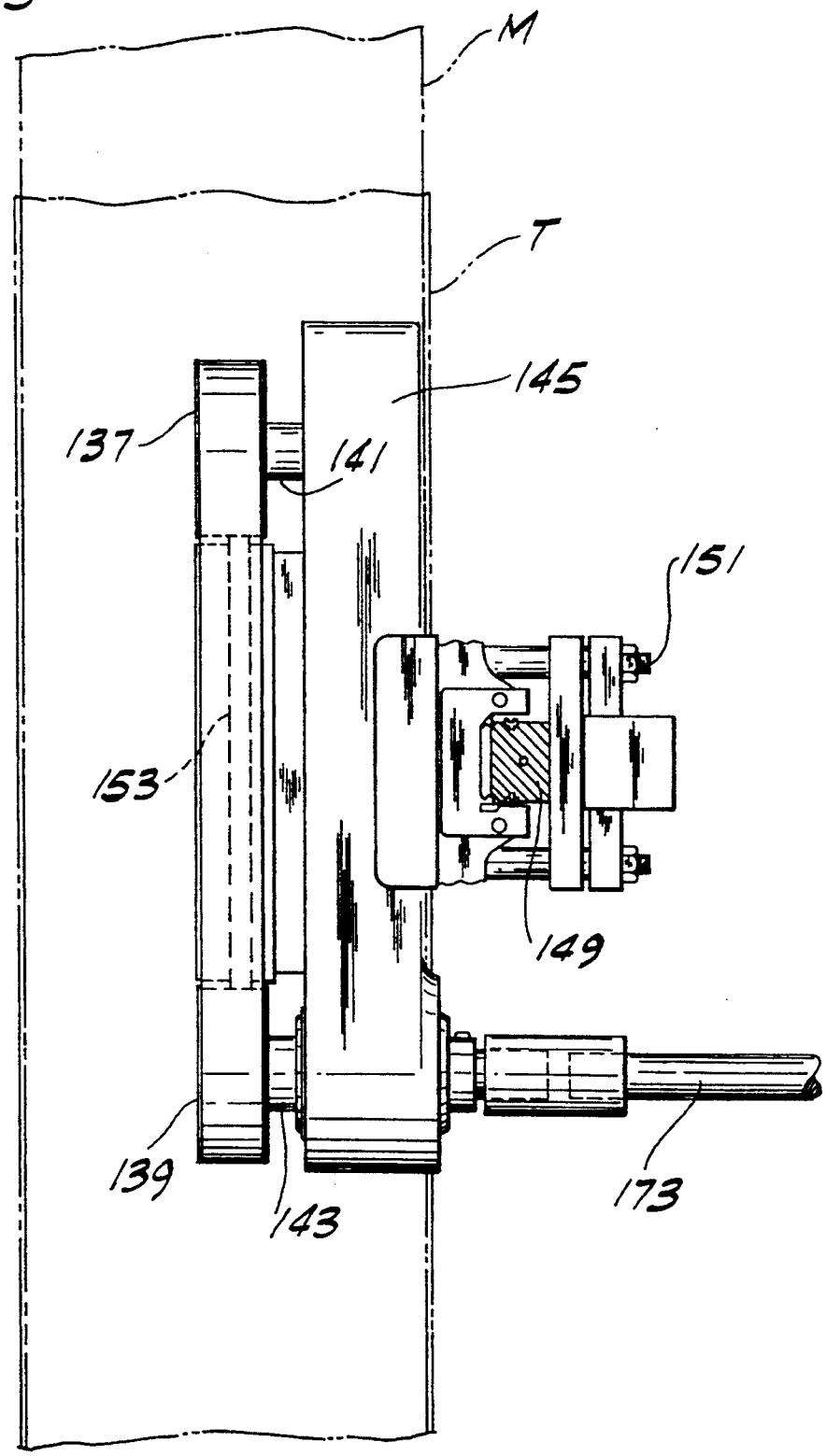
FIG. 13 is a vertical transverse section on line 13—13 of FIG. 12.

As noted above, in the course of its travel from the nip of the measuring roll 19 and pinch roll 21 to the forming shoulder 3, the web W travels up and around the tension sensing roller 55. The latter is mounted at its ends in tension-sensing transducers 123 attached as indicated at 125 on the inside of the side plates 43 of the subframe 45 adjacent the downstream (front) end of the latter, the roller 55 being located between the rollers 53 and 57 with the arrangement such that the web tension is applied as a downward force on the transducers and measured whereby, without any appreciable downward deflection of the roller 55. These transducers are commercially available items, preferably Model C Tension Transducers sold by Dover Flexo Electronics, Inc., 99 Pickering Road, Rochester, N.H. U.S.A. At 127 (FIG. 11) is indicated electrical circuitry for the transducers having an excitation input at 129 and a tension signal output at 131, this signal being proportional to the web tension. This output signal is transmitted to a control for the drive for the pull belts of the tubing feeding means 18 to maintain the web under substantially constant tension, pre-set for the web material being used. Generally, the measuring roll and the pull belts are driven at a particular velocity ratio, e.g., a ratio of one for the measuring roll to slightly greater than one for the pull belts. The transducers sense the tension in the web. If this tension is less than that which has been pre-set for the particular web material being used, the velocity of the pull belts is increased relative to the measuring rolls on the next pull cycle (i.e., the velocity ratio is changed so that the tension is brought back up to the desired tension. If the web tension as measured at the end of a pull cycle is greater than that which has been pre-set, the velocity of the pull belts is decreased to reduce the tension to the desired value.

Figure 14:
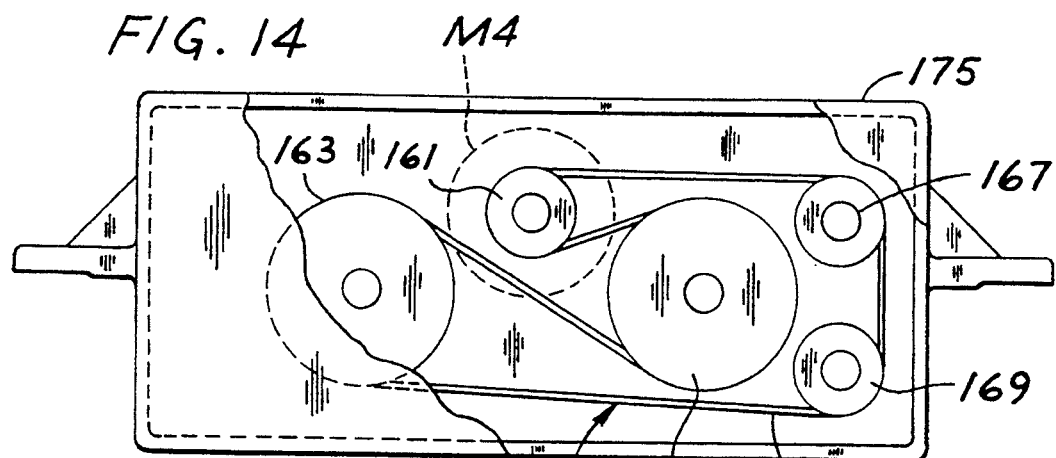
FIG. 14 is a view in rear elevation of means for driving the pull belts.
Figure 15:
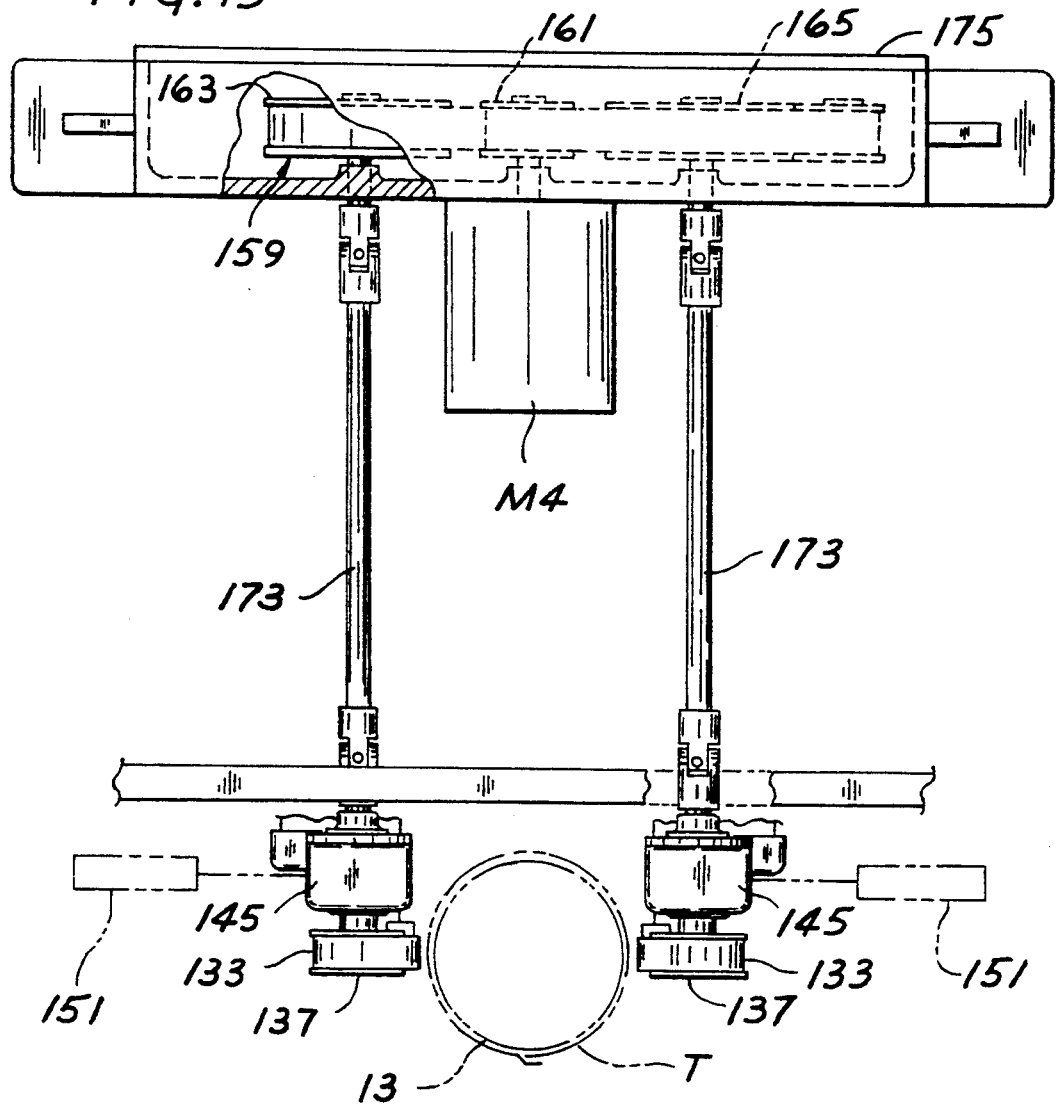
FIG. 15 is a view generally in plan of the means for driving the pull belts.
Figure 16:
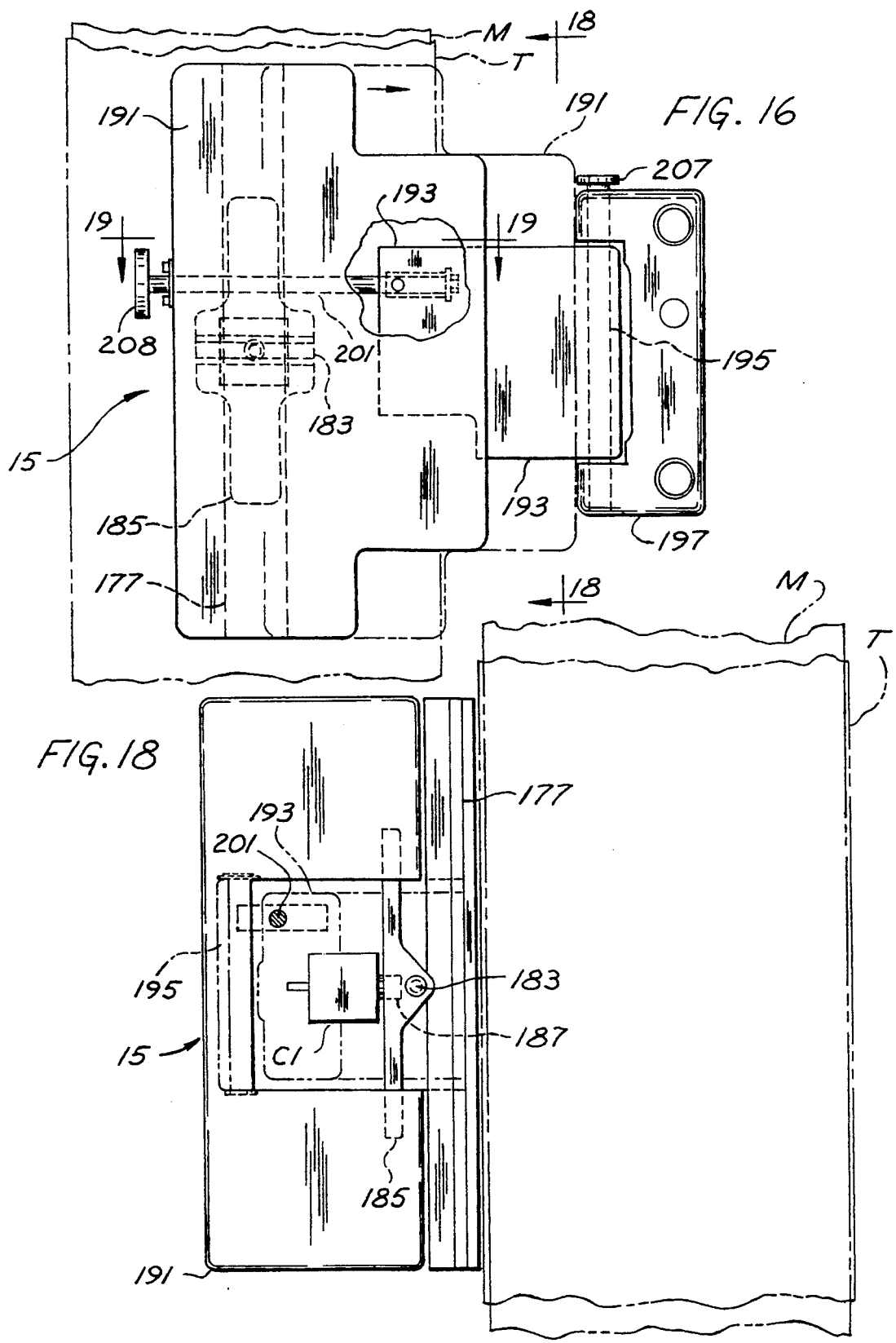
FIG. 16 is a front elevation of the longitudinal seam sealing means of the apparatus partly broken away to show interior detail.
Figure 17:
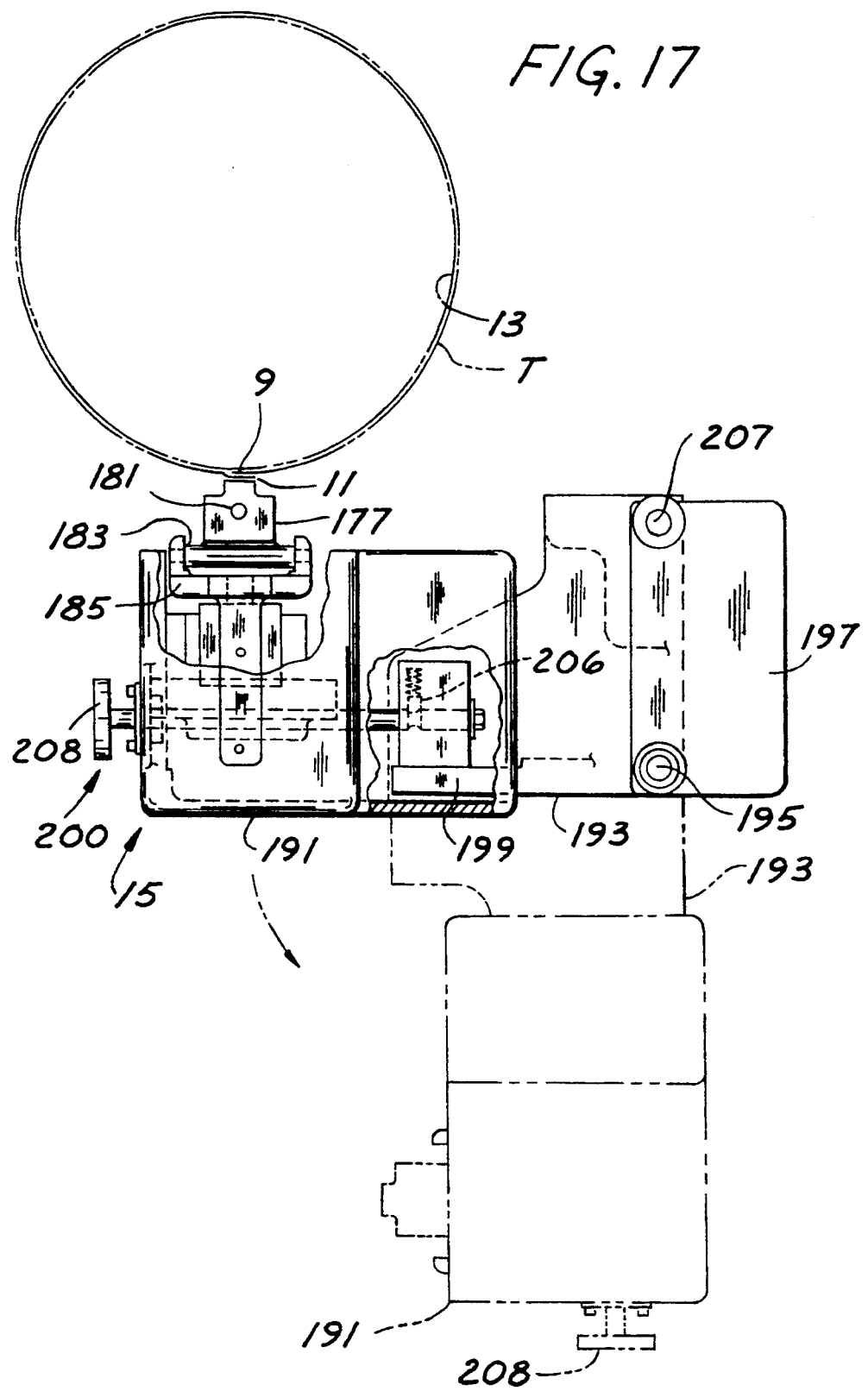
FIG. 17 is a plan of FIG. 16, partly broken away to show interior detail, and showing a moved position of parts in phantom.
Figure 20:
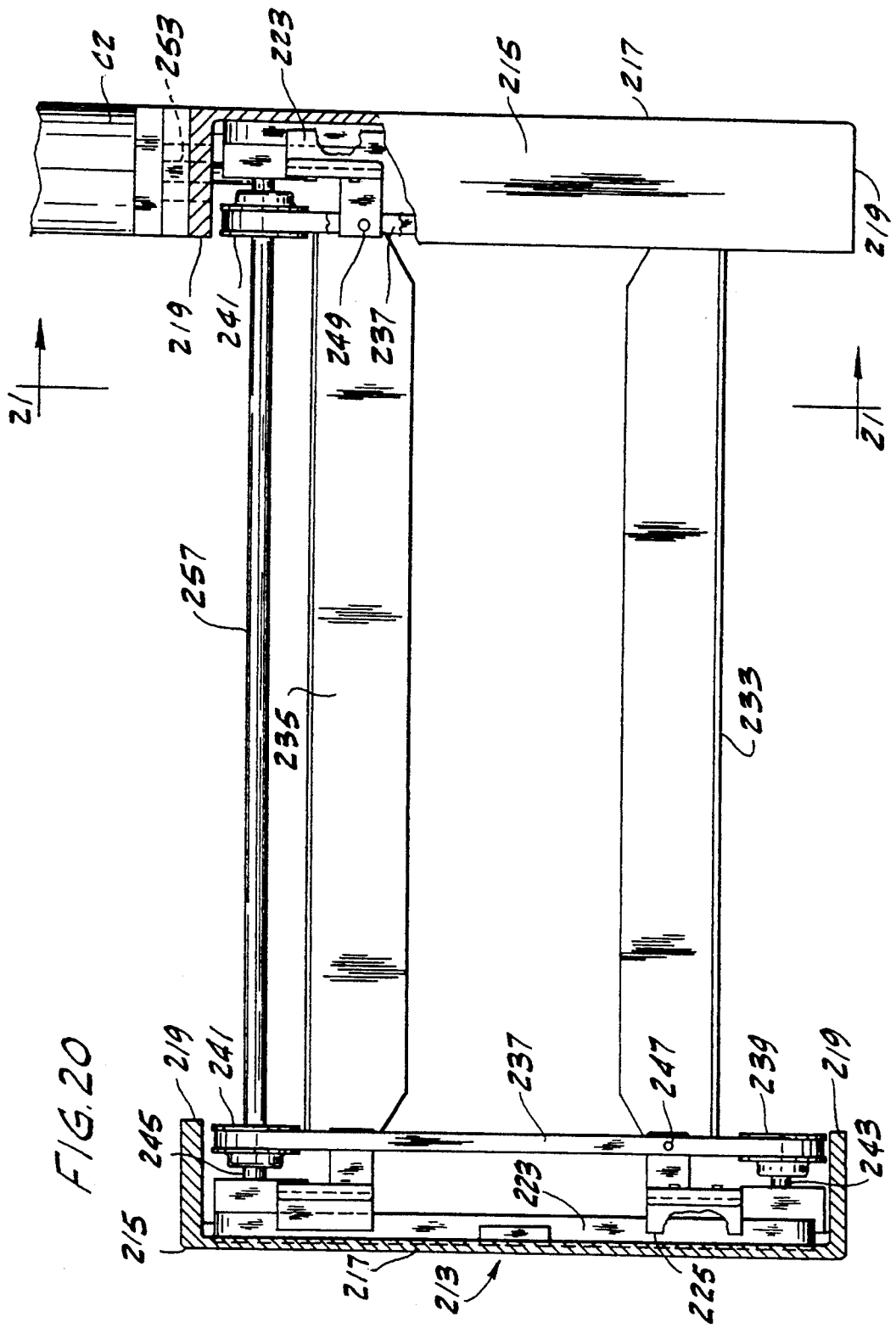
FIG. 20 is a plan view of a stager means of the apparatus, showing stager bars of this means in an open position.

Referring to FIGS. 12–15, the tubing feeding means 18 is shown to comprise a pair of endless belts each designated 133 at opposite sides of the mandrel 13 and each having an inner reach 135 engaging the tubing T on the mandrel, with the belts operable intermittently for feeding the tubing T down on the mandrel and off the lower end of the mandrel one package length increment concurrently with each operation of the measuring roll 19. Each belt is trained around an upper pulley 137 and a lower pulley 139 on upper and lower shafts 141 and 143 journalled for rotation in a block 145, each belt having said inner reach 135 for driving engagement with the tubing T at the respective side (the left side or the right side of the mandrel 13 as the case may be) and movable downwardly for feeding the tubing downwardly on the mandrel, and an outer upwardly movable return reach 147. The blocks 145 carrying the two belt and pulley systems are slidable in and out relative to the mandrel 13 at opposite sides of the mandrel at the front of the machine (as viewed in FIG. 1) for appropriate frictional engagement of the inner reaches 135 of the belts with tubing T on the mandrel, the blocks being slidable laterally with respect to the mandrel on a horizontal rail 149 which extends laterally with respect to the mandrel in back of the mandrel. Air cylinders such as indicated at 151 in FIG. 15 are provided for biasing the blocks 145 toward the mandrel and for retracting them away from the mandrel. At 153 are indicated back-up guides. Pressure in the cylinders is regulated for purposes to obtaining appropriate pressure of the pull belts on the tubing T on the mandrel.

The pull belts 133 are intermittently driven for feeding the tubing T downwardly on the mandrel 13 (i.e., driven in the direction for downward travel of their inner reaches 135) by programmable drive means shown in FIGS. 14 and 15 to comprise a single servo motor M4 driving a belt and pulley drive 159 comprising a drive pulley 161 driven by the servo motor M4, a first driven pulley 163 for driving one of the pull belts, a second driven pulley 165 for driving the other pull belt, two idler pulleys 167 and 169 and an endless belt 171 trained around the pulleys in such manner as to drive the first driven pulley 163 in the appropriate direction for driving the belt 133 driven thereby in the appropriate direction and to drive the second driven pulley 165 in the opposite direction. Thus, the belt 171 is so trained around the pulleys as to drive the first driven pulley 163 clockwise and the second driven pulley 165 counterclockwise as viewed in FIG. 14. Each driven pulley is connected by a universal drive means such as indicated at 173 in FIGS. 13 and 15 to drive a respective lower shaft 143 of the respective pull belt system, the universal drive means being provided to permit the requisite lateral adjustment of the pull belt systems, e.g., adjustment for utilization of different sizes of mandrels at 13. The servo motor M4 and the belt and pulley system driven thereby are carried by a housing such as indicated at 175 which is mounted in suitable position on the frame F of the machine in back of the mandrel 13. The belt 171 is preferably a double-sided timing (cog) belt and the pulleys 161 etc. accordingly are timing (cog) pulleys.

Referring to FIGS. 16–19, the means 15 for sealing the lapping margins 9 and 11 of the web W to form the longitudinal seam L for the tubing T is shown to comprise an elongate narrow heat-sealing platen 177 movable into and out of sealing engagement with that margin of the web (e.g., 9) which overlaps the other on the mandrel. The platen 177, which extends vertically, has an electrical resistance heating element 181 and a temperature sensor therein for heating it to a correct temperature for effecting heat sealing of the lapping margins of the web when it is moved into pressurized engagement with the margins of the tubing on the mandrel. It is pivoted for aligning it with the mandrel on a horizontal axis as indicated at 183 midway of its length (height) on a platen carrier 185. The latter is mounted on the end of the piston rod 187 of an air cylinder C1 mounted in a housing or head 191 which is horizontally slidable on an arm 193 pivoted as indicated at 195 for swinging movement on a vertical axis in a C-shaped bracket 197 mounted on the frame F of the apparatus at one side of the mandrel. Cylinder C1 is under control of a solenoid valve V1. The housing or head 191 is adjustably slidable on the arm 193 between an inner position on the arm (adjacent the bracket 197) in which it is illustrated in phantom lines in FIG. 16 and the outer position on the arm in which it illustrated in solid lines in FIG. 16. The outer position is determined by engagement of the head with a suitable stop such as indicated at 199, and provision is made for fine adjustment of time position of the head on the arm for appropriate engagement of the platen 177 with the lapping margins of the web on the mandrel by means indicated generally at 200 comprising an adjustment screw 201 threaded in a nut 203 and having an annular groove 205 in which is engageable a spring-biased detent 206 when the head is slid out. The screw has a knob 208 by means of which it may be turned one way or the other to run the housing in and out on the arm. The latter is swingable on the pivot 195 to swing the arm 193 and the platen housing or head 191 thereon away from the swung-in position in which they appear ill solid lines in FIG. 17 in front of the mandrel 13 to the swung-out retracted position for maintenance purposes in which they are illustrated in phantom in FIG. 17. Means for locking the arm and the housing in the operative position is shown to comprise a locking pin 207 insertable in holes in the top and the bottom of the bracket and holes in the arm. The platen may be a cold-sealing platen instead of a heat-sealing platen.

Figure 21:
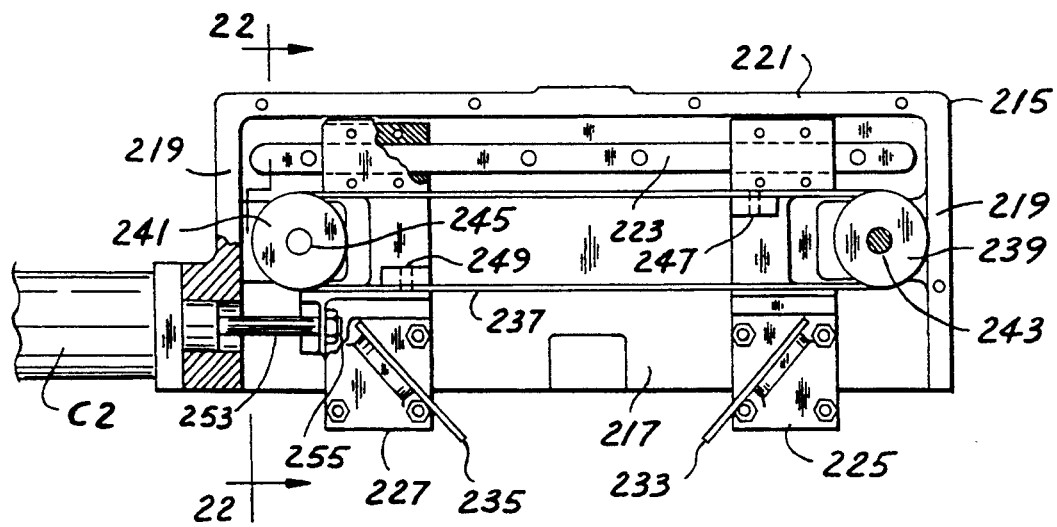
FIG. 21 is a view generally in section on line 21—21 of FIG. 20 showing the stager bars in an open position.
Figure 22:
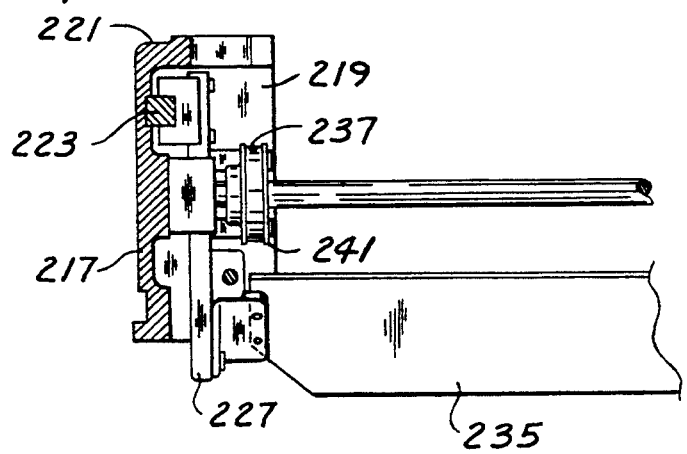
FIG. 22 is a view generally in section on line 22—22 of FIG. 21.

Referring to FIGS. 1 and 20–22 the apparatus is shown as including means indicated generally at 213, and referred to as stager means, operable for pinching the tube T closed at a level below the lower end of the mandrel 13 and above the level of the sealing jaws J1, J2 for protection of the transverse seals made by jaws J1, J2 similar to the seal protection obtained by the pinch members indicated at 75 in the Kovacs U.S. Pat. No. 4,532,753 issued Aug. 6, 1985. As herein illustrated, this stager means 213 comprises a pair of housings each designated 215 mounted on the frame F of the apparatus at opposite sides of the tubing T below the lower end of the mandrel. Each housing comprises a vertical wall 217, end walls 219 and a top wall 221 and a rail 223 secured to the inside of wall 217 extending horizontally from adjacent one end wall to adjacent the other and adjacent its top wall. Slidable on the rail are forward and rearward slides 225 and 227. A forward or front stager bar 233 extends between the lower ends of the forward slides and a rearward stager bar 235 extends between the upper ends of the rearward slides. Each housing has an endless belt 237 trained around forward and rearward pulleys 239 and 241 mounted on forward and rearward shafts 243 and 245 extending inward from the wall 213. Each forward slide is connected at 247 to the upper reach of the respective belt and each rearward slide is connected at 249 to the lower reach of the respective belt. An air cylinder C2 controlled by a solenoid valve V2 is mounted in position extending out from the rear end wall of one of the housings 215 and a piston rod 253 extends from a piston in the cylinder to a connection at 255 with the rear slide 227. The rear pulley in the one housing is connected to the rear pulley in the other housing by a cross-shaft 257. The arrangement is such that with the piston rod retracted as shown in FIG. 21, the slides 225, 227 occupy a retracted position adjacent the ends of the housings and when the piston rod is extended, the slides are moved toward each other to move the stager bars 233, 235 to closed position pinching the web.

Figure 23:
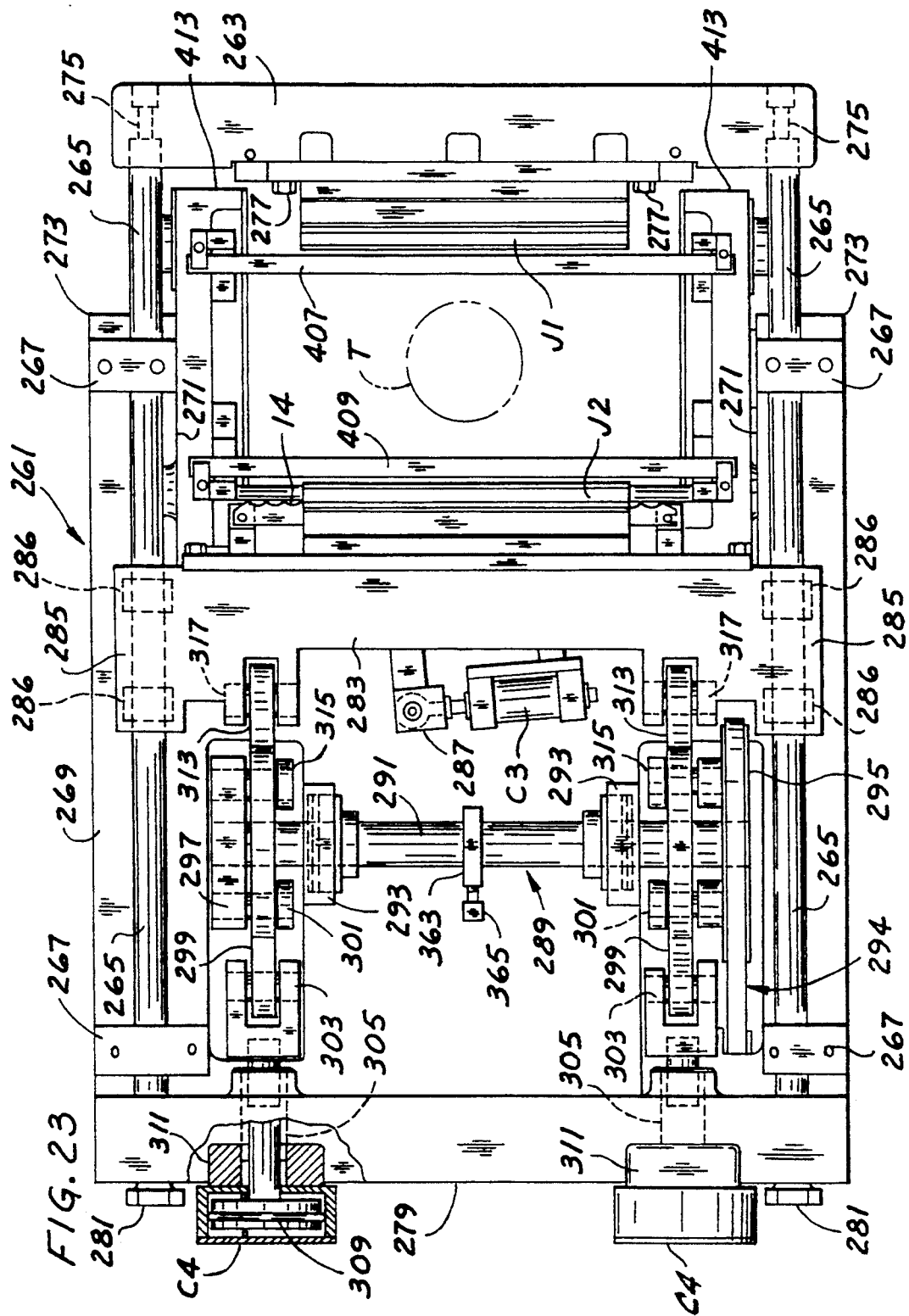
FIG. 23 is a plan of the sealing jaw mechanism of the apparatus showing the position of parts when the sealing jaws are open.
Figure 24:
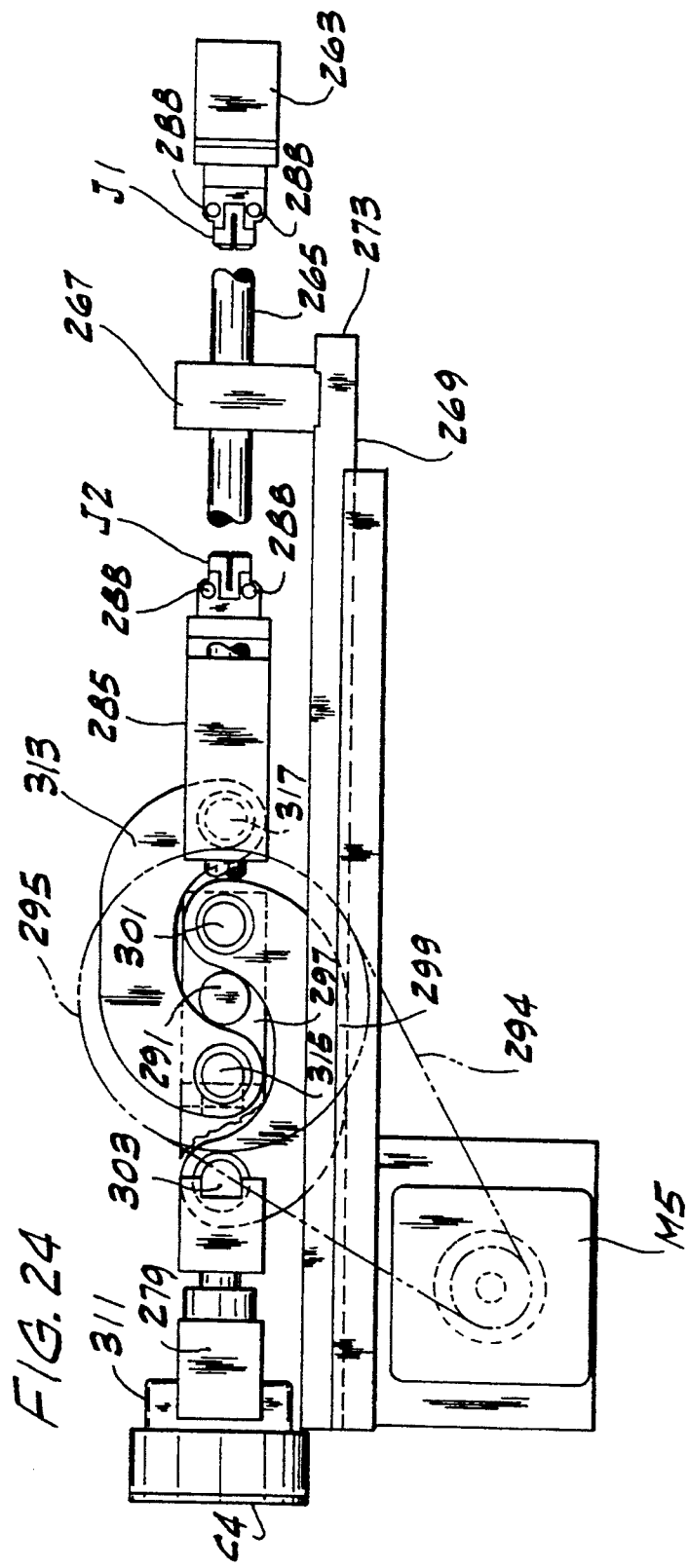
FIG. 24 is a view generally in side elevation of FIG. 23.
Figure 25:
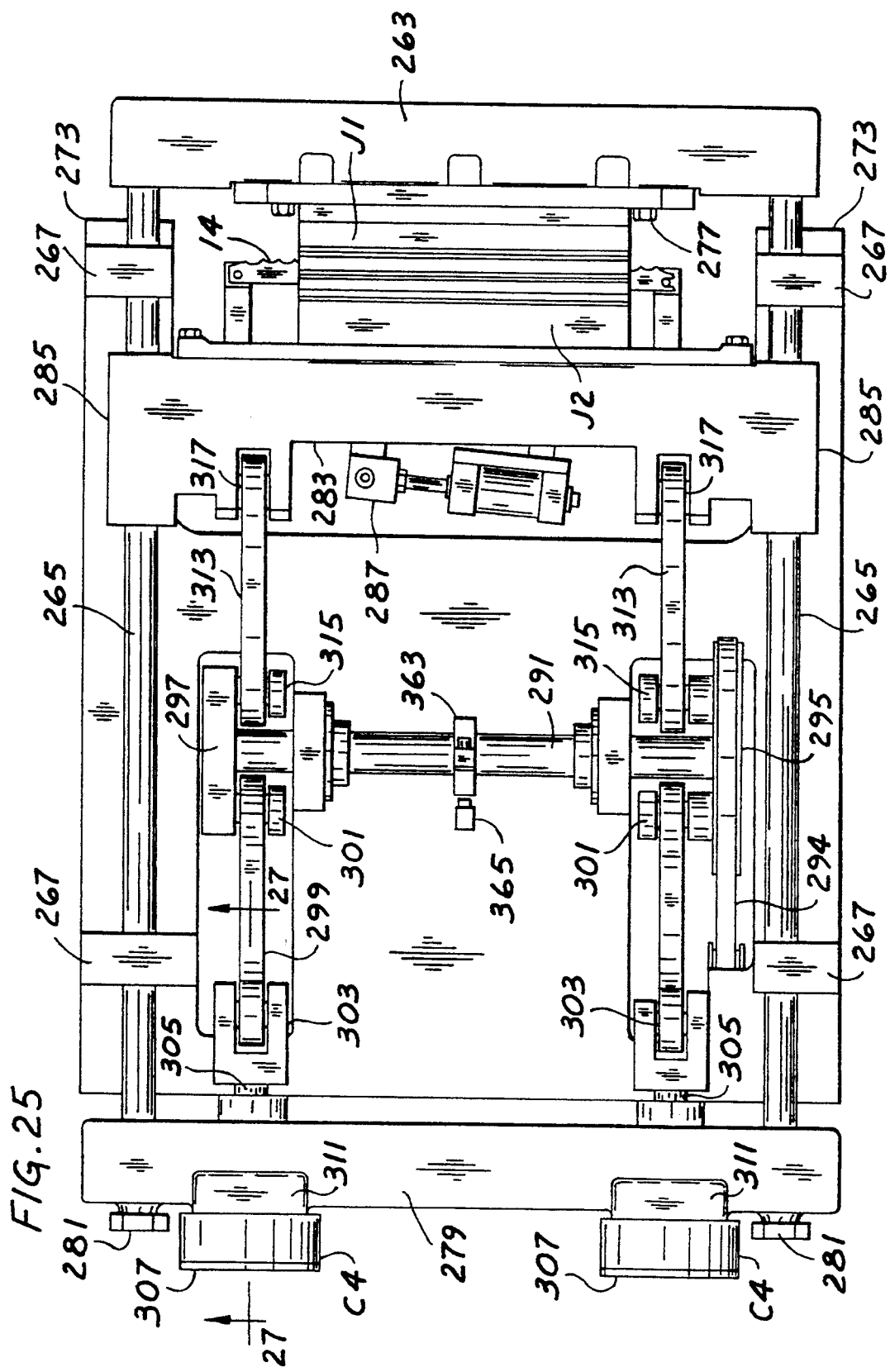
FIG. 25 is a view similar to FIG. 23 showing the position of parts when the jaws are closed.
Figure 26:
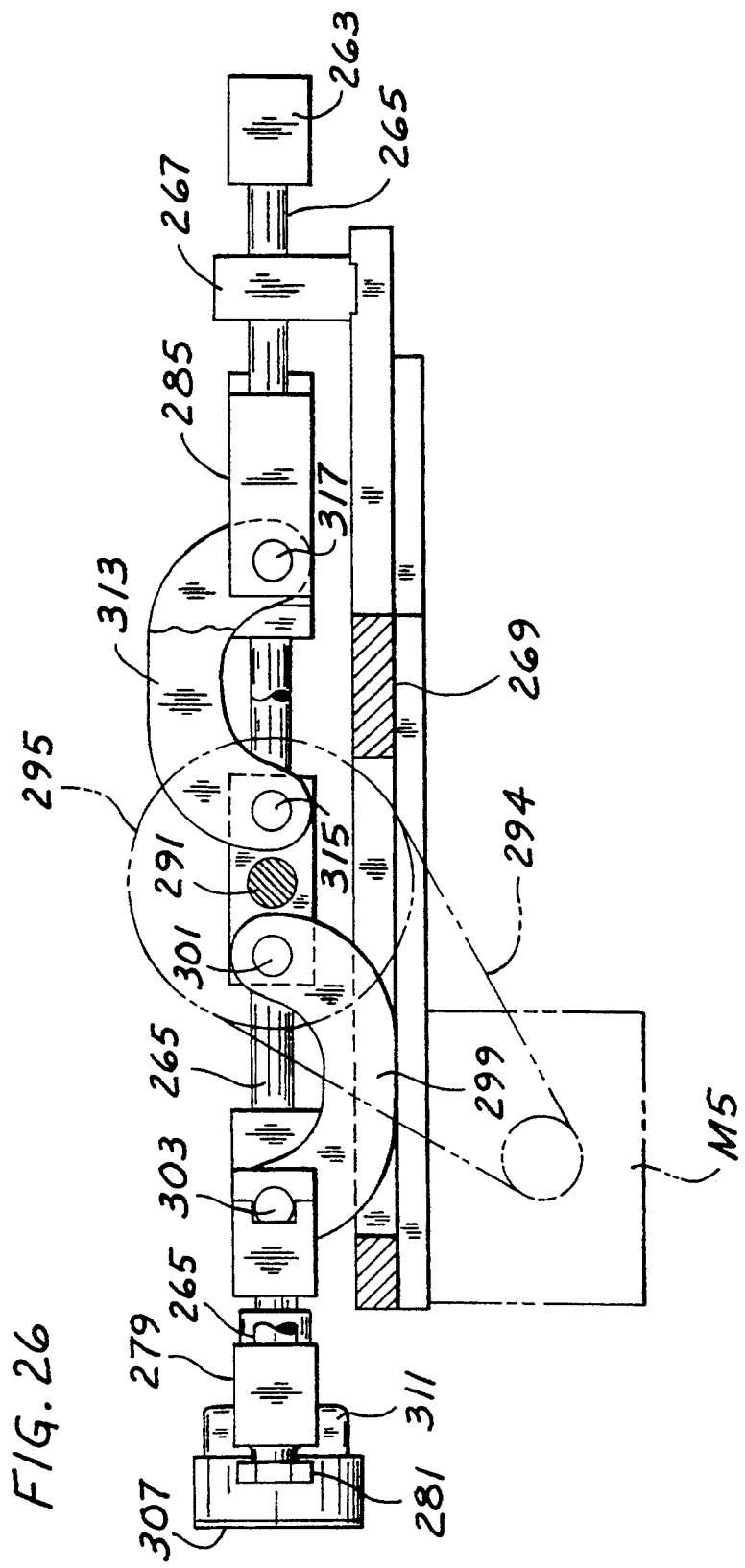
FIG. 26 is a view generally in side elevation of FIG. 25.
Figure 27:
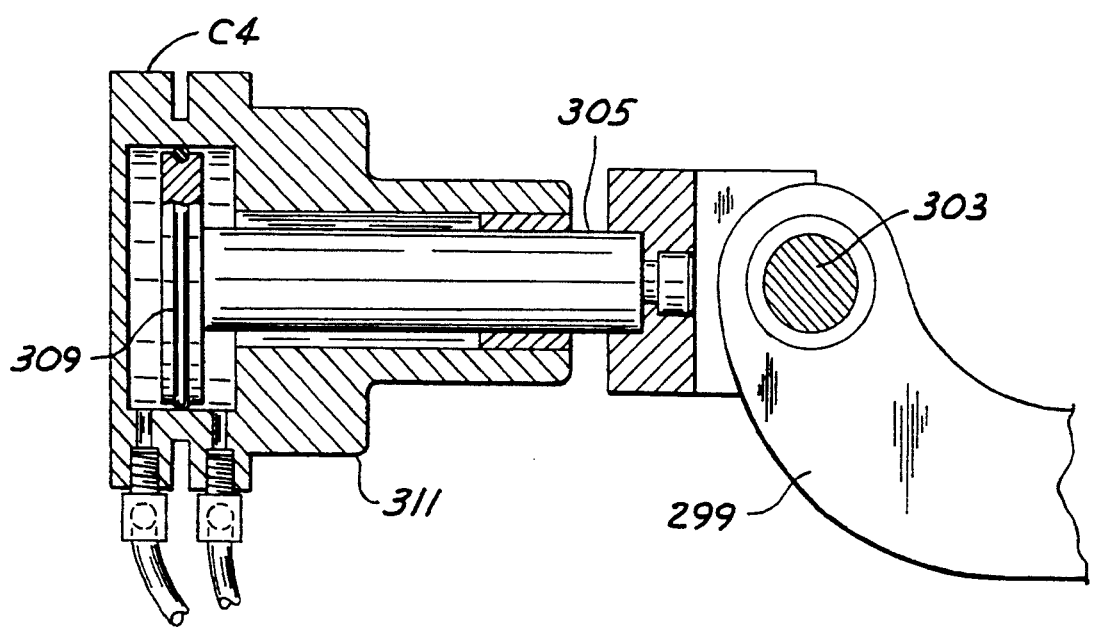
FIG. 27 is an enlarged section on line 27—27 of FIG. 25.

Referring more particularly to FIGS. 23–26, there is indicated generally at 261 means for intermittently operating the sealing jaws J1, J2 for intermittently sealing the tubing T at a level below the lower end of the mandrel 13 (and below the stager bars), this means acting to open the jaws for the downward feed of the tubing on a downward feed cycle, and to close the jaws on the tubing during the dwell of the tubing between successive feed cycles. It is especially characterized in that it moves the jaw J2 (which is the rear jaw at the rear of the tubing T) relatively rapidly from the open position clear of the tubing in which it is shown in FIG. 23 to its fully closed position for forming a seal, and moves the jaw J1 (which is the front jaw in front of the tubing) relatively rapidly from the open position in which it is shown in FIG. 23 to a nearly closed position e.g. 0.020 inch from jaw J2, then completes the movement of the front jaw J1 from its said nearly closed position to its fully closed position in which it is shown in FIG. 25 and exerting the requisite pressure on the tubing for sealing it. As shown in FIGS. 23 and 25, the front jaw J1 is carried by a jaw carrier 263 fixed on the front ends of a pair of rods 265 which are slidable endwise parallel to one another in a horizontal plane below the lower end of the mandrel and the stager bars in bearings 267 mounted on a base plate 269. The latter has a cut-out at its front end as indicated at 271, thereby having relatively narrow extensions 273 at opposite sides at its said front end. There are two bearings 267 at each side for the slide rods 265, one of the bearings at each side being mounted on the respective extension 273 adjacent the forward end of the extension, the other bearing 267 at each side being mounted on the plate 269 adjacent the rear end of the plate. The jaw carrier 263 is secured as indicated at 275 on the front ends of the rods 265 and the jaw J1 is secured as indicated at 277 on the inside (i.e., the rear side toward the base plate 269) of the jaw carrier 263. A yoke 279 interconnects the rods 265 at their rear ends, the connections being suitably adjustable. The rear jaw J2 is carried by a rear jaw carrier 283 which extends transversely with respect to the base plate 269 above the level of the base plate in the horizontal plane of the front jaw carrier 263 and the front jaw J1. The rear jaw carrier 283 has guides 285 at each end slidable on the rods 265, ball bearings being provided for smooth sliding of these guides as indicated at 286. The rear jaw J2 is mounted on the outside (front) of the rear jaw carrier 283 horizontally coplanar with the front jaw J1. The rear jaw carrier 283 carries an air cylinder C3 controlled by a solenoid valve V3 for operating the knife 14 in the rear jaw by suitable mechanism such as indicated at 287. The slide mounting of the rods 265 in bearings 267 and the slide mounting of the rear jaw carrier 283 on the rods 265 enables movement of the front and rear jaws J1 and J2 toward and away from one another between the open position in which the jaws are illustrated in FIG. 23 and the closed position in which they are illustrated in FIG. 25. Each of the jaws J1, J2 has an electrical resistance heating element together with a temperature controller therein such as indicated at 288 in FIG. 24 for heating it to a correct temperature for effecting heat sealing of the tubing to form the transverse seals at package length intervals under the pressure of the jaws on the tubing when the jaws are fully closed. The jaws may be cold-sealing jaws, instead of heat-sealing jaws.

The jaws J1 and J2 are movable toward and away from another by crank means indicated generally at 289 comprising a crankshaft 291 journalled in bearings 293 on the base plate 269, the crankshaft extending horizontally transversely of the base plate and above the base plate. At M5 is indicated a programmable drive means such as a reversible electric motor and associated speed reducer mounted underneath the base plate 269 and connected to drive the crankshaft by a cog belt and pulley drive 294 including a pulley 295 on one end of the crankshaft. This pulley functions as a crank along with a double-arm crank 297 on the other end of the shaft. C-shaped links each designated 299 are pin-connected at one end as indicated at 301 to the pulley and the crank and pin-connected at the other end as indicated at 303 to piston rods 305 which extend out of flat ("pancake") air cylinders C4 controlled by a solenoid valve V4 from the pistons 309 in the cylinders. The cylinders are affixed to the yoke 279 as indicated at 311. C-shaped links each designated 313 are pin-connected at one end as indicated at 315 to the pulley and crank and pin-connected at their other end as indicated at 317 to the second jaw carrier 283. The pin-connections 301 are coaxial, the pin-connections 315 are coaxial and angularly spaced 180° from the pin-connections 301. The pin-connections at 303 are coaxial as are the pin-connections at 317.

With the crankshaft 291, the pulley 295, the crank 297 and the links 299 and 313 in the position shown in FIGS. 23 and 24 the jaws J1 and J2 are in their fully open position. On rotation by the motor M5 of the pulley 295, crankshaft 291 and crank 297 through 180° clockwise as viewed in FIG. 24, links 299 acting through the piston rods 305 and cylinders C4 push the yoke 299 rearward, and the latter acts to pull the rods 265 rearward and pull the front jaw J1 to a nearly closed position short of full closure (e.g. short by 0.020 inch). Links 313 push the second jaw carrier 283 and the second jaw forward to their fully closed position of FIGS. 25 and 26. Closure of Raw J1 is completed by actuation of the pancake cylinders C4 to drive their pistons rearward and thereby pull the yoke 299 rearward. Operation of the motor M5 is under control of a crankshaft position sensor 363 on the crankshaft controlling a switch 365 to signal controller 500 (FIG. 34) to slop the motor when the crankshaft reaches its dead center position, wherein the pin connections 303 between the links 299 and the piston rods 305, the pin connections 301, the axis of the crankshaft, and the pin-connections 315 and 317 are aligned in the dead center position.

Figure 28:
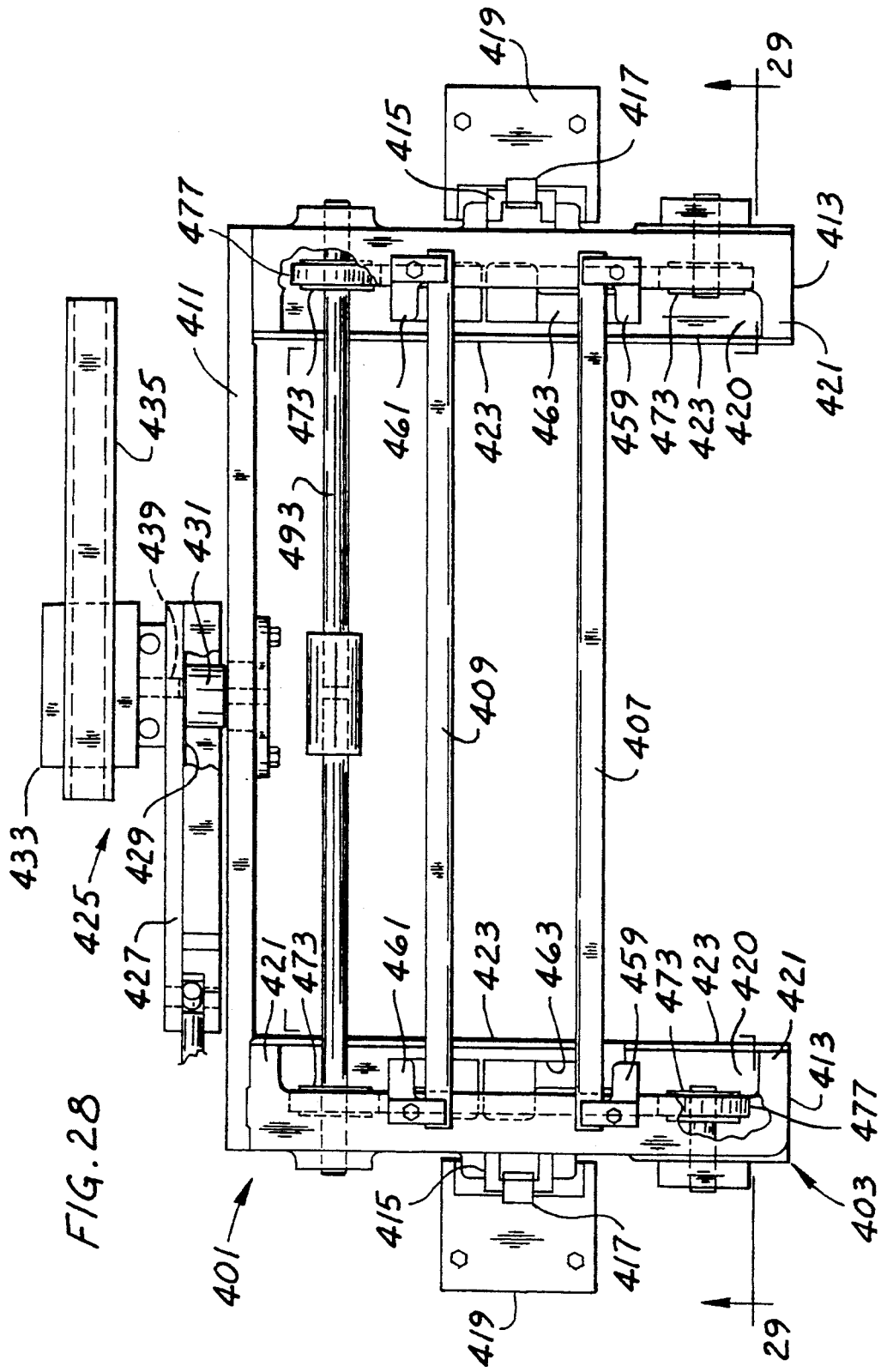
FIG. 28 is a plan of a stripper mechanism of the apparatus, showing stripper bars thereof in an open position.
Figure 29:
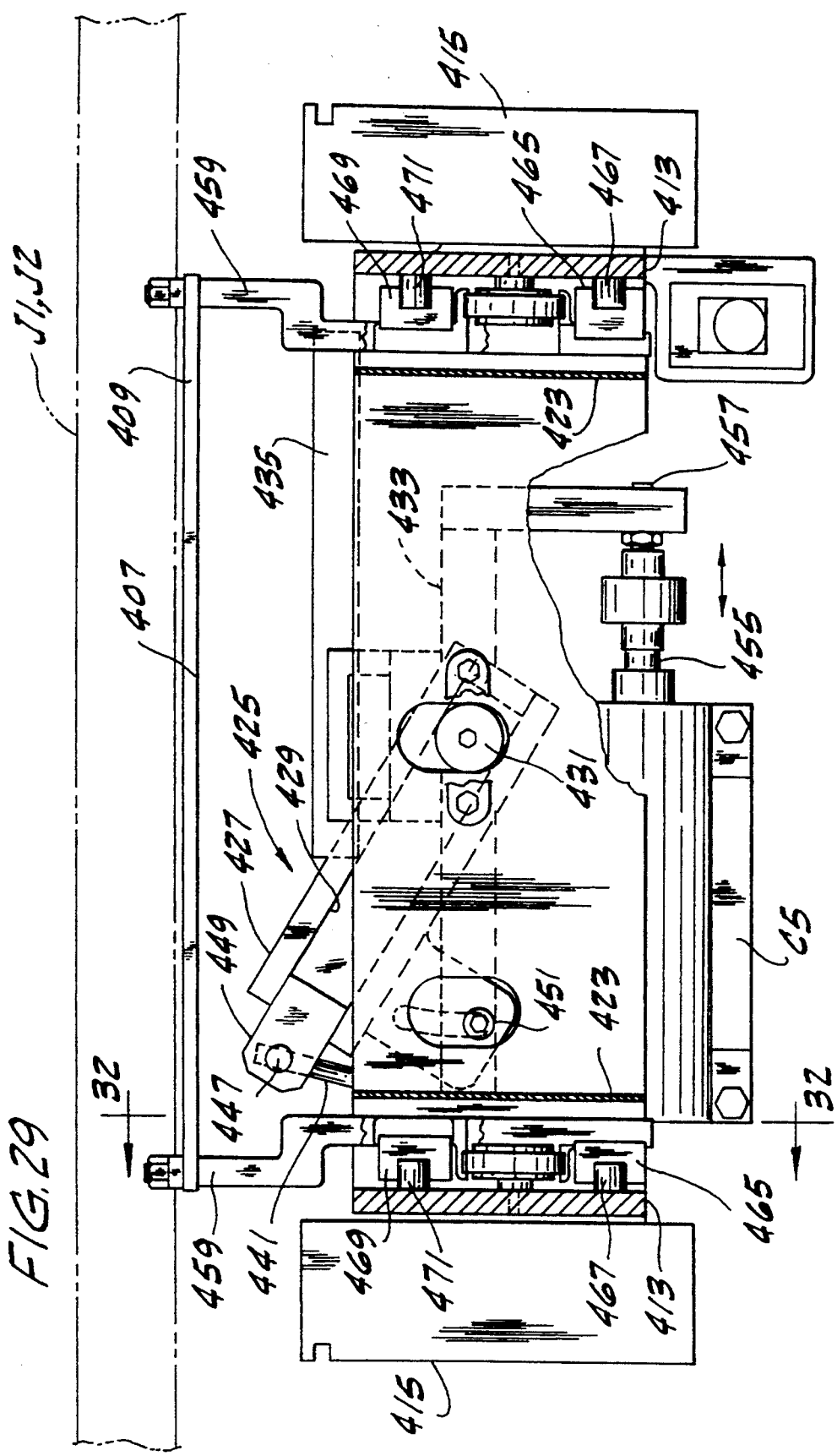
FIG. 29 is a vertical transverse section generally on line 29—29 of FIG. 28, showing the stripper mechanism in its lowered position wherein the stripper bars are below the level of the sealing jaws of the apparatus.
Figure 30:
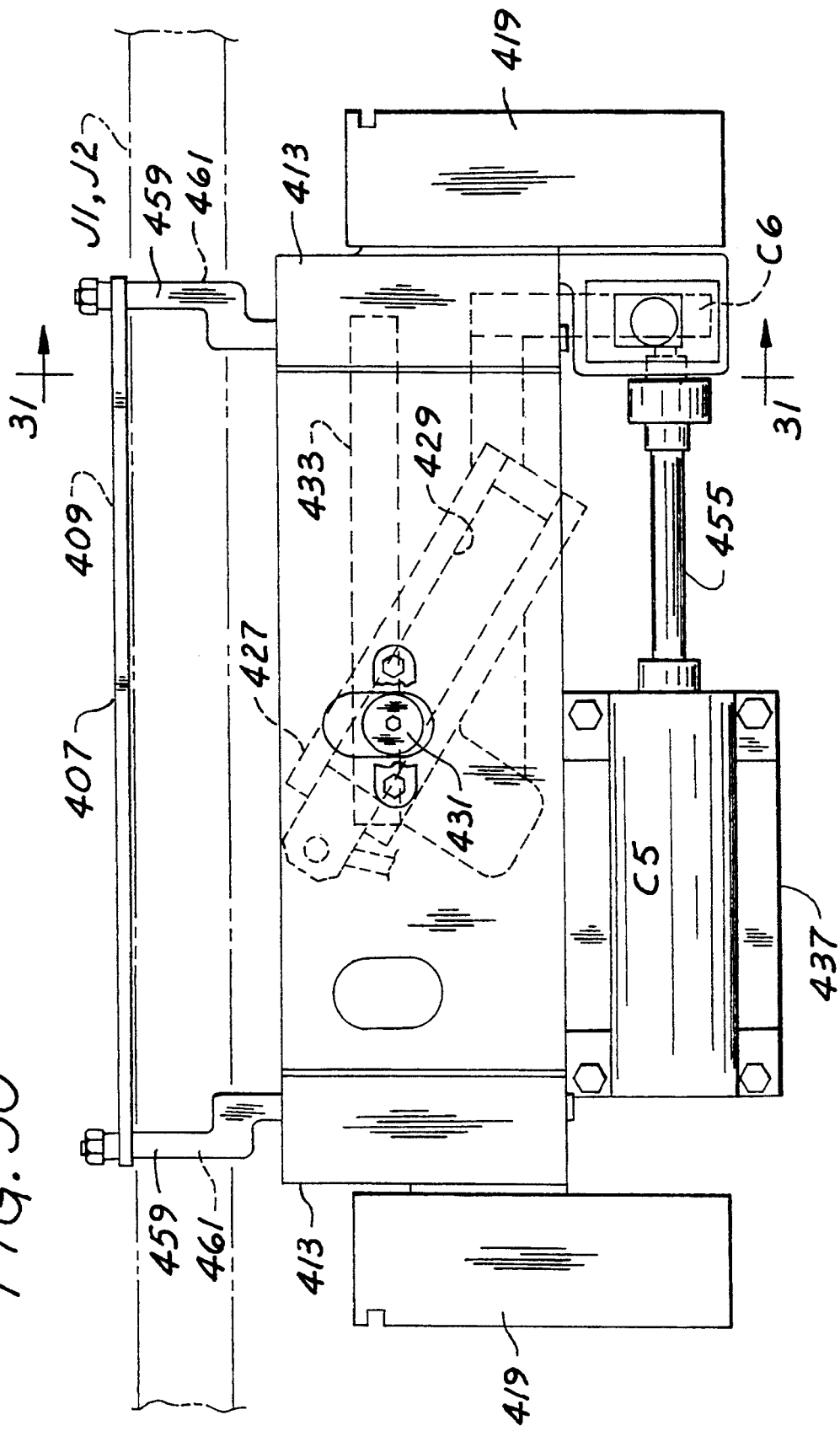
FIG. 30 is a view generally in front elevation of the stripper mechanism, showing the stripper mechanism raised.
Figure 31:
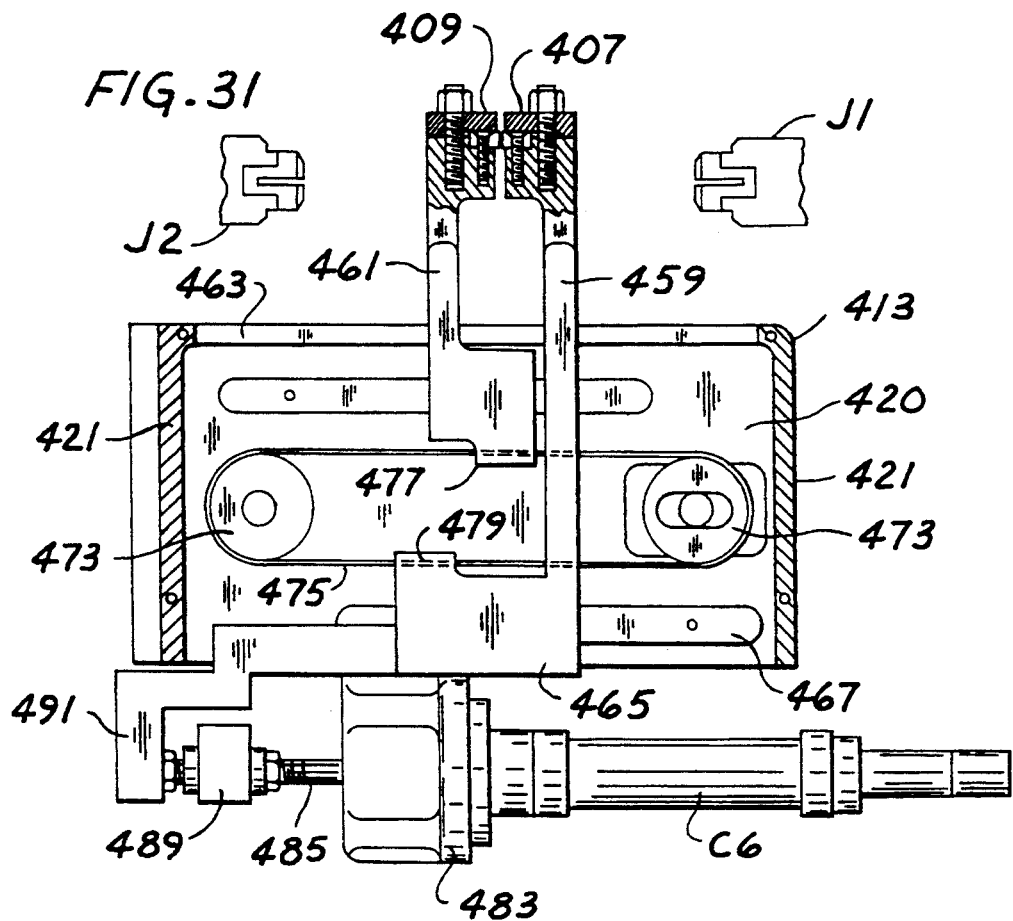
FIG. 31 is a vertical section generally on line 31—31 of FIG. 30 showing the stripper mechanism raised and stripper bars closed.
Figure 32:
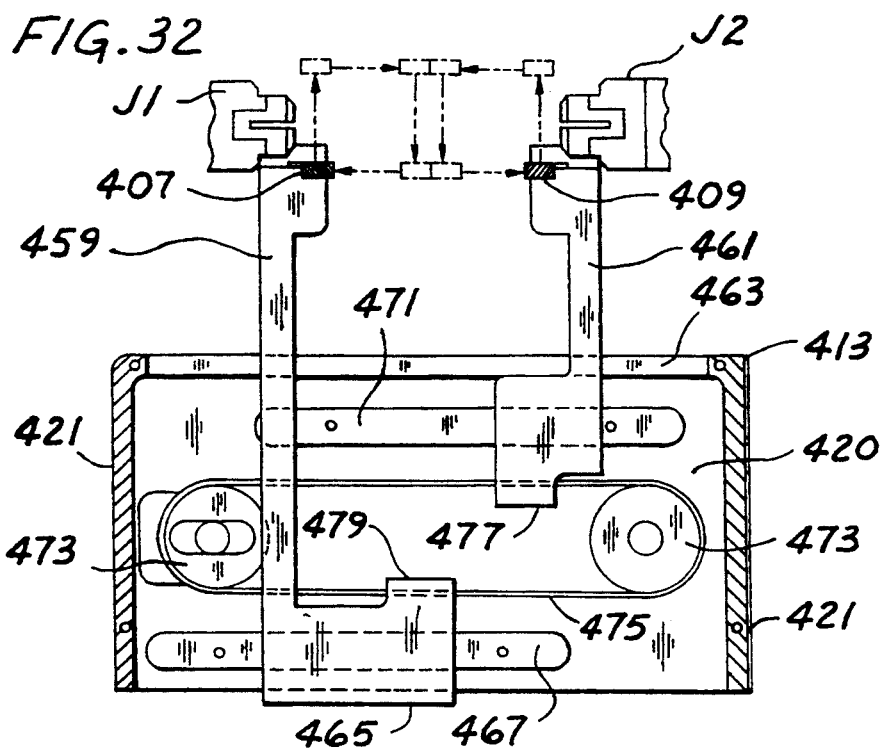
FIG. 32 is a vertical section generally on line 32—32 of FIG. 29 showing the stripper mechanism down and stripper bars open.
Figure 33:
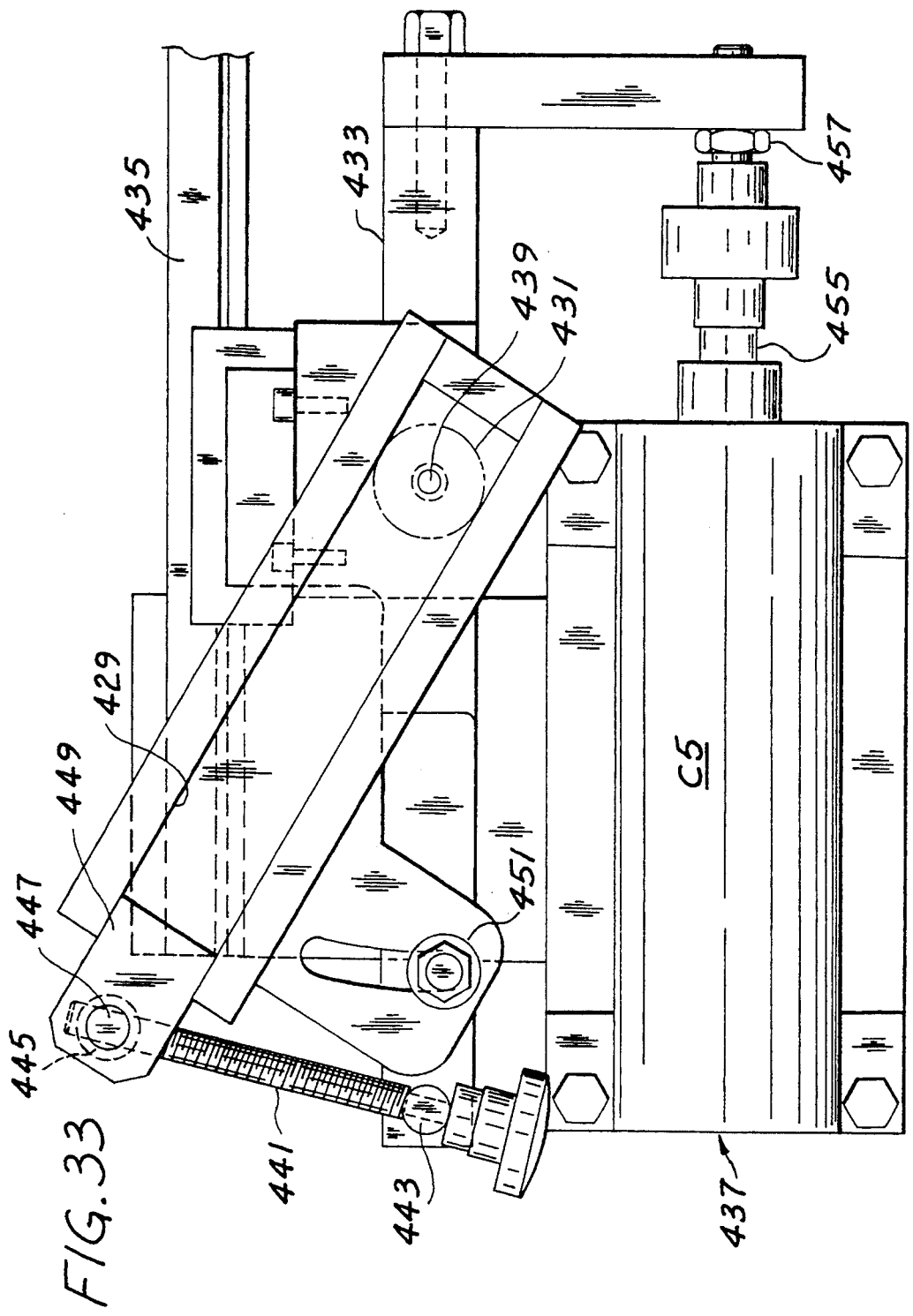
FIG. 33 is a view showing details of a cam mechanism of the stripper mechanism.

Referring to FIGS. 1 and 28–23, the stripper mechanism generally designated 401 is shown to comprise a stripper bar carrier 403, which may also be referred to as an elevator or carriage, mounted for vertical reciprocation between the lowered position (its home position) in which it is illustrated in FIGS. 29 and 32 and the raised position in which it is illustrated in FIGS. 30 and 31. This carriage carries two stripper bars 407 and 409 for up and down movement therewith and for in and out movement toward and away from another relative to the tubing T below the lower end of the mandrel 13. In the lowered or home position of the stripper carriage, the stripper bars 407 and 409 are below the level of the sealing jaws J1, J2. In their open position the bars are spaced from the tubing T, bar 407 being in front of and bar 409 in back of the tubing. In the operation of the stripper mechanism, as will appear, the carriage 403 is raised vertically to its raised position carrying the opened stripper bars 407 and 409 vertically upward from below to above the level of the jaws J1, J2. The bars are then closed (moved inward) to pinch the tubing T, then moved straight downward (vertically) while closed to strip any product which may have lodged in the tubing in the area of the tubing to be sealed down in the tubing below the seal area, and then opened, thus moving in a rectangular path and returning to their initial lowered, open position in readiness for the next cycle.

The carriage 403 comprises a vertical back plate 411 and pair of side members each designated 413 extending forward from the back plate toward the front of the machine on opposite sides of the tubing T below the lower end of the mandrel. Each of the side members has a vertical guide 415 on the outside by means of which the carriage is guided for sliding movement up and down on vertical rails 417 carried by mounting blocks 419 which are suitably fixed on the frame of the apparatus. Each of the side members 413 has a recess 420 on the inside defined by flanges 421 and a plate 423 on the inside closing the recess. At 425 indicated means for raising and lowering the carriage, shown as comprising all elongated inclined linear cam 427 having a linear groove 429 in one face thereof, which its front face in relation to the apparatus. This groove receives a cam follower roller 431 which is adjustably mounted on the back of the back plate 411 of the carriage. The cam 427 is mounted for horizontal sliding movement transversely of the apparatus on a cam carrier or carriage 433 slidable on a rail 435 which is fixed in respect to the frame of the apparatus extending transversely of the apparatus in back of the tubing T, the arrangement being such that with the cam in the retracted position toward the left in which it appears in FIG. 29, the roller 431 is down at the lower end of the inclined groove 429 and the carriage is down in its lowered home position, arid such that when the cam is moved to the right the roller is raised to lift the carriage, to its raised position as shown in FIG. 30.

At 437 is generally indicated means for reciprocating the cam carrier or carriage 433 to reciprocate the cam on the rail 435 between the retracted position ill which it is illustrated in FIG. 29 wherein the roller 431 is at the lower end of the groove 429 and the stripper carrier 403 is down in its lowered position, and the extended position in which it is illustrated FIG. 30. As the cam 427 moves with the cam carrier 433 to its extended position, the roller is raised to raise the entire stripper carrier 403 and as the cam returns to its retracted position, the roller is lowered for lowering the stripper carrier. The cain is pivoted at 439 on the cam carrier 433 for adjusting its inclination to vary the vertical stroke of the carriage, and is adjustable by means of a threaded rod 441 pivoted at its lower end on the cam carriage as indicated at 443 and threaded in a nut 445 pin-connected at 447 to a block 449 slidable in the cam groove 429. Means for locking the cam in adjusted angular position is indicated at 451.

The means 437 for reciprocating the cain 427 drive it from its retracted position (FIG. 29) to its extended (FIG. 30) position and back to its retracted position comprises an air cylinder C5 mounted in fixed position on the frame of the apparatus having the piston rod 455 extending from a piston therein to a connection such as indicated at 457 with the cam carrier 433. The cylinder C5 is under control of a solenoid valve V5, the arrangement being such that on actuation of the valve V5, air is supplied to the tail end of the cylinder and vented from its head end to extend the piston rod and on deactuation of the valve air is supplied to the head end and vented from tail end of the cylinder to retract the piston rod and the cam carrier.

The stripper bar 407 is carried by a pair of arms each designated 459 extending up from the stripper carrier side members 413. Similarly, the other stripper bar 409 is carried by a pair of arms each designated 461 extending up from the other stripper carrier side member 413. The arms which extend up from the each side member are movable relative to the respective side member toward and away from one another between an open position such as illustrated in FIG. 30 and the closed position such as illustrated in FIG. 31. Each of the two stripper arms 459 associated with each side member extends up above the respective side member through a slot 463 in the top of the side member from a lower slide 465 guided for horizontal sliding movement on a lower horizontal guide rail 467 on the inside of the wall of the respective side member. Each of the two stripper arms 461 associated with each side member extends up out of the respective side member through the slot at the top of the latter from an upper slide 469 guided for horizontal movement on an upper horizontal guide rail 471 in the wall of the respective side member.

On the inside of the outside wall of each side member is mounted an endless belt and pulley system comprising a pair of pulleys 473 and a belt 475 trained around the pulleys with the arrangement such that each belt has an upper horizontal reach below the level of the respective upper rail 471 and a lower horizontal reach above the level of the respective lower rail 467. Each of the upper slides is connected to the upper reach of the respective belt as indicated at 477 and each of the lower slides is connected to the lower reach of the respective belt as indicated at 479. Means for moving the arms in and out is shown to comprise an air cylinder C6 under control of a solenoid valve V6, the cylinder being mounted on a bracket 483 which extends down from one of the side members at one side of the stripper mechanism having its piston rod 485 extending from the piston therein to a connection as indicated at 489 to an extension 491 of the lower slide 465 at the respective side of the stripper mechanism. The belt and pulley system at the opposite side is driven from the belt and pulley mechanism at said one side via a cross-shaft 493. It will be noted that the stripper bars are operable independently of the jaws J1, J2.

Figure 34:
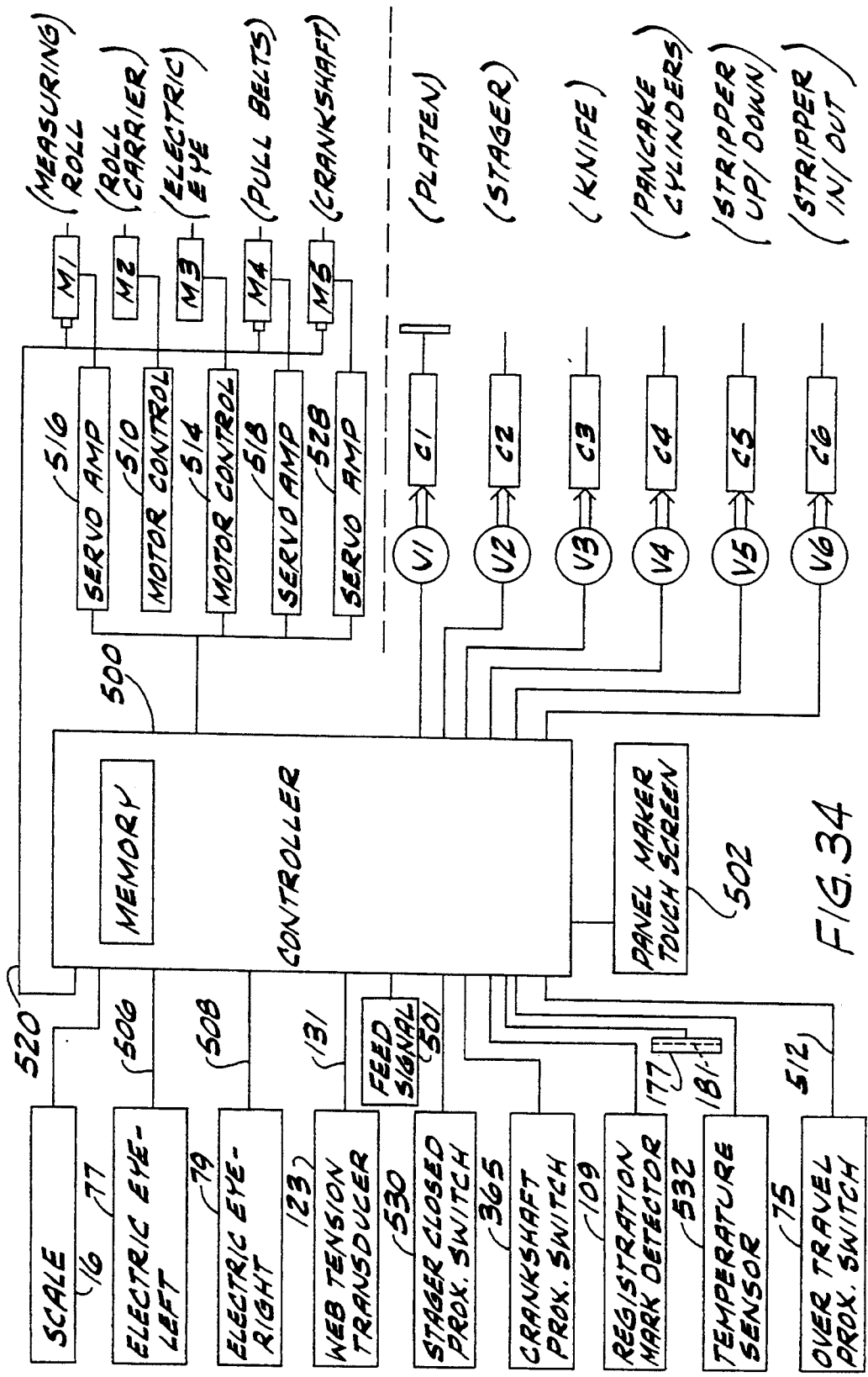
FIGS. 34 and 35 are block diagrams.

The controller 500 shown in FIG. 34 controls the operation of the form, fill and seal packaging apparatus described above. The controller 500 is programmable for controlling the packaging apparatus according to fixed and variable parameters. Controller 500 may be a Bam-432 Machine Controller sold by Berkeley Process Control, Inc. using an Opto-22 Pamux interface. The Dam-432 Controller is a self-contained processor which handles motion control and input/output functions. It includes two serial communication ports for communication with other data collection systems and for the connection of a user interface such as a panelmaker touch screen 502. The user interface 502 provides a display and a touch screen for inputting data and other operating parameters and for receiving data regarding operating conditions. The Bam-432 controller also includes a number of dedicated input terminals and industrial input/output terminals. The dedicated input terminals are handled by controller interrupts and provide fast response for motion control commands. The industrial I/O terminals provide slower response times and are used to interface elements such as solenoid valves, pilot lights, and proximity switches where fast response time is not required. The Bam-432 controller includes an interface for driving up to sixteen quad pack I/O racks. Each rack is assigned a unique address ranging from 0 to 15 for a total of 512 I/O points for the system. The first 16 inputs can be used on an interrupt basis.

The controller 500 provides four axis control for controlling motor M1 which drives measuring roll 19, motor M4 which drives pull belts 133, and motor M5 which drives crankshaft 291 for opening and closing jaws J1, J2. Controller 500 includes additional input/output channels for controlling motor M2 which steers roll carrier 23 and motor M3 which positions the electric eye units 77, 79, and 109.

As the web W is unwound and passes over measuring roll 19, it is guided in a path under roller 53, over tension sensing roller 55, under rollers 57 and 58 and thence on to forming shoulder 3. The path of the web is monitored by edge sensing electric eye units 77 and 79 which provide feedback to controller 500 over a line 506 and a line 508, respectively. When electric eye units 77 and 79 indicate that the web is traveling too far to the right, controller 500 energizes motor M2 to rotate for an incremental period of time in the direction to swing the pivoted roll carrier 23 to the left on its vertical axis 39. This causes the web to track more to the left. This process is repeated until the web is brought into proper alignment in its path toward the forming shoulder 3. Likewise, if electric eye units 77 and 79 indicate that the path of the web is too far to the left, controller 500 energizes motor M2 to rotate in the direction to swing the pivoted roll carrier 23 to the right. This causes the web to track more to the right. The frequency at which the path of the web is monitored (and adjusted where appropriate) is input through user interface 502. Motor M2 may be a conventional stepper motor controlled by controller 500 through a motor control 510.

In use, electric eye units 77 and 79 may be positioned under either the left or the right side of the web. Controller 500 is programmed through user interface 502 with the desired position of the web, the position of the electric eye units, and the pitch of the threaded shaft 97. Controller 500 moves the electric eye units to the correct position under the web by energizing motor M3 to rotate threaded shaft 97 which moves the units. Motor M3 may be a conventional DC motor controlled by controller 500 through a motor control 514. Motor M3 has a high speed for rapidly moving the units to a general position, and a low speed for fine tuning the final position of the units.

The following table shows the inputs and outputs for guiding the web:

TABLE I

| LEFT EYE | RIGHT EYE | EDGE | CORRECTION |
|----------|-----------|-------|---------------|
| OFF | OFF | RIGHT | RIGHT |
| OFF | OFF | LEFT | LEFT |
| OFF | ON | RIGHT | ILLEGAL STATE |
| OFF | ON | LEFT | NO CHANGE |
| OFF | OFF | RIGHT | NO CHANGE |
| ON | OFF | LEFT | ILLEGAL STATE |
| ON | ON | RIGHT | LEFT |
| ON | ON | LEFT | RIGHT |

The limits on the angle through which roll carrier 23 can be swung are set by the cam 73 and associated over-travel proximity switch 75. Switch 75 senses the presence of cam 73 as the cam rotates. If the cam rotates far enough, switch 75 changes states. This corresponds to a tracking system malfunction whereby motor M2 is trying to oversteer roll carrier 23 too far in one direction. When controller 500 senses the change in state of switch 75 over a line 512, it displays an error message on user interface 502 and shuts down the apparatus. Alternatively, controller 500 may signal an error message, allow the apparatus to continue operating, but prevent any further swinging of roll carrier 23 in the given direction.

Figure 35:
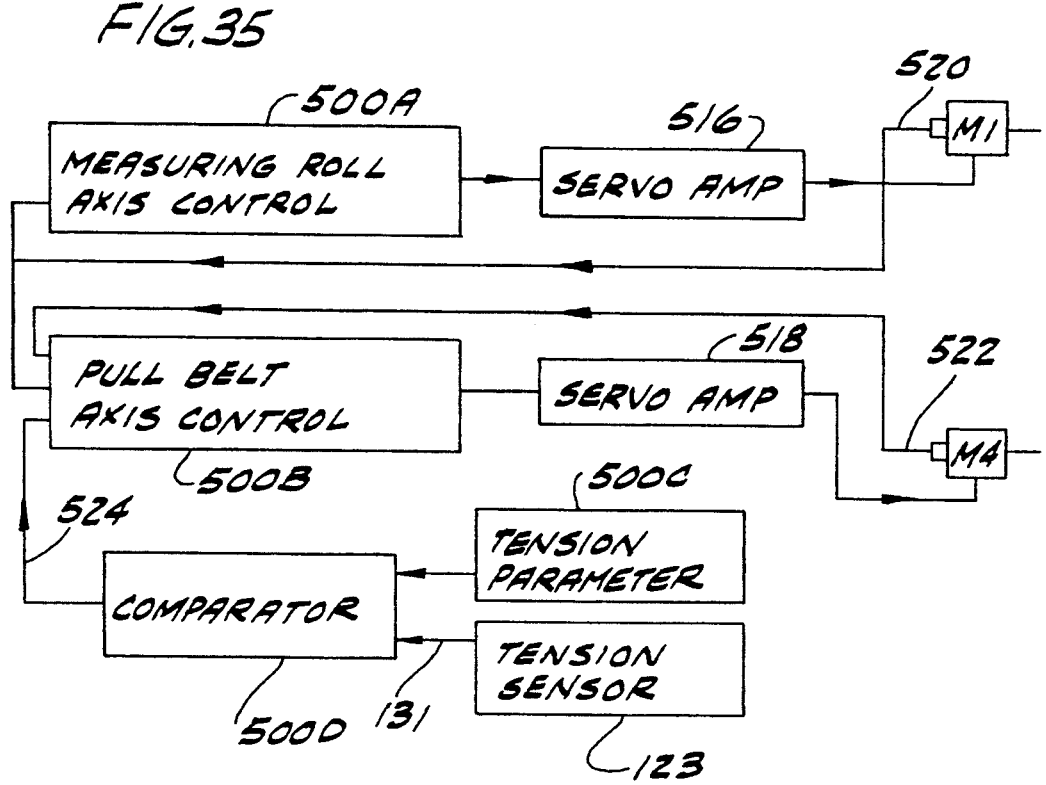

Control of measuring roll 19 and pull belts 133 is shown generally in FIG. 34 and more particularly in FIG. 35. Components designated 500A through 500D are subcomponents of controller 500. Measuring roll axis control 500A which controls motor M1 through a servo amplifier 516 operates as the masher to pull belt axis control 500B which controls motor M4 through a servo amplifier 518. Accordingly, pull belts 133 follow measuring roll 19 and both have substantially the same motion profile. The master/slave relationship is set up through feedback. The output signal from the encoder on motor M1 is fed back to measuring roll axis control 500A via a line 520. Controller 500 thereby independently controls motor M1 as the master through this conventional closed loop servo control circuit of control 500A. The output signal from the encoder on motor M4 is also fed back to pull belt axis control 500B via a line 522. However, axis control 500B also receives feedback from the encoder on motor M1 via line 520 for controlling motor M4 in slave relation thereto. Accordingly, a pull cycle begins when controller 500 signals for motor M1 to rotate by issuing commands to control 500A. Axis control 500B senses the rotation of motor M1 via line 520 and causes motor M4 to begin rotating. After control 500A measures via line 520 that a full package length of material has been pulled, control 500A turns off motor M1. Axis control 500B senses the turn off and follows by turning off motor M4 to end the pull cycle. Alternatively, if the apparatus is set up to produce packages from a pre-printed web which bears registration marks at package length intervals, the presence of a registration mark will cause controller 500 to recalculate the stop point for the measuring roll axis control 500A. (See FIG. 38 and its description below) This is more fully disclosed in U.S. Pat. Nos. 4,391,079 and 4,860,522 which are incorporated herein by reference. Once axis control 500A reaches the stop point, control 500A turns off motor M1. Axis control 500B senses the turn off of motor M1 via line 520 and turns off motor M4, thus ending the pull cycle.

In addition to the master/slave relationship, motor M4 is also controlled to maintain the tension in the web at a substantially constant predetermined value. A register 500C stores a user input tension parameter. Preferably, the actual web tension is measured at the end of each pull cycle by web tension transducer 123; however, web tension may be measured at any point ill the cycle. A comparator 500D compares the tension parameter to the actual tension and outputs a signal representative thereof to axis control 500B over a line 524. The ratio of the surface velocity of measuring roll 19 to the velocity of pull belts 133 controls the tension in the web. Axis control 500B varies this ratio to control web tension. If the signal from comparator 500D indicates that the tension is too low, axis control 500B runs motor M4 faster on the next pull cycle to increase the speed of pull belts 133 in relation to the surface velocity of measuring roll 19, thereby increasing the web tension. If the signal from comparator 500D indicates that the tension is too high, axis control 500B decreases the speed of motor M4 on the next pull cycle to decrease the speed of pull belts 133 in relation to the surface velocity of measuring roll 19, thereby decreasing the web tension. In each instance, on restoration of the pre-set tension, motor M4 is controlled to operate according to the appropriate velocity ratio.

Motor M5 powers the movement of sealing jaws J1, J2. Controller 500 controls motor M5 through servo amplifier 528. At the beginning of a sealing cycle, motor M5 rotates crankshaft 291 to move the sealing jaws to the nearly closed position, e.g. to within 0.020 inch. As the jaws approach the closed position, flag 363 on crankshaft 291 closes proximity switch 365. Controller 500 senses the closing of switch 365 and stops the motion of motor M5 to stop the crankshaft with the jaws nearly closed and the crank means in the dead center position of FIG. 26. The jaws are opened at the end of the sealing cycle by rotating motor M5 in the opposite direction. For applications where the filled packages are relatively small, it may riot be necessary fully to open the jaws between machine cycles in order for the packages to pass between them during the pull cycle. By reducing the distance travelled by the jaws, less time is required to open and close the jaws which allows faster machine cycle rates. Controller 500 is programmed through user interface 502 to set the jaw open spacing at 25, 50, 75 or 100 percent of the maximum opening, for example. Other percentages could be used depending on the circumstances of the particular application. The servo amplifiers 516, 518 and 528 may be the Simodrive 611 Converter System sold by Siemens.

Operation of the platen cylinder C1, stager cylinder C2, knife cylinder C3, pancake cylinders C4 and stripper cylinders C5 and C6 is controlled by controller 500 through solenoid actuated valves V1 through V6, respectively. Controller 500 functions to actuate valve V1 to actuate cylinder C1 to move the platen 177 into sealing engagement with margin 11 of the web W in the tubing T on the mandrel 13, to hold the platen in sealing engagement with margin 11 for a predetermined time interval during the dwell of the tubing. The platen, heated by heater 181 therein, effects heat-sealing together of margins 11 and 9 to form the longitudinal seam for the tubing. The valve is deactivated at the end of the-platen sealing step deactuate cylinder C1 and retract the platen. The temperature of sealing is sensed by a temperature sensor 532. Controller 500 adjusts the temperature of the platen to maintain the sensed temperature near a preset temperature value input through user interface 502.

At the time when the jaw J1 is to be moved from its nearly closed position to its fully closed position for the transverse sealing of tubing T, controller 500 outputs a signal to actuate valve V4 to actuate the pancake cylinders C4 to drive the jaw J1 through the end portion of its closing stroke (e.g., the 0.020 inch remaining for full closure). At the end of the sealing cycle controller 500 deactuates valve V4 to deactuate cylinders C4 thereby to retract jaw J1 the distance (e.g., the 0.020 inch) corresponding to the stroke of the pistons of cylinders C4. Controller 500 controls the timing for the operation of valves V2, V3, V5 and V6 and the respective cylinder C2 for the stager, C3 for the knife, C5 for the up and down movement of the stripper and C6 for the in and out movement of the stripper bars 407 and 409 by sending control signals to these valves in the programmed control sequence.

One example of the timing that may be programmed into controller 500 for controlling all of the above operations during a machine cycle is shown in FIG. 36. This timing is calculated by controller 500 from parameters input through user interface 502. The input parameters include package length, cycle rate, and sealing time for jaws J1, J2. Controller 500 calculates the period of time for one machine cycle from the cycle rate parameter and subtracts the parameter for sealing time. Controller 500 further subtracts additional time for the time required to open and close sealing jaws J1 and J2. Controller 500 then allocates the remaining time between the pull time for measuring roll 19 and pull belts 133 to feed forward a package length of material and a pull delay time period which immediately precedes the pull. Additional time may be required for staging and shaking. Controller 500 then calculates the acceleration and deceleration of the web required to complete the pull within the allocated pull time. Accordingly, the sealing time for a cycle is independent of the cycle rate.

It has been found advantageous to conduct the pull with a period of constant acceleration followed by a period of constant deceleration of the motors M1 and M4. This provides a triangular velocity profile over time and reduces the tendency of the web to jerk during the [lull. Using this control algorithm, the control parameters for the pull can be derived from the following equations:

$$V_{max} = 2 \times (\text{package length})/T_{pull} \quad (1)$$

$$ACC = DEC = 2 \times V_{max}/T_{pull} \quad (2)$$

In equations (1) and (2), $V_{max}$ is the maximum velocity of the web during the pull, package length is the length of a produced package, $T_{pull}$ is the total period of time for the pull, and ACC and DEC are the constant acceleration and deceleration for the motor M1. Controller 500 is also programmed with maximum limits for the values $V_{max}$, ACC and DEC, depending, in part, on the limits of the servomotors. For example, for servomotors operating on a basis of 8,000 counts per motor shaft revolution, $V_{max} = 400,000$ counts/sec, $ACC_{max} = 500,000$ counts/sec$^2$, and $DEC_{max} = 500,000$ counts/sec$^2$. Controller 500 tests the required values against the limit values during setup and signals an error if the limit values are exceeded. While this control algorithm is disclosed for providing a triangular velocity curve, other control algorithms providing different velocity curves could also be used within the scope of the invention.

In the circumstance where the sealing period does not allow sufficient time for the pull cycle given a particular cycle time, controller 500 may be placed in an overlap mode through user interface 502. In this mode, controller 500 allows the jaw close operation to begin before the pull cycle is completed. This overlap in the two operations provides a shorter cycle time. The overlap can be increased to just before the point where the jaws begin closing on the moving web during the pull. To further shorten the cycle time, controller 500 may eliminate the pull delay and allow the pull cycle to begin while the jaws are still in movement toward the open position from the previous machine cycle. This overlap in operations can be increased to the point where the pull begins just after the time when the sealed tubing releases from the jaws. When in the overlap mode, controller 500 may preferably set the acceleration and deceleration parameters for the motor M1 to the maximum programmed value so as to minimize the duration of the overlapping periods.

In addition to the user input parameters described above, additional parameters are input through user interface 502 to control other intermittent operations such as the stager operation, the stripper operation, and the other operations occurring during the machine cycle shown in FIG. 36. The timing for when each of these operations occurs is based on certain "events" during the course of a machine cycle. For example, each cycle starts when the start delay changes from a high state to a low state. From this point in time, the pull delay timer begins to run which thereafter starts the pull cycle of measuring roll 19 and pull belts 133. The stager delay timer also begins to run from the cycle start which thereafter sharks the stager operation. The jaw close delay timer also begins to run from the cycle start, which thereafter starts the jaw close operation. The crankshaft proximity switch 365 indicating when the jaws are in [.he nearly closed position provides another event in the timing diagram. Closure of switch 365 begins the timing of the sealing period for the jaws and sets the timing for the operation of the knife. While FIG. 36 was not intended to show all of the operations associated with a modern form, fill and seal apparatus, other operations such as a poker, an air blast, a shaker and the like could be added under the control of controller 500 and referenced to some event on the timing diagram of FIG. 36 using the techniques described herein.

Finally, stager 213 includes a proximity switch 530 for indicating to controller 500 when the stager is in the closed position. Switch 530 provides yet another "event" which call be used to initiate further associated functions such as shaking arid settling.

With reference to FIG. 36 which is a timing diagram (not to scale) showing the operation of the apparatus, a cycle time of 1000 milliseconds may be used, although the invention is not limited to any particular cycle time or cycle timing. The times given below for the operation of the various procedures are by way of example, not limitation. A cycle starts when the start delay timer within controller 500 times out causing the start delay signal to transition from a high state to a low state. A pull delay timer times out a pull delay of 25 msec. after the cycle start signal whereafter the pull cycle is performed through operation of measuring roll 19 and pull belts 133 in a period of 160 msec. After the pull cycle, the platen cylinder C1 is activated by solenoid valve V1 for 190 msecs. to heat seal the lapping margins 9 and 11 of web W. The stager delay timer within controller 500 times out a period of 160 msec. after the cycle start signal to initiate closure of stager bars 233 and 235. The stager bars close approximately 100 msec. later and remain closed until 10 msec. before the end of the cycle. Stripper 401 is also activated when the jaw close delay timer times out. The jaw close delay timer times out a period of 150 msec. after the cycle start signal to initiate closure of sealing jaws J1, J2. The jaws close approximately 150 msec. later, as indicated by the jaw closed proximity switch, and remain closed for the duration of the sealing period. The stripper bars close on the tubing from their upwardly extended position, and retract to their downward position until the end of the sealing period. In this example, the sealing period is 750 msec. The knife delay timer times out a period of 300 msec. following the closure of sealing jaws J1, J2 whereafter the knife is actuated to separate the upper seal on the completed package from the lower seal on the package being formed and filled.

When the apparatus is set up to produce packages from a pre-printed web which bears registration marks at package length intervals, the pull cycles may vary as shown in FIG. 38. The abscissa in these diagrams indicates time and the ordinate indicates film velocity. Connecting lines 540, 542, 544, 546, and 548 show the relationship between the three pull cycles generally referred to by reference characters 38A, 38B and 38C. Line 540 shows the starting time for each of the pull cycles. Lines 542 and 544 show the beginning and end of a preset window during which registration mark detector 109 looks for a registration mark on the web. The window is set by the rotational position of the measuring roll 19 which is referenced to zero at the beginning of the pull. Within the window of the diagrams of FIG. 38, the symbol $T_R$ indicates the time when the registration mark was actually detected within the pull cycle. Line 546 shows the time $T_V$ when the velocity of the web in each cycle reaches $V_{max}$. Line 548 shows the time when each of the pull cycles would end if the registration mark was detected in the center of window 542–544. The symbol $T_F$ indicates the time when each of the pull cycles should and actually does end.

As may be seen in FIG. 38 which is a timing diagram (not to scale) showing the operation of the pull belts in response to detection of registration marks on the web, the velocity profile during acceleration, $V_{max}$ and $T_V$ are substantially the same for each of the pull cycles in this embodiment of the invention. However, after the registration mark is detected, controller 500 recalculates the constant deceleration rate so that a constant amount of film is actually pulled after detection of the registration mark. As a result, this increases or decreases time amount of film actually pulled during the entire cycle. The web may be preset, for example, to require the pulling of 150 mm after the detection of the registration mark. If the mark is detected early, then there is too much time remaining in the preset pull cycle and more than 150 mm of the web will be pulled after detection if no adjustment is made. Accordingly, the constant rate of deceleration is increased which shortens the endpoint $T_F$ for the pull cycle and shortens the length of the pull. Conversely, if the mark is detected late, then there is not enough time remaining in the preset pull cycle and less than 150 mm of the web will be pulled after detection if no adjustment is made. Accordingly, the constant rate of deceleration is decreased which extends the endpoint $T_F$ for the pull cycle and lengthens the pull.

Applying the example where 150 mm of web is to be pulled after detection of the registration mark, reference character 38A shows the case where the registration mark is detected in the middle of the window. This is the preferred point of detection which requires no adjustment to the rate of deceleration. Accordingly, the same length of the web is pulled during acceleration as during deceleration.

Reference character 38B shows the case where the registration mark is detected early. Because only 150 mm of the web must be pulled from this point forward, the velocity profile of reference character 38A as shown by a line 550 would pull too much of the web. To decrease the length of the pull, controller 500 calculates the area under the curve from $T_R$ to $T_V$, it being assumed that the acceleration rate does not change during this interval. This calculated area is equal to the length of the web pulled during the interval ($T_R$, $T_V$). Controller 500 subtracts this length from 150 mm to determine the length $L_D$ needed to be pulled during deceleration. Controller 500 then calculates and implements $T_F$ and DEC as follows:

$$T_F = T_V + 2L_D/V_{max} \quad (3)$$

$$DEC = V_{max}/(T_F - T_V) \quad (4)$$

The adjusted velocity profile during deceleration is shown by a line 552 in the case illustrated by reference character 38B. The area between lines 552 and 550 shows the adjustment made in the length of the pull.

Reference character 38C shows the case where [he registration mark is detected late. Because 150 mm of the web musk be pulled from this point forward, the velocity profile of reference character 38A as shown by a line 550 would pull too little of the web. To increase the length of the pull, controller 500 again calculates the area under the curve from $T_R$ to $T_V$, it being assumed that acceleration rate does not change during this interval. This calculated area is equal to the length of the web pulled during the interval ($T_R$, $T_V$). Controller 500 subtracts this length from 150 mm to determine the length $L_D$ needed to be pulled during deceleration. Controller 500 then calculates and implements $T_F$ and DEC using equations (3) and (4) as above. The adjusted velocity profile during deceleration is shown by a line 554 in the case illustrated by reference character 38C. The area between lines 554 and 550 shows the adjustment made in the length of the pull.

FIGS. 37A–37C illustrate operation of the form, fill and seal packaging apparatus according to the invention in a self-regulating mode which responds to a feed signal 501 provided to controller 500 from the scale feeding product to the machine. In particular, FIGS. 37A–37C illustrate the variable cycle length resulting from operation in response to the feed signal 501. In these figures, the abscissa indicates time and the ordinate indicates film velocity or jaw spacing, depending on the waveform.

Triangular waveforms 370A–370H illustrate the film velocity during the film pull with the abscissa representing zero velocity. A left leg ACC of each triangular waveform shows a period of time during which the film is accelerated from zero to a maximum velocity $V_{max}$ and a right leg DEC shows a period of time during which the film is decelerated back to zero. The length of film pulled is equal to the area under the velocity/time graph.

Trapezoidal waveforms 372A–B72H illustrate the spacing between sealing jaws J1, J2 during the sealing operation with the abscissa representing a fully open position of the jaws. A left leg CLO of each trapezoidal waveform shows a period of time during which the sealing jaws are moving to a fully closed position FCP and a right leg OPN shows a period of time during which the sealing jaws are moving back to a fully opened position FOP. Horizontal line SLG indicates the period of time that the sealing jaws are in the fully closed and locked position to seal the film.

As shown in FIGS. 37A through 37C which illustrate a timing diagram (not to scale) of the operation of the pull belts in relation to the sealing jaws, cycle time $T_x$ is defined as the time between the ends of consecutive cycles, i.e., beginning with the end of one cycle until the end of the next consecutive cycle. During cycle 1, the film is pulled from time $t_0$ to time $t_1$ and the bag is sealed by closing, holding, and opening the jaws from time $t_1$ to time $t_2$ (so that the total cycle time $T_1$ of cycle 1 equals $t_2-t_0$. During cycle 2, the film is pulled from time $t_2$ to time $t_3$ and the bag is sealed by closing, holding, and opening the jaws from time $t_3$ to time $t_5$ ($T_2=T_5-t_2$). However, cycle 3 begins before cycle 2 ends and is shorter than cycles 1 or 2. Specifically, during cycle 3, the film is pulled from time $t_4$ to time $t_6$ and the bag is sealed by closing, holding, and opening the jaws from time $t_6$ to time $t_7$ ($T_3=t_7-t_5$). This results in the controller 500 simultaneously opening the jaws J1, J2 and accelerating the film velocity for at least the portion of cycle 2 between $t_4$ and $t_5$ so that the web moving means and jaw moving means operate in overlapping periods within cycle 2. During cycle 4, the film is pulled from time $t_7$ to time $t_8$ and the bag is sealed by closing, holding, and opening the jaws from time $t_8$ to time $t_9$ ($T_4=t_9-t_7$). As a result, cycle 3's total time $T_3$ is less than each of the total cycle times of cycles 1, 2, and 4, i.e., $T_3<T_1$, $T_2$ or $T_4$, so that the cycle length varies depending on acceleration ACC, maximum velocity $V_{max}$, deceleration DEC, jaw closing time CLO, jaw sealing time SLG, jaw opening time OPN and any over lap between jaw opening OPN and acceleration ACC such as between cycles 2 and 3. In most applications, the cycle time will depend primarily on the feed rate and [he pull time.

In most systems, the bagmaker is a slave to the product feed system so that the product feed system must run faster than the bagmaker in order to avoid jams. In general, previous bagmakers ran about 10% faster than the product feed system to allow variations in fill rate without violating the master-slave relationship between the product feed system and the bagmaker. The present invention permits the bagmaker to run less than 10% faster than the speed of the product feed system. As a result, the invention allows faster operation of systems in which a limiting factor on maximum speed of the system is the speed of the bagmaker. This is because the present invention permits the bagmaker to run at a speed which is nearly equal to the speed of the product feed system.

Controller 500 receives input data provided by the operation via user interface 502 defining an opening period OPN during which the jaw moving means opens the jaws J1, J2. In general, the controller 500 controls the operation of the jaw moving means such that the opening period OPN occurs immediately after the sealing time SLG. As a result, the controller 500 includes means for operating the web moving means to accelerate ACC the web during the opening period OPN such as illustrated between cycles 2 and 3. A limitation is that the jaws must be open sufficiently to provide clearance for the bag to pass through.

Referring to FIG. 37B, during cycle 5, the film is pulled from time $t_{10}$ to time $t_{11}$ and the bag is sealed by closing, holding, and opening the jaws from time $t_{11}$ to time $t_{12}$ ($T_5 = t_{12} - t_{10}$). During cycle 6, the film is pulled from time $t_{12}$ to time $t_{14}$ and the bag is sealed by closing, holding, and opening the jaws from time $t_{13}$ to time $t_{16}$ ($T_6 = t_{16} - t_{12}$). In cycle 6, the jaw closing CLO begins while the film is being decelerated DEC. Cycle 7 begins before cycle 6 ends and is shorter than cycles 5 or 6. Specifically, during cycle 7, the film is pulled from time $L_{15}$ to time $t_{18}$ and the bag is sealed by closing, holding, and opening the jaws from time $t_{17}$ to time $t_{20}$ ($T_7 = t_{20} - t_{16}$). This results in the controller 500 simultaneously pulling the film and moving the jaws for at least a portion of cycles 6 and 7 so that the web moving means and jaw moving means operate in overlapping periods within cycles 6 and 7. During cycle 8, the film is pulled from time $t_{19}$ to time $t_{21}$ and the bag is sealed by closing, holding, and opening the jaws from time $t_{21}$ to time $t_{22}$ ($T_8 = t_{22} - t_{20}$). As a result, $T_7 < T_6$ or $T_8 < T_5$ so that the cycle length varies and depends on the parameters noted above, i.e., ACC, $V_{max}$, DEC, CLO, SLG, OPN, overlap between DEC and CLO and overlap between OPN and ACC. The controller 500 receives input data from the operator via user interface 502 defining a closing period CLO during which the jaw moving means closes the jaws J1, J2. In general, the controller 500 controls the operation of the jaw moving means such that the closing period CLO occurs immediately before the sealing time SLG. As a result, the controller 500 includes means for operating the web moving means to decelerate DEC the web during the closing period CLO.

Limits on the input data may be in the form of a measurement of the maximum length the jaws J1, J2 should be opened and separated, e.g. 10 inches, or in the form of a percentage indicating the percent the jaws should be opened, e.g., if maximum separation is 20 inches, 50% corresponds to 10 inches.

Controller 500 may also receive input data via user interface 502 defining the distance the jaws J1, J2 should be opened by the jaw moving means so that controller 500 operates the jaw moving means as a function of the received input data. FIG. 37C corresponds to FIG. 37B and illustrates cycles with the jaws being only partially opened so that high speed operation further reducing cycle length is possible. Cycle 9 is shorter than cycle 5 (i.e., $T_9 < T_5$) because $t_{25} - t_{24} < t_{12} - t_{11}$ since the jaws J1, J2 never reach the fully open position FOP represented by the abscissa axis. Cycles 6 and 7 have the same length as cycles 10 and 11, respectively, because of the overlap noted above. Cycle 12 is shorter than cycle 8 (i.e., $T_{12} < T_8$) because $t_{27} - t_{26} < t_{22} - t_{21}$.

If the apparatus is used in the self-regulating mode with a web bearing registration marks for setting the package lengths, then the actual time when the registration mark is detected further varies the length of the particular machine cycle. For example, if the registration mark is detected in the early portion of the preset window as shown in the case illustrated by reference character 38B in FIG. 38, then controller 500 begins to close the jaws J1, J2 earlier in the machine cycle. Likewise, if the registration mark is detected near the end of the preset window as shown in the case illustrated by reference character 38C in FIG. 38, then controller 500 must delay closing the jaws J1, J2 until later in the machine cycle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An intermittently operating form, fill and seal machine for making packages of predetermined package length from a web of material having a sealing time, the machine being cyclicly operable and comprising:
    means for forming the web into tubing;
    means for moving the web over the web forming means during a web moving time;
    jaws for forming transverse seals across the tubing during the sealing time;
    means for moving the jaws relative to one another to open and close the jaws;
    means for independently defining each of the following:, the package length, a cycle time and the sealing time; and
    a controller, receiving the package length, the cycle time and the sealing time as defined by the defining means, for determining the rate at which the web is moved over the forming means by the web moving means as a function of the package length and the difference between the cycle time and the sealing time, said web moving means being responsive to the determined rate.

2. The machine of claim 1 wherein the controller includes means for simultaneously operating the jaw moving means and the web moving means for at least a portion of each cycle time so that the web moving means and jaw moving means operate in overlapping time periods within each cycle time.

3. The machine of claim 1 wherein the controller receives input data defining a closing time during which the jaw moving means closes the jaws, wherein the controller controls the operation of the jaw moving means such that the closing time occurs immediately before the sealing time, and wherein the controller includes means for operating the web moving means to move the web during the closing time.

4. The machine of claim 1 wherein the controller receives input data defining an opening time during which the jaw moving means opens the jaws, wherein the controller controls the operation of the jaw moving means such that the opening time occurs immediately after the sealing time, and wherein the controller includes means for operating the web moving means to move the web during the opening time.

5. The machine of claim 4 wherein the controller receives input data defining a closing time during which the jaw moving means closes the jaws, wherein the controller controls the operation of the jaw moving means such that the closing time occurs immediately before the sealing time, and wherein the controller includes means for operating the web moving means to move the web during the closing time.

6. The machine of claim 5 wherein the controller includes means for receiving input data defining the amount of opening and closing of the jaws by the jaw moving means and means for operating the jaw moving means as a function of the received data.

7. The machine of claim 1 wherein the controller includes means for receiving input data defining the amount of opening and closing of the jaws by the jaw moving means and means for operating the jaw moving means as a function of the received data.

8. The machine of claim 1 wherein the controller includes means for controlling the acceleration or deceleration of the web moving means within a preset range arid for controlling the velocity of the web moving means below a preset maximum velocity.

9. Tile machine of claim 1 wherein the controller includes means for controlling the operation of the web moving means so that the web moving means accelerates the web from zero velocity to a peak velocity and then decelerates the web to zero velocity within the time remaining in each cycle time taking into account the sealing time.

10. The machine of claim 1 wherein the controller includes a memory for storing a plurality of preset data sets defining minimum and maximum acceleration and deceleration and a maximum web velocity and wherein the controller includes means for controlling the operation of the web moving means in response to a selected data set in the memory.

11. The machine of claim 1 for use in combination with a product feed means providing a product feed signal wherein the controller receives the product feed signal and includes means for controlling the operation of the web moving means in response thereto so that the product feed means provides product feed signals as soon as the product feed means is ready to deliver product for the packages and the machine is responsive to the product feed signal wherein at least some consecutive cycle times vary.

12. The machine of claim 1 for use in combination with a product feed means providing a product feed signal to the controller and wherein the controller includes means for varying the actual cycle time in response to the received product feed signal whereby at least some consecutive cycle times vary.

13. The machine of claim 1 wherein the controller controls the acceleration and deceleration of the web as it moves over the forming means as a function of the package length and the difference between the cycle time and the sealing time.

14. A machine as set forth in claim 1 comprising a frame, a downwardly extending tubular mandrel carried by the frame for delivery of product to be packaged therethrough and out of the lower end of the mandrel, said means for forming the web acting to form it into the tubing surrounding the mandrel, variable speed means for feeding the tubing downwardly on the mandrel and thereby pulling the web over the forming means under tension, means for sensing the tension in the web upstream from said forming means, and means responsive to said sensing means for varying the speed of said variable speed means for maintaining the tension in the web at a substantially predetermined value.

15. A machine as set forth in claim 1 having first and second sealing jaws, the first jaw being movable toward and away from the second between an open position clear of the tubing and a closed position in sealing engagement with the tubing, the means for having the jaws comprising means for moving the first jaw toward the second jaw relatively rapidly to a nearly closed position, said first jaw moving means having expansible means therein for completing the movement of said first jaw from said nearly closed position to said closed position and exerting pressure on the tubing for sealing it, and means for operating said expansible means for completing the movement of said first jaw from said nearly closed position to said closed position and exerting pressure on the tubing for sealing it.

16. The machine of claim 9 wherein the web of material includes registration marks and wherein the machine further comprises means for detecting the registration marks within a preset window and wherein the means for controlling the operation of the web moving means includes means for determining the deceleration as a function of the position of the registration mark relative to the window.

17. The machine of claim 16 wherein the determining means comprises means for determining a constant deceleration.

18. A machine as set forth in claim 1 having a downwardly extending tubular mandrel and wherein the means for forming the web into tubing forms it into the tubing surrounding the mandrel, and having web measuring means operable intermittently to pull the web from a supply and measure successive package length increments of the web as it is pulled from the supply to establish the package length and intermittently feed the web forward in said package length increments on successive web feed cycles to said forming means, said means for moving the web over the forming means comprising means for intermittently pulling the tubing down on the mandrel during each web feed cycle at the same time that each package length increment is intermittently fed forward to the forming means, the jaws being opened for the downward feed of the tubing on each web feed cycle and closed on the tubing below the lower end of the mandrel on a dwell of the tubing between successive web feed cycles, and wherein the controller controls the web measuring means to measure out package length according to the input data.

19. A machine as set forth in claim 18 wherein the web measuring means comprises a measuring roll, and wherein the machine has means mounting the measuring roll for movement relative to said forming means to steer the web to maintain it in a path aligned with the forming means, means for sensing deviation of the web one way or the other from said path, and means responsive to said sensing means on its sensing a deviation to move the measuring roll to steer the web back into said path.

20. A machine as set forth in claim 18 having variable speed means for feeding the tubing downwardly on the mandrel and thereby pulling the web over the forming means under tension, means for sensing the tension in the web upstream from said forming means, and means responsive to said sensing means for varying the speed of said variable speed means for maintaining the tension in the web at a substantially constant predetermined value.

21. A machine as set forth in claim 18 comprising first and second sealing jaws, the first jaw being movable toward and away from the second between an open position clear of the tubing and a closed position in sealing engagement with the tubing, the means for moving the jaws comprising means for moving the first jaw toward the second jaw relatively rapidly to a nearly closed position, arid means for completing the movement of said first jaw from said nearly closed position to said closed position and then exerting pressure on the tubing for sealing it.

22. The machine of claim 1 wherein the controller accelerates and decelerates the web to move one package length over the web forming means as a function of a period defined by the difference between the cycle time and the sealing time.

23. The machine of claim 1 wherein the controller controls the web moving means to move one package length of the web over the web forming means during a period of time set by the controller as a function of the difference between the cycle time and the sealing time.

24. Apparatus for measuring, feeding and guiding a web being fed forward from a supply to a forming means in a vertical form-fill-seal packaging machine, said apparatus comprising a measuring roll, means mounting the measuring roll for movement relative to said forming means to steer the web to maintain it in a path aligned with the forming means, means for driving the measuring roll intermittently to feed forward a package length increment of the web, means for sensing deviation of the web one way or the other from said path, and means responsive to said sensing means on its sensing a deviation to move the measuring roll to steer the web back into said path.

25. Apparatus as set forth in claim 24 wherein the means for driving the measuring roll is carried by the measuring roll mounting means and movable therewith.

26. Apparatus as set forth in claim 24 having a fixed support and wherein the means mounting the measuring roll for movement relative to said forming means comprises a roll carrier mounted for pivotal movement on the fixed support about an axis extending generally at right angles to the measuring roll, the means responsive to the deviation sensing means comprises means for pivoting the roll carrier and the measuring roll one way or the other on said axis for steering the web back into said path.

27. Apparatus as set forth in claim 26 wherein the means for driving the measuring roll comprises a motor carried by said pivoted roll carrier.

28. Apparatus as set forth in claim 27 wherein said pivot axis extends generally through the center of length of the measuring roll.

29. Apparatus for forming, filling and sealing packages comprising a frame, a downwardly extending tubular mandrel carried by the frame for delivery of product to be packaged therethrough and out of the lower end of the mandrel, means for forming a web of packaging material into tubing surrounding the mandrel, a web measuring roll, means for intermittently driving the web measuring roll to feed a package length increment of the web forward toward the forming means, variable speed means for feeding the tubing downwardly on the mandrel and thereby pulling the web over the forming means under tension, means for sensing the tension in the web upstream from said forming means, and means responsive to said sensing means for varying the speed of said variable speed means relative to the speed of the measuring roll for maintaining the tension in the web at a substantially constant predetermined value.

30. Apparatus as set forth in claim 29 wherein said sensing means comprises a roll over which the web is guided on its way to said forming means, and transducer means supporting said roll for sensing the tension of the web and operable to transmit an electrical signal proportional to the tension for varying the speed of said variable speed means relative to the speed of the measuring roll for maintaining the tension in the web at a substantially constant predetermined value.

31. Apparatus as set forth in claim 30 wherein said variable speed means comprises a pair of belts for feeding the tubing downwardly on the mandrel, and programmable drive means for driving the belts, said electrical signal varying the speed of the programmable drive means to vary the speed of the belts for maintaining the tension in the web at a substantially constant predetermined value.

32. Sealing jaw apparatus for forming seals at package length intervals across tubing of packaging material in a vertical form-fill-seal packaging machine, comprising first and second sealing jaws, the first jaw being movable toward and away from the second between an open position clear of the tubing and a closed position in sealing engagement with the tubing, and a drive for said first jaw comprising means for moving the first jaw toward the second jaw relatively rapidly to a nearly closed position, said first jaw moving means having expansible means therein for completing the movement of said first jaw from said nearly closed position to said closed position and exerting pressure on the tubing for sealing it, and means for operating said expansible means for completing the movement of said first jaw from said nearly closed position to said closed position exerting pressure on the tubing for sealing it.

33. Sealing jaw apparatus as set forth in claim 32 wherein said first means comprises an electric-motor-driven crank mechanism, and said second means comprises expansible chamber means operable when the first means has driven said first jaw to its said nearly closed position, to complete the closing of first jaw.

34. Sealing jaw apparatus for forming seals at package length intervals across tubing of packaging material in a vertical form-fill-seal packaging machine, comprising first and second sealing jays, the first jaw being movable toward add away from the second between an open position clear of the tubing and a closed position in sealing engagement with the tubing, and a drive for said first jaw comprising means for moving the first jaw toward the second jaw relatively rapidly to a nearly closed position, said first jaw moving means having expansible means therein for completing the movement of said first jaw from said nearly closed position to said closed position and exerting pressure on the tubing for sealing it, and means for operating said expansible means for completing the movement of said first jaw from said nearly closed position to said closed position exerting pressure on the tubing for sealing it, wherein said first means comprises an electric-motor-driven crank mechanism, and said second means comprises expansible chamber means operable when the first means has driven said first jaw to its said nearly closed position, to complete the closing of first jaw, and wherein the crank mechanism, when actuated to drive the first jaw to its said nearly closed position, is at dead center and thereby held against return movement to take the reaction of the expansible chamber means as the expansible chamber means completes the movement of the first jaw from said nearly closed position to said closed position.

35. Sealing jaw apparatus as set forth in claim 34 having means mounting the first jaw for horizontal sliding movement between its said open and closed positions, and wherein the expansible chamber means comprises at least one air cylinder having a piston reciprocable therein, one of the cylinder arid the piston being connected to and movable with the first jaw, the crank mechanism comprising a crank means, an electric motor for driving the crank means and link means interconnecting the crank means and the other of the cylinder and piston, the crank means being rotatable in one direction from a jaws-open position to a jaws-nearly-closed position, the connection of the link means to the said one of said cylinder and piston arid the connection between the link means arid the crank means and the axis of the crank means being aligned in the dead center position when the crank means rotates to the jaws-nearly-closed position.

36. Sealing jaw apparatus as set forth in claim 35 wherein the second jaw is movable by said crank means toward and away from said first jaw.

37. Apparatus for forming, filling and sealing packages comprising a frame, a downwardly extending tubular mandrel carried by the frame for delivery of product to be packaged therethrough and out of the lower end of the mandrel, means for forming a web of packaging material into tubing surrounding the mandrel with the edges of the web lapping, the tubing being fed downwardly on the mandrel in package length increments with a dwell between successive web feed cycles, and means for sealing together the lapping margins of the web comprising an arm pivoted for swinging movement on a vertical axis on the frame of the apparatus at one side of the mandrel, a housing horizontally slidable on the arm for movement lengthwise of the arm, said arm with the housing therein being swingable on said axis between an operative position wherein said housing is in front of the mandrel and a retracted position wherein the housing is off to one side from in front of the mandrel, a sealing platen carried by the housing, means in the housing for moving the platen from a retracted position relative to the mandrel into sealing position engaging the lapping margins of the web on the mandrel for sealing said margins together during a dwell of the tubing between web feed cycles.

38. Apparatus as set forth in claim 37 wherein the housing is freely slidable on the arm to an outer position relative to the arm, and having means associated with the housing and the arm for then adjusting the position of the housing on the arm.

39. Apparatus as set forth in claim 38 wherein means for moving the platen comprises expansible chamber means mounted in the housing.

40. Apparatus for forming, filling and sealing packages comprising:
means for forming flexible packaging material into tubing, the tubing extending downwardly;
means for feeding the tubing downwardly;
means for transversely sealing the tubing at package length intervals, a quantity of the product with which the packages are to be filled being delivered into the tubing during an interval of time between successive sealing operations;
said transverse sealing means comprising a pair of sealing members and means for moving said sealing members relatively to one another between an open position clear of the tubing and a closed position in sealing engagement with the tubing;
said sealing members being operable in a generally horizontal fixed plane, the tubing being intermittently fed downwardly between the sealing members one package length increment when the sealing members are open, the sealing members then closing on the tubing; and
a pair of stripper members operated independently of the sealing members movable relative to one another from an open position with respect to the tubing to a closed position squeezing the tubing, and movable while in their open position from a lowered position below the sealing members up between the opened sealing members to a raised position above the sealing members, then movable to their closed position and down in their closed position to their lowered position for stripping product from within the region of the tubing to be sealed.

41. Apparatus as set forth in claim 40 wherein the stripper members are carried by a carriage movable up and down by expansible chamber means.

42. Apparatus as set forth in claim 40 wherein the stripper members are movable between their open and closed positions by expansible chamber means carried by the carriage.

43. Apparatus as set forth in claim 42 having endless belt and pulley means carried by the carriage for moving the stripper members between their open and closed positions.

44. Apparatus as set forth in claim 43 having expansible chamber means for moving the carriage up and down.

45. Apparatus as set forth in claim 40 wherein the stripper members are carried by a carriage movable up and down by cam means driven by expansible chamber means.

46. Apparatus as set forth in claim 45 wherein the cam means is a linear cam means reciprocable on a fixed track extending transversely with respect to-the carriage.

47. An intermittently operating form, fill, and seal machine for making packages from a web of material, a machine for use with a product feed means for weighing a predetermined amount of product to be delivered to the machine and packaged within the package, said product feed means providing successive product feed signals, each indicating that a preset amount of product is available, the machine comprising:
means for forming the web into tubing;
means for moving the web over the web forming means;
jaws for sealing the tubing;
means for moving the jaws to open and close the jaws; and
a controller, receiving the product feed signals, for controlling the operation of the web moving means as a function of the period between the successive product feed signals and for varying the actual cycle time in response to the period between the received product feed signals whereby at least some consecutive cycle times vary.

48. An intermittently operating form, fill and seal machine for making packages from a web of material, the machine comprising:
means for forming the web into tubing;

means for moving the web over the web forming means;

jaws for sealing the tubing;

means for moving the jaws relative to one another to open and close the jaws; and a controller for receiving input data defining the package length, cycle time and sealing time and for controlling the operation of the web moving means as a function of the input data, whereby the web is moved one package length within the time remaining in each cycle time taking into account the sealing time, further having a web measuring roll; means for driving the web measuring roll intermittently to feed a package length increment of the web forward toward the forming means, means mounting the measuring roll for movement relative to said forming means to steer the web to maintain it in a path aligned with the forming means, means for sensing deviation of the web one way or the other from said path, and means responsive to said sensing means on its sensing a deviation to move the measuring roll to steer the web back into said path.

49. An intermittently operating form, fill and seal machine for making packages from a web of material, the machine comprising:

means for forming the web into tubing;

means for moving the web over the web forming means;

jaws for sealing the tubing;

means for moving the jaws relative to one another to open and close the jaws; and a controller for receiving input data defining the package length, cycle time and sealing time and for controlling the operation of the web moving means as a function of the input data, whereby the web is moved one package length within the time remaining in each cycle time taking into account the sealing time, said machine comprising a frame, a downwardly extending tubular mandrel carried by the frame for delivery of product to be package therethrough and out of the lower end of the mandrel, said means for forming the web acting to form it into the tubing surrounding the mandrel with the edges of the web lapping, the tubing being fed downwardly on the mandrel in package length increments with a dwell between successive web feed cycles, and means for sealing together the lapping margins of the web comprising an arm pivoted for swinging movement on a vertical axis on the frame of the apparatus at one side of the mandrel, a platen housing horizontally slidable on the arm for movement lengthwise of the arm, said arm with the housing therein being swingable on said axis between an operative position wherein said housing is in front of the mandrel and a retracted position wherein the housing is off to one side from in front of the mandrel, a sealing platen carried by the housing, means in the housing for moving the platen from a retracted position relative to the mandrel into sealing position engaging the lapping margins of the web on the mandrel for sealing said margins together during a dwell of the tubing between web feed cycles.

50. An intermittently operating form, fill and seal machine for making packages from a web of material, the machine comprising:

means for forming the web into tubing;

means for moving the web over the web forming means;

jaws for sealing the tubing;

means for moving the jaws relative to one another to open and close the jaws; and a controller for receiving input data defining the package length, cycle time and sealing time and for controlling the operation of the web moving means as a function of the input data, whereby the web is moved one package length within the time remaining in each cycle time taking into account the sealing time, and wherein the means for forming the web into tubing acts to form it with the tubing extending downwardly, and the tubing is fed downwardly, said jaws being operable in a generally horizontal fixed plane, the tubing being intermittently fed downwardly between the jaws one package length increment when the sealing members are open, the jaws then closing on the tubing; said machine further having a pair of stripper members operated independently of the jaws movable relative to one another from an open position with respect to the tubing to a closed position squeezing the tubing, and movable while in their open position from a lowered position below the jaws generally vertically upward between the opened jaws to a raised position above the jaws, then movable generally horizontally to their closed position and down in their closed position to their lowered position for stripping product from within the region of the tubing to be sealed.

51. An intermittently operating form, fill and seal machine for making packages from a web of material, the machine means for forming the web into tubing;.

means for moving the web over the web forming means;

jaws for sealing the tubing;

means for moving the jaws relative to one another to open and close the jaws; and a controller for receiving input data defining the package length, cycle time and sealing time and for controlling the operation of the web moving means as a function input data, whereby the web is moved one package the time remaining in each cycle time taking into account the sealing time, said machine having a downwardly extending tubular mandrel and wherein the means for forming the web into tubing forms it into the tubing surrounding the mandrel, and having web measuring means operable intermittently to pull the web from a supply and measure successive package length increments of the web as it is pulled from the supply to establish the package length and intermittently feed the web forward in said package length increments on successive web feed cycles to said forming means, said means for moving the web over the forming means comprising means for intermittently pulling the tubing down on the mandrel during each web feed cycle at the same time that each package length increment is intermittently fed forward to the forming means, the jaws being opened for the downward feed of the tubing on each web feed cycle and closed on the tubing below the lower end of the mandrel on a dwell of the tubing between successive web feed cycles, and wherein the controller controls the web measuring means to measure out package length according to the input data, said machine having means for sealing together lapping margins of the web comprising an arm pivoted for swinging movement on a vertical axis at one side of the mandrel, a platen housing horizontally slidable on the arm for movement lengthwise of the arm, said arm with the housing therein being swingable on said axis between an operative position wherein said housing is in front of the mandrel and a retracted position wherein the housing is off to one side from in front of the mandrel, a sealing platen carried by the housing, means in the housing for moving the platen from a retracted position relative to the mandrel into sealing position engaging the lapping margins of the web on the mandrel for sealing said margins together during a dwell of the tubing between web feed cycles.

52. An intermittently operating form, fill and seal making packages from a web of material, the machine comprising:

means for forming the web into tubing;
means for moving the web over the web forming jaws for sealing the tubing:
means for moving the jaws relative to one another to open and close the jaws; and
a controller for receiving input data defining the package length, cycle time and sealing time and for controlling the operation of the web moving means as a function of the input data, whereby the web is moved one package length within the time remaining in each cycle time taking into account the sealing time, said machine having a downwardly extending tubular mandrel and wherein the means for forming the web into tubing forms it into the tubing surrounding the mandrel, and having web measuring means operable intermittently to pull the web from a supply and measure successive package length increments of the web as it is pulled from the supply to establish the package length and intermittently feed the web forward in said package length increments on successive web feed cycles to said forming means, said means for moving the web over the forming means comprising means for intermittently pulling the tubing down on the mandrel during each web feed cycle at the same time that each package length increment is intermittently fed forward to the forming means, the jaws being opened for the downward feed of the tubing on each web feed cycle and closed on the tubing below the lower end of the mandrel on a dwell of the tubing between successive web feed cycles, and wherein the controller controls the web measuring means to measure out package length according to the input data, said machine having a pair of stripper members operated independently of the jaws movable relative to one another from an open position with respect to the tubing to a closed position squeezing the tubing, and movable while in their open position from a lowered position below the jaws generally vertically upward between the opened jaws to a raised position above the jaws, then movable generally horizontally to their closed position and down in their closed position to their lowered position for stripping product from within the region of the tubing to be sealed.

53. An intermittently operating machine for making packages from a web of material of pieces of the web of predetermined package length, the machine comprising:

means for forming the web;
means for moving the web over the web forming means during a web moving time; and
a controller for determining the rate at which the web is moved over the forming means by the web moving means as a function of the package length and the web moving time, said web moving means being responsive to the determined rate.

54. In an intermittently operating machine for making packages from a web of material of pieces of the web of predetermined package length, the machine having means for forming the web and means for moving the web over the web forming means during a web moving time, a controller for controlling the web moving means comprising:

means for determining the rate at which the web is moved over the forming means by the web moving means as a function of the package length and the web moving time; and
means for controlling the web moving means in response to the determined rate.

* * * * *

UNITED STATES PATENT AND TRADEMARK OFFICE
CERTIFICATE OF CORRECTION

PATENT NO. : 5,377,474

DATED : January 3, 1995  Page 1 of 5

INVENTOR(S) : Lloyd Kovacs et al.

It is certified that error appears in the above-identified patent and that said Letters Patent is hereby corrected as shown below:

Column 3, line 10, "means for" should read ---means including expansible chamber means for---.

Column 3, line 49, "arid in part" should read ---and in part---.

Column 7, line 14, "with respect the " should read ---with respect to the---.

Column 7, line 36, "Units 77" should read ---units 77---.

Column 8, line 1, "electric; eye" should read ---electric eye---.

Column 8, line 36, "D1" should read ---B1---.

Column 8, line 68, "tension." should read ---tension).---.

Column 9, line 34, "pull bells" should read ---pull belts---.

Column 10, line 3, "(e.g., 9)" should read ---(e.g., 211 as shown in (Fig. 17)---.

Column 10, line 23, "it illustrated" should read ---it is illustrated---.

Column 10, lines 26-27, "adjustment of time position" should read ---adjustment of the position---.

Column 10, line 38, "appear ill solid" should read ---appear in solid---.

Column 11, line 18, "the web" should read ---the tube T---.

Column 11, line 57, "connections being" should read ---connections 281 being---.

UNITED STATES PATENT AND TRADEMARK OFFICE
CERTIFICATE OF CORRECTION

PATENT NO. : 5,377,474

DATED : January 3, 1995

INVENTOR(S) : Lloyd Kovacs et al.

It is certified that error appears in the above-identified patent and that said Letters Patent is hereby corrected as shown below:

Column 12, line 56, "of Raw J1" should read ---of jaw J1---.

Column 12, line 60, "slop the motor" should read ---stop the motor---.

Column 12, line 67, "28-23" should read ---28-33---.

Column 13, line 38, "425 indicated" should read ---425 is indicated---.

Column 13, line 41, "which its front" should read ---which is its front---.

Column 13, line 54, "arid such" should read ---and such---.

Column 13, line 59, "position ill which" should read ---position in which---.

Column 13, line 63, "illustrated Fig. 30" should read ---illustrated in Fig. 30---.

Column 14, line 8, "the cain drive it" should read ---the cam to drive it---.

Column 14, line 14, "The cylinder" should read ---The air cylinder---.

Column 14, line 30, "Fig. 30" should read ---Fig. 32---.

Column 15, line 5, "Dam-432" should read ---Bam 432---.

Column 15, line 38, "thence oil to" should read ---thence onto---.

Column 16, line 11, "OFF" should read ---ON---.

Column 16, line 19, "of cain" should read ---of cam---.

UNITED STATES PATENT AND TRADEMARK OFFICE
CERTIFICATE OF CORRECTION

PATENT NO. : 5,377,474
DATED : January 3, 1995
INVENTOR(S) : Lloyd Kovacs et al.

It is certified that error appears in the above-identified patent and that said Letters Patent is hereby corrected as shown below:

Column 17, line 9, "point ill the" should read ---point in the---.

Column 17, line 42, "may riot be" should read ---may not be---.

Column 17, line 61, "13, to" should read ---13, and to---.

Column 17, line 67, "step deactuate" should read ---step to deactuate---.

Column 18, line 47, "the [lull" should read ---the pull---.

Column 19, line 42, "in [he" should read ---in the---.

Column 19, line 57, "shaking arid settling" should read ---shaking and settling---.

Column 21, line 37, "where [he" should read ---where the---.

Column 21, line 39, "web musk be" should read ---web must be---.

Column 21, line 44, "that acceleration" should read ---that the acceleration---.

Column 22, line 6, "372A-B72H" should read ---372A-372H---.

Column 22, line 51, "[he pull" should read ---the pull---.

Column 24, claim 1, lines 33-34, "following:, the " should read ---following: the---.

Column 25, claim 8, line 18, "range arid for" should read ---range and for ---.

UNITED STATES PATENT AND TRADEMARK OFFICE
CERTIFICATE OF CORRECTION

PATENT NO. : 5,377,474

DATED : January 3, 1995

INVENTOR(S) : Lloyd Kovacs et al.

It is certified that error appears in the above-identified patent and that said Letters Patent is hereby corrected as shown below:

Column 25, claim 9, line 20, "Tile machine" should read ---The machine---.

Column 27, claim 21, line 6, "position arid means" should read ---position, and means---.

Column 32, claim 51, line 35, "the machine" should read ---the machine comprising:---.

Column 32, claim 51, line 36, "tubing;." should read ---tubing;---.

Column 32, claim 51, line 45, "function input" should read ---function of the input---.

Column 32, line 51, line 46, "package time" should read ---package length within the ---.

Column 33, claim 52, lines 19-20, "seal making" should read ---seal machine for making---.

Column 33, claim 52, line 23, "web forming" should read ---web forming means;---.

Column 28, claim 34, line 45, "toward add away" should read ---toward and away---.

Column 29, claim 35, line 8, "cylinder arid the" should read ---cylinder and the---.

Column 29, claim 35, line 16, "piston arid the " should read ---piston and the---.

Column 29, claim 35, line 17, "means arid the" should read means and the---

UNITED STATES PATENT AND TRADEMARK OFFICE
CERTIFICATE OF CORRECTION

PATENT NO. : 5,377,474
DATED : January 3, 1995
INVENTOR(S) : Lloyd Kovacs et al

It is certified that error appears in the above-indentified patent and that said Letters Patent is hereby corrected as shown below:

Column 29, claim 35, line 8, "cylinder arid the" should read --cylinder and the --.

Column 29, claim 35, line 16, "piston arid the " should read --piston and the --.

Column 29, claim 35, line 17, "means arid the" should read --means and the --.

Signed and Sealed this

Twenty-fourth Day of October, 1995

Attest:

BRUCE LEHMAN

Attesting Officer

Commissioner of Patents and Trademarks